(12) United States Patent
DeVorzon et al.

(10) Patent No.: US 7,277,883 B2
(45) Date of Patent: Oct. 2, 2007

(54) INFORMATION MANAGEMENT SYSTEM

(75) Inventors: Barry DeVorzon, Montecito, CA (US); Michael Towers, Goleta, CA (US)

(73) Assignee: Masterwriter, Inc., Santa Barbara, CA (US)

( * ) Notice: Subject to any disclaimer, the term of this patent is extended or adjusted under 35 U.S.C. 154(b) by 370 days.

(21) Appl. No.: 10/337,910

(22) Filed: Jan. 6, 2003

(65) Prior Publication Data

US 2004/0133559 A1 Jul. 8, 2004

(51) Int. Cl.
*G06F 7/00* (2006.01)
*G06F 17/28* (2006.01)

(52) U.S. Cl. ............... 707/3; 707/4; 707/5; 707/10; 704/2

(58) Field of Classification Search ............. 707/3–6; 434/167, 178; 704/2–9
See application file for complete search history.

(56) References Cited

U.S. PATENT DOCUMENTS

| | | | |
|---|---|---|---|
| 5,283,833 A * | 2/1994 | Church et al. ............. 704/252 |
| 5,895,463 A * | 4/1999 | Dowling et al. ........... 707/3 |
| 6,084,168 A * | 7/2000 | Sitrick ..................... 84/478 |
| 6,275,789 B1 * | 8/2001 | Moser et al. ............. 704/7 |
| 6,408,266 B1 * | 6/2002 | Oon ........................ 704/1 |
| 6,529,864 B1 * | 3/2003 | Chase ...................... 707/100 |
| 6,598,074 B1 * | 7/2003 | Moller et al. ............ 709/204 |
| 6,729,882 B2 * | 5/2004 | Noble ...................... 434/167 |
| 7,085,845 B2 * | 8/2006 | Woodward et al. ........ 725/87 |
| 2002/0029146 A1 * | 3/2002 | Nir ......................... 704/260 |
| 2002/0156776 A1 * | 10/2002 | Davallou .................. 707/3 |
| 2003/0041307 A1 * | 2/2003 | Park ........................ 715/532 |
| 2003/0074196 A1 * | 4/2003 | Kamanaka ............... 704/260 |
| 2003/0118973 A1 * | 6/2003 | Noble ...................... 434/167 |
| 2004/0133558 A1 * | 7/2004 | DeVorzon et al. ......... 707/3 |
| 2005/0234998 A1 * | 10/2005 | Lesandrini et al. ...... 707/104.1 |

* cited by examiner

*Primary Examiner*—Shahid Alam
*Assistant Examiner*—Anh Ly
(74) *Attorney, Agent, or Firm*—Berliner & Associates

(57) ABSTRACT

This writing discloses a computerized tool to enhance the output of a user. The tool has a number of databases against which the input entered by the user is reviewed. In specificity, this tool can be used for creating songs. It offers to the user dictionaries including a rhyme dictionary, a phrases dictionary, a pop culture dictionary, an alliterations dictionary and a dictionary of words that are matched against the input word for similar sounds. It also has an alternative pronunciation database. The tool also has audio capabilities.

39 Claims, 43 Drawing Sheets

| The World | Famous Names | Famous Products | Food, Drink & Travel |
|---|---|---|---|
| Countries | Famous Leaders | Born in the USA | Food |
| States 261 | Famous People | Corporate America | Candy |
| US Cities | Newsmakers | Name Brands & Icons | Ice Cream |
| World Cities | Famous Events | Cars | Beers |
| Landmarks & Icons | Infamous | Motorcycles | Wines |
| US Regions | Actors | Retail | Liquor |
| World Regions | Artists | Drug Store | Mixed Drinks |
| US Rivers | Writers | Toys | Soft Drinks |
| World Rivers | Comedians | Books | Bars |
| Bodies of Water ▼ | Models | Movies | Holidays |
| Islands | Music ▼ | TV | Hotels |
| Deserts | Musicals | Newspapers | Travel |
| Mountains | Fictional Characters | In Style | Tobacco |
| Peoples of America | Fictional: Animated | Magazines | |
| Peoples of the World | Fictional: Comics | | |
| Space | Fictional: Places | | |
| The Bible | Sports ▼ | | |
| Religions ▼ | First Names | | |
| Folklore and Myths | | | |

Songs | Rhymes | Rhymed Phrases | Phrases | Alliterations | Postcultures | Famous Products | Dictionary | Thesaurus | Notebook
Index | The World | Famous Names | Food/Drink & Travel Syllables: All

| | |
|---|---|
| All | Fender Telecaster |
| | Flying V |
| Favorites | Folgers |
| | Formica |
| Category | Formula 409 |
| | French's |
| –Born-in-the-USA– | Freon |
| –Corporate-America– | Friskies |
| –Name-Brands-&-Icons– | Gateway Computers |
| Cars | General Mills |
| Motorcycles | General Motors |
| Retail | Gerber |
| Drug Store | Gibson |
| Toys | Glad Bags |
| Books | Glade |
| Movies | Goodwill |
| TV | Grey Poupon |
| Newspapers | Guild |
| In-Style | Hammond B3 |
| Magazines | Hammond Organ |
| | Hawaiian Tropic |
| | Healthy Choice |
| | Hefty Bags |
| | Horizon Organic |
| | Huffy |
| | Huggies |
| | Ibanez |
| | iMac |
| | Internet Explorer |
| | Irish Spring |
| | Ivory Soap |
| | Jet Ski |
| | Johnson Wax |
| | Jolly Rancher |
| | Keebler |
| | Kitty Litter |
| | Kudos Bars |
| | Lamaze |

3 in 1 Oil
Ajax
Alka-Seltzer
Arm and Hammer Baking Soda
AstroTurf
Aunt Jemima
Baby Wipes
Blue Bonnet
Bounty
Brawny
Brillo Pads
Campbell's Soup
Cascade
Checker Cab
Cheer
Chef Boyardee
Chiquita
Clairol
Clavinet
Clorox
Comet
Coppertone
Dell
Dirt Devil
Dolby
Dove Beauty Bar
Downey
Drano
Du Pont
Duracell
Easy-Off
eGames
Endust
Energizer
Fantastik
Fender
Fender Strat
Fender Stratocaster Current Song: Demo Song

Figure 38

INFORMATION MANAGEMENT SYSTEM

BACKGROUND

1. Field

The present writing relates to a collection of tools useful for writers. Specifically, the present writing relates to a method and system that electronically stores and retrieves information related to song writing. However, the teachings in this writing are applicable to numerous fields in the teaching of a collection of necessary resources that are programmed to interact with one another to enhance the memory and resources at hand for the mind for all types of output. Further, while this writing has presented the tools in a system, the tools could be used independently or in a mixed mode. One should consider the system a modular one wherein parts can be used separately or together in various combinations.

2. Description of Related Art

The art of writing can sometimes be difficult and writers often face a blank sheet of paper looking for an idea or direction that will trigger inspiration. When the writer finds an idea and hopefully inspiration follows, it becomes even more important that the writer have quick and easy access to rhymes, SOUND-ALIKES™ sources, phrases and song-related information and features. If too much time is spent on research and problem solving, inspiration can evaporate and disappear as quickly as it came.

Today's rhyming and phrasal dictionaries can be cumbersome and limited. Current rhyming dictionaries generally contain only perfect rhymes and ignore words that are not perfect rhymes but are close enough to be pleasing to the ear. These rhymes, close but not perfect, are herein referred to as SOUND-ALIKES words. Providing only perfect rhymes results in a limited list of rhymes for most words, and in some cases, words with no rhymes whatsoever. Therefore, having access to SOUND-ALIKES words, as well as perfect rhymes, expands the rhyming possibilities and gives the writer a greater list of rhymes from which to choose.

Alternative pronunciations are also generally ignored in most rhyming dictionaries. A rhyming dictionary that provides SOUND-ALIKES words as well as alternative pronunciation is needed and would be an invaluable asset.

Current phrasal dictionaries are usually collections of clichés, dated phrases and sayings that tend to exclude contemporary sayings, phrases and word combinations. They also do not allow the writer to be specific. The time and research required to find only the phrases that contain a specific word or end in a word that rhymes with a specific word is long, arduous, and impractical. A comprehensive phrasal dictionary that contains both traditional and contemporary phrases, and a design that would allow the user to be specific by giving the writer the ability to search on phrases that rhyme or contain a specific word is needed and would be an invaluable asset.

Songwriters can have multiple songs in progress at the same time. These songs may involve one or more different co-writers. Organizing and keeping track of the lyrics, sketches and melodies of multiple songs can be a daunting task. Lyric sheets and cassette tapes that contain melodic references are often mislabeled, misplaced or lost. A system that would allow writers to organize and preserve songs in progress, including the rhymes, phrases, and reference materials collected to that song, as well as those songs they have completed, is needed and would be an invaluable asset.

Songwriters usually do not copyright a song until it is commercially recorded. This leaves that song unprotected for however long that period of time may be. A quick, easy and inexpensive way to register and prove a date of creation is needed and would be an invaluable asset.

SUMMARY

Broadly, this writing discloses a computer program comprised of a plurality of resources;

means to accept input from a user of the program;

means to cause at least one of the resources to interact with the input to provide output related to the input, wherein upon entry of input by a user into the program each of the resources can be accessed to process the input and provide an output comprised of the input and material from the accessed resource which material is desired by the user.

Broadly this writing discloses references and means of making these references, the references comprising rhyming references and SOUND-ALIKES references, these references being operable independently or in conjunction with other references.

The disclosed system and method comprises word processing, audio processing, reference dictionaries (referred to herein as well as references and dictionaries), and related features all housed within one program and separable into separate programs. One skilled in the art will appreciate that although these features can exist and be used as individual programs, their functionality is greatly enhanced when integrated into one program. The word processing function allows a user to create, store and review lyrics and ideas. The audio processing function allows the user to record melodies and musical ideas, as well as import stereo CD quality tracks.

OVERVIEW

The reference dictionaries mentioned above each have a specific function in the program and method now described. The following are just some of the references that one might include in a program such as here now described for use by a songwriter. Other references would be included for a different sort of output. Those skilled in the art will readily appreciate this replacability and amendability of the references and realize that the description herein is an example of but one embodiment of the method and program here taught. Many obvious different embodiments will become apparent to those skilled in the art depending on the output desired. It is also of note that while this writing describes a SOUND-ALIKES data base, a Rhyming Database, an Alliterations database, and a Phrases database, all of these databases can be created in various different ways besides the manner herein described. There is on the market Rhyming dictionaries, collections of alliterations (check your English grammar lessons), collections of phrases. There are numerous analysis of language available to make new collections of these items. Mr. Moby is one individual who is famous for making such analysis to facilitate making dictionaries for rhyming words, words that sound similar, words that are alliterations, Accordingly, the present interactive program can be created by one skilled in the art using dictionaries and materials other than the dictionaries and materials compiled in the fashion described herein.

References/Dictionaries

Rhymes

Searching in the Rhymes Dictionary will display the perfect rhymes for the word being searched.

Sound-Alikes

Searching in the SOUND-ALIKES dictionary will display rhymes that are close but not perfect rhymes for the word being searched.

Alliterations:

Searching on a word in the Alliterations Dictionary will display the words that begin with the same phonetic sound as the word being searched which may but does not necessarily include the same first letter of the word being searched.

Pop-Culture

The Pop-Culture Dictionary contains icons, famous names, places, events, rivers, mountains, bodies of water, fictional characters and places, mythology, religion, sports, music, the arts, products, etc. that make up and are an important part of American and World culture. Entries from Pop-Culture are also included in the Rhyming, SOUND-ALIKES, and Alliterations Dictionaries.

Rhymed-Phrases

Searching on a word in the Rhymed-Phrases Dictionary will display phrases that end with a word that rhymes with the word being searched.

Sound-Alikes Phrases

Searching on a word in the SOUND-ALIKES Phrasal Dictionary will display phrases that end with a word that is a close but not a perfect rhyme for the word being searched.

Phrases

Searching on a word in the Phrases Dictionary will display phrases that contain the word being searched.

Dictionary of Definitions

Searching on a word in the Reference Dictionary will display a definition for the word being searched.

Thesaurus

Searching on a word in the Thesaurus will display the synonyms for the word being searched.

Favorites

This reference dictionary presents resources that the user of the method and program herein enters preferably from existing references and otherwise if so programmed, which the user tends to want readily at hand for all output. This reference dictionary is a collection of everything the user has selected from all of the other reference dictionaries except the thesaurus and definitions dictionary. Over time becomes the users own personal collection of rhymes, phrases, alliterations and information that were found to be most useful to the user.

The reference dictionaries are available independently or contained in one software program which can be accessed and utilized on the user's computer system. If the user's computer system is portable, it allows the user to utilize the program on a plane, in a hotel room, in a studio, or anywhere the user desires. The single program containing the many reference dictionaries and the audio page eliminates the need for, and replaces, the physical items that a writer usually has at hand such as a paper writing pad, a cassette recorder, and the numerous book bound reference dictionaries which the writer would require to access the reference information provided in this program.

All of the above mentioned reference dictionaries, function independently but are also interactive. In this respect and as the reader will better appreciate as this writing progresses, a word can be entered once to access all, some or any one of the references, that is the reference dictionaries. Instigating a search in any dictionary or reference will preferably search all other dictionaries or references. Further, a user may select a word in one reference dictionary and cause that word to become the search word for the other reference dictionaries.

The reference dictionaries and word processing of the subject system allow a user to select for use words and/or phrases from the reference dictionaries. The selected words and/or phrases are simultaneously collected to the song currently being created by the user and to the user's Favorites Dictionary. The user may display the collected words and/or phrases while working on a current song using the word processing portion of the program. In addition, the user may display the collected words and/or phrases by viewing the Favorites Dictionary. Over time, the Favorites Dictionary becomes the user's personalized dictionary comprised of favorite rhymes, phrases, alliterations, etc.

As mentioned above, the dictionaries or references are contained in one software program and may be accessed and utilized on the user's computer system. In order to provide the user with even more flexibility in choosing the words and/or phrases to be displayed, the user may choose between several different category filters in accessing these reference dictionaries. Included as category filters are ALL, PRIMARY, SECONDARY, POP-CULTURE, FAVORITES and SYLLABLES. While the reader will understand these filters more as this paper progresses, the following should assist the reader in obtaining an initial understanding of the filters. With reference to the Rhyming dictionary, the ALL filter allows the user to see all of the rhymes. The PRIMARY filter allows the user to view rhymes that the user will find most useful in that they are in use in everyday parlance. The SECONDARY filter allows the user to view rhymes that the user may find useful in that they may not be as often used in present speech. The POP-CULTURE filter allows the user to view all of the rhymes that are pop culture. The FAVORITES filter allows the user to view the rhymes that have been collected over time and are part of the Favorites Dictionary. In addition, a syllables filter is available. The syllables filter allows the user to limit the words displayed by the number of syllables. All of these filters enable the user to further narrow the user's search for the perfect word and/or phrase. At least some or all of these filters can be used for all dictionaries or references except for the thesaurus and standard dictionary unless so programmed in.

Another feature that makes up part of the system and method disclosed herein is called Songuard™. The Songuard system is a date-of-creation registration service that allows the writer to register the lyrics, melody and writer information. While this registration does not replace a filing with a copyright office, it does present a record of date of creation that may be helpful in future issues concerning authorship.

While all of the foregoing features are presented together in the description that follows, it is to be understood that they could be used independently or in different combinations. By way of example but not limitation, one could purchase separately the SOUND-ALIKES reference and purchase as well separately filters to go with that reference.

BRIEF DESCRIPTION OF THE DRAWINGS

For exemplary purposes only in better understanding the method and system described herein the following drawings are presented.

FIG. 27 is a computer screen shot depicting the display of the words that are associated with the keyword shopper.

FIG. 28 is a computer screen shot illustrating the results when a user clicks an All SOUND-ALIKES box.

FIG. 32 is a computer screen shot illustrating words that match the related sound keyword "fear", such as fab, fade and Fagin.

FIG. 33 is a computer screen shot illustrating an example of a graphical user interface that may be used to gain access to the data within the Pop-Culture Database.

FIG. 34 is a computer screen shot depicting words displayed when the Famous Products category is selected and then the Name Brands and Icon subject category is selected.

FIG. 38 is a computer screen shot depicting the Phrase Index region is shown at the bottom of the graphic user interface.

Figure 2:
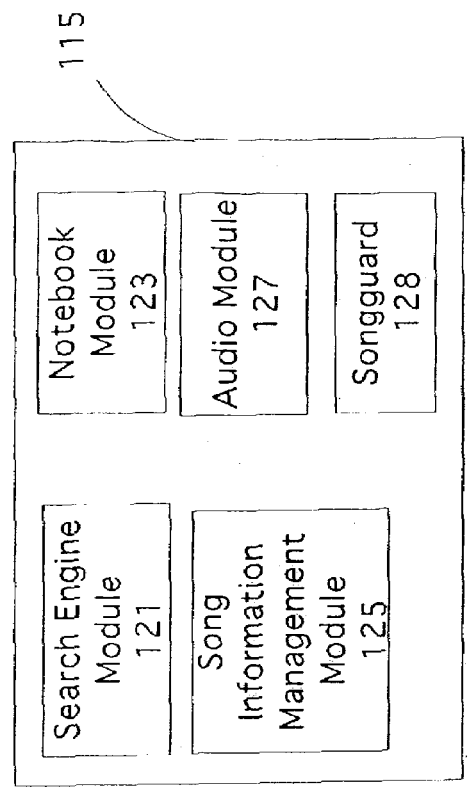
FIG. 2 is a graphic depiction of Song Information Management Module and its various components.

Appendix A is a model Help as used by a user for the specific embodiments described in this writing.

Appendix B is the script and screens from the MASTERWRITER.DEMO program which is incorporated herein by reference.

DETAILED DESCRIPTION OF PREFERRED EMBODIMENTS

The Overview section above sets forth the broad concept of the method and program described in this writing. In this writing, one is taught that a program is available with a wide range of resources which the user may access independently or interdependently with respect to input to arrive at a desired output. In one embodiment, this has been tailored to the uses of a songwriter and provides numerous references or dictionaries off of which to play words and music to achieve a desired result. The programming of this sort of program varies with the programmer and manners of programming this sort of result will be readily apparent to those skilled in the art. Using one program to accomplish this goal, the following detailed description of screens (computer screens or graphical user interfaces) results and is now described. Those skilled in the art have by now gleaned the concept of this writing from the foregoing discussion and will soon understand one embodiment of such concept. With this information, numerous programs achieving this concept may be readily written by computer programmers without undue experimentation. Thus, the following is offered not by way of limitation, but by way of illustration of the method and program of this writing. While this disclosure involves a graphical user interface or screen with a given layout, one skilled in the art will appreciate that there are many modifications to the layout and the graphical user interface or screen that would result in the same data displayed, although perhaps in a different format. The following has been programmed using FILEMAKER PRO, the contents of which is incorporated herein by reference. It follows the program of MASTERWRITER incorporated hereby reference. One must not use FILEMAKER to arrive at a program that will accomplish the inventive aspects of this invention. This is evident to those skilled in the art. To summarize, the following is meant to be for illustrative purposes only. It is understood that given the databases herein disclosed as well as the interactive means for interrelating these databases, one skilled in the art of programming has all of the tools needed to write various different programs to accomplish the ends herein described.

The program and method now described provides a user with an electronic creative process tool (e-CPT) which shall be the name used hereinafter to refer to the method and program of this disclosure. The e-CPT serves as a repository for both written and audio information and provides access to large word and phrasal databases that are uniquely indexed.

The e-CPT disclosed enables a person, such as a songwriter, to easily organize a plurality of lyrics, notes and melodies. The e-CPT provides a place to store all of one's ideas and allows a person to link lyrics with a specific melody. Thus, the user may share and create numerous creative projects within the e-CPT. Further, the e-CPT may act as a stand-alone tool or may be connected to a network, in which ideas can be sent to a central depository where they can be cataloged according to date and time entered. Thus, the e-CPT allows for third party verification of the date and time when the ideas were submitted.

The e-CPT contains easily accessible reference tools, which are the earlier described references or dictionaries These reference tools are more extensive than current reference tools available as they have been at times, fully created and/or significantly enhanced by the inventors of this writing. These tools are as well, inter-linked by the software of this system. The reference tools are the data bases for the dictionaries: Rhymes, SOUND-ALIKES, Alliterations, Pop Culture, Rhymed Phrases, SOUND-ALIKES Phrases, Phrases, Dictionary, Thesaurus and Favorites. These reference tools can be further enhanced or amended by other data bases and the user. Using these reference tools the e-CPT provides a means for finding perfect rhymes, as well as allowing a user to search for SOUND-ALIKES which are words that are phonetically similar but are not a perfect match. Through the Alliterations database, the user will also find words that are perfect alliterations of the searched word and words that are not perfect alliterations, but have similar beginning sounds. For example, searching the word "great" will give a return of "gr" formative words as well as "g" and "gl". The "g" and "gl" words being beginnings that sound like "gr". Thus the word "great" would return words such as "good", "glean" and "grim". The words contained in the e-CPT are words that may be found in dictionaries, as well as words that reflect the icons of American and World Pop-Culture. The e-CPT also contains both a database of words and a database of phrases that may be searched. The phrases are found in the Phrasal database consisting of Rhyme Phrases, SOUND-ALIKES Phrases and Phrases. Included in the phrasal database are typical clichés as well as phrases that have been collected over a period of several years from television, movies, magazines and books as well as thought provoking word combinations and creations of the inventors herein. The phrasal dictionary can be yet further enhanced by the user to add word combinations that the user wishes included. When a user enters a word to be searched in the Rhymed Phrases dictionary, phrases that end with a word that rhymes with the search word are provided. When a user searches on a word in the SOUND-ALIKES Phrase Dictionary, phrases that end with words that sound similar to but are not perfect rhymes of the search word are displayed. When a user enters a word to be searched in the Phrase dictionary, phrases that contain the search word are displayed. This combination of dictionaries as data base resources as well as the existence of these resources in a collected, interactive, and accessible form is new. As the existence of a first dictionary or a first computer accessible database provided a long needed tool, so does the present assemblage of databases, interaction of databases, and means for accessing that assemblage of databases as well as the databases themselves.

Figure 1:
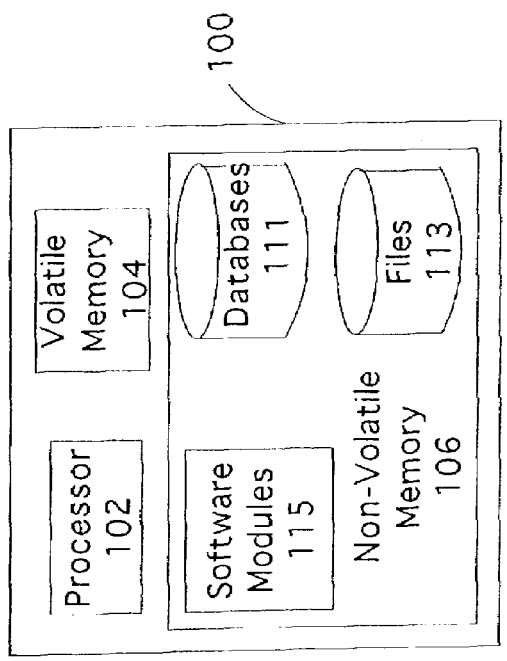
FIG. 1 is a graphic depiction of aspects of the subject system and program including software modules, databases and files all of which are stored in non-volatile memory within a computer system.

Referring now to FIG. 1, the e-CPT involves software modules 115, databases 111 and files 113 all of which are stored in non-volatile memory 106 within a computer system 100. The computer system 100 also comprises a processor 102 and volatile memory 104. The computer system 100 may be a laptop computer, a personal digital assistant or any other type of system comprising a processor 102, volatile memory 104 and non-volatile memory 106. The processor 102, volatile memory 104 and non-volatile memory 106 work together to allow a user to access the software modules 115, which in turn accesses the databases 111 and the files 113.

Turning next to FIG. 2, software module 115 of FIG. 1 is shown as comprising a search engine module 121, a Notebook module 123, a Song Information Management module (SIM) 125, an Audio Module 127 and Songuard™ module 128. The SIM 125 allows the user to create, modify and store lyrics, ideas and/or poems of the user's own creation. The SIM 125 also contains files accessed by the Audio Module 127. The Audio Module 127 is for importing, recording and playing back all songs, melodies and sounds that the user desires. This would include user created sounds, music, etc and non user created sounds music, etc. It allows the user to import, record and play back musical tunes, sounds, etc. that can be associated with the song lyrics stored in the SIM 125. Thus the user can create his or her own sounds and couple these with his or her own verbiage. Included in the Audio Module 127, is a collection of MIDI Drum Loops that can be played via a MIDI Drum loop player. The user can select one of the MIDI Drum loops according to style, type and tempo. The Audio Module 127 could as well include other sounds, such as horns, chirps of birds, tunes, etc. The Notebook module 123 can be used by the user to create a unique knowledge base that can also be accessed by the SIM 125. The Notebook module 123 enables the user to enter, store and retrieve information independently input by the user. These will likely be notes made by the users, photographs, down loads etc. The Notebook module 123 will preferably have its own search and sort engine associated with it. The Songuard module 128 provides a date of creation registration service that allows the writer to register the lyrics, melody and writer information stored in the SIM 125. The search engine module 121 allows a user to access the databases 111 which contains the dictionaries described above, and files 113 contained in the non-volatile memory 106 shown in FIG. 1. Information found by the search engine module 121 from the databases 111 and files 113 can be transferred into the SIM 125.

Discussing in more detail these modules, we turn to the SIM 125 of FIG. 2 and its various components.

Song Information Management Module (SIM)

Figure 5:
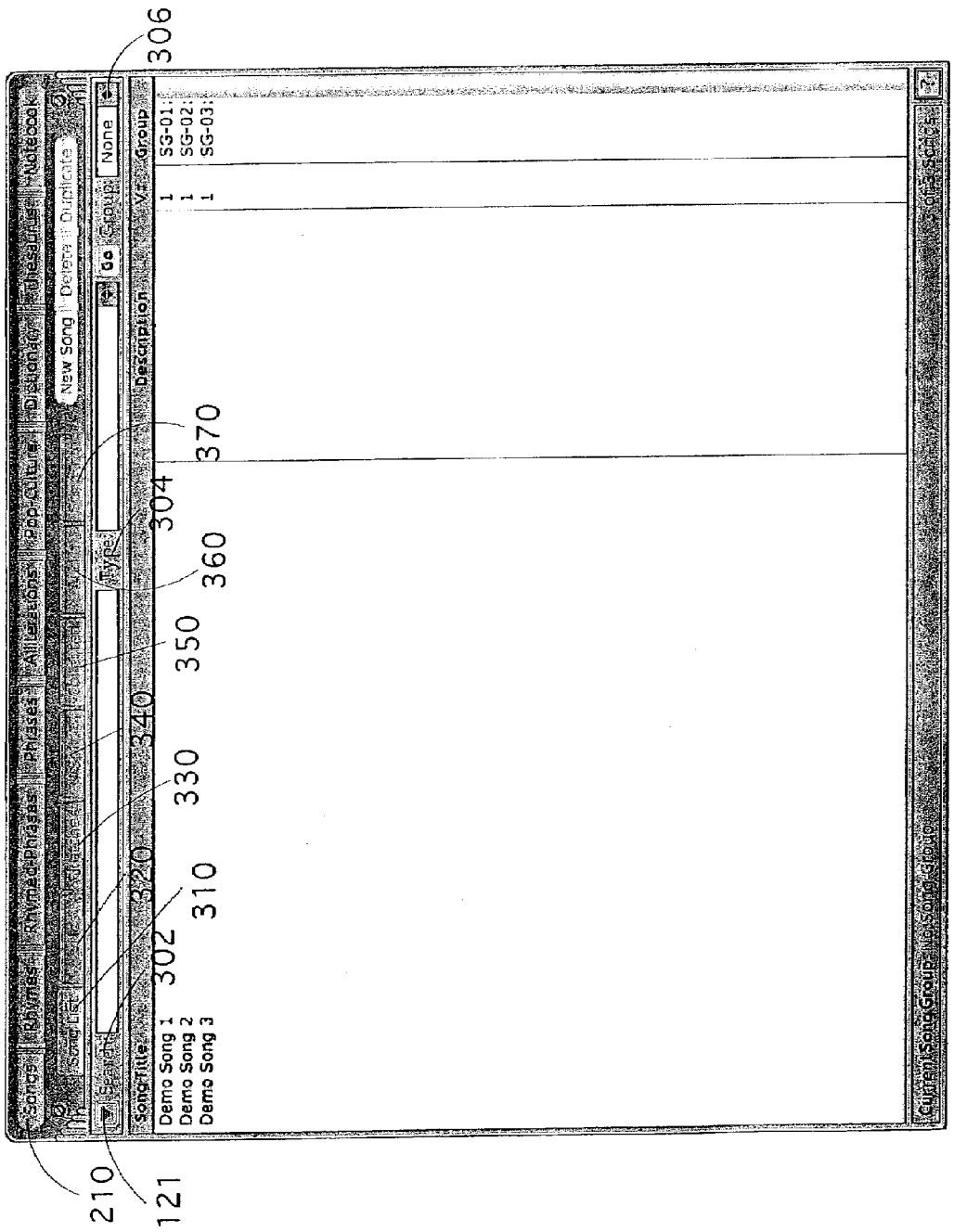
FIG. 5 is a computer screen shot depicting an example of a graphical user interface displaying the Song List reference.

To better understand the discussion that follows, the reader should consider that once the subject program is opened, a word to be searched may be searched in the Dictionary mode or through the SIM mode. The SIM mode accesses the Dictionary mode, but the Dictionary mode does not access the SIM mode. So, if one simply wanted to use this system as a means to access the various dictionaries or references but not write a song or poetry through the system, they would simply use the references of the system by clicking on any one of the buttons for Rhymes, SOUND-ALIKES, Alliterations, Favorites etc. For example, if a person put in the word "jam" in the search field of a screen such as seen in FIG. 5, and then clicked on any one of Rhymes, Rhymed Phrases, Phrases, etc. all in the top bar of FIG. 5, an output would be given in the main portion of the screen for the word. In the case of Rhymes, all of the words that rhyme with the word "jam" would appear. In the case of Phrases, all of the phrases containing the word "jam" would appear. A person writing anything might use the subject program in this fashion.

Figure 8:
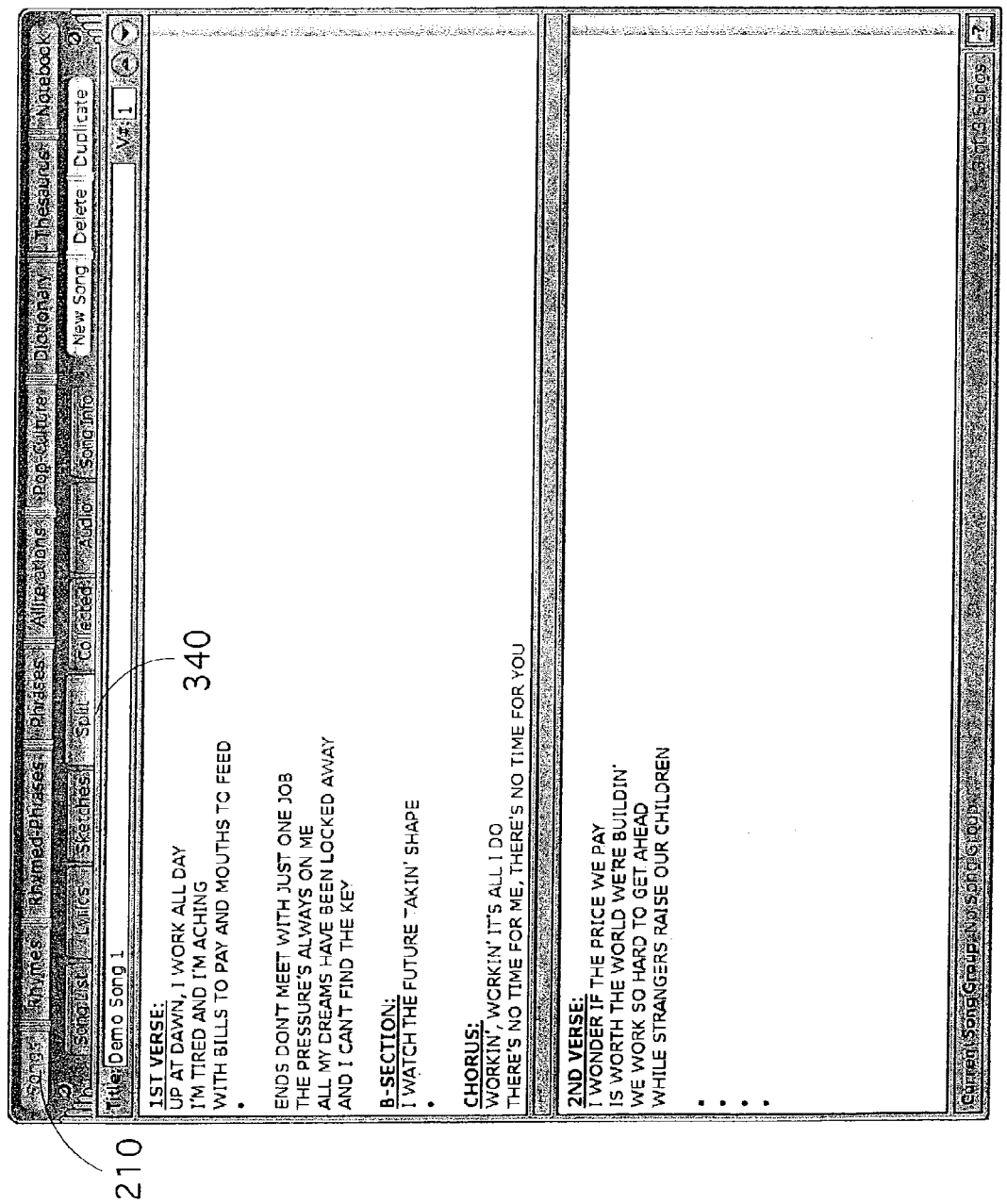
FIG. 8 is a computer screenshot depicting how a user may desire to display both the lyrics and the sketches for a given song by selecting split area
Figure 43:
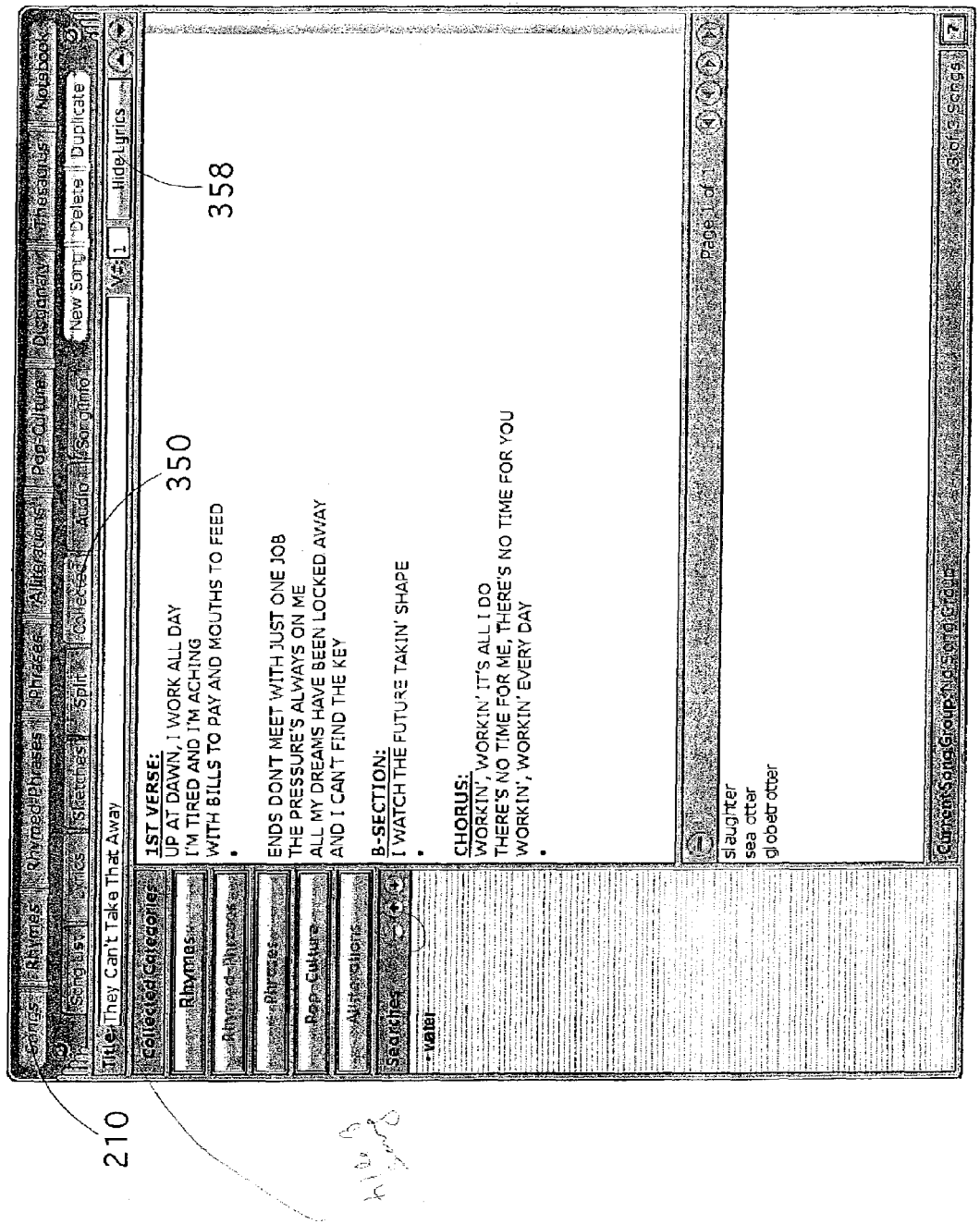
FIG. 43 is a computer screen shot illustrating an example of how the lyrics files of FIG. 4 may be displayed with the Rhymes file of FIG. 41.

However, a person who is trying to write lyrics, most likely will enter the Song Information Management Module or SIM as above noted. FIGS. 5, 8 and 43 are screens where the user has done just that. With the use of the SIM, the user will create lyrics, and draft lyrics known as "sketches". When the user needs to find a word related to one of the words in these lyrics and sketches, the user will click on that word in the lyric or sketch and then click on Rhymes, Alliterations, etc. to access the references or dictionaries from the SIM mode. The words "collected" from that search are stored in a Collected portion of the program visible and accessible through the SIM mode. Again, when FIG. 43, is discussed in this writing, the foregoing information will be revisited.

Figure 3:
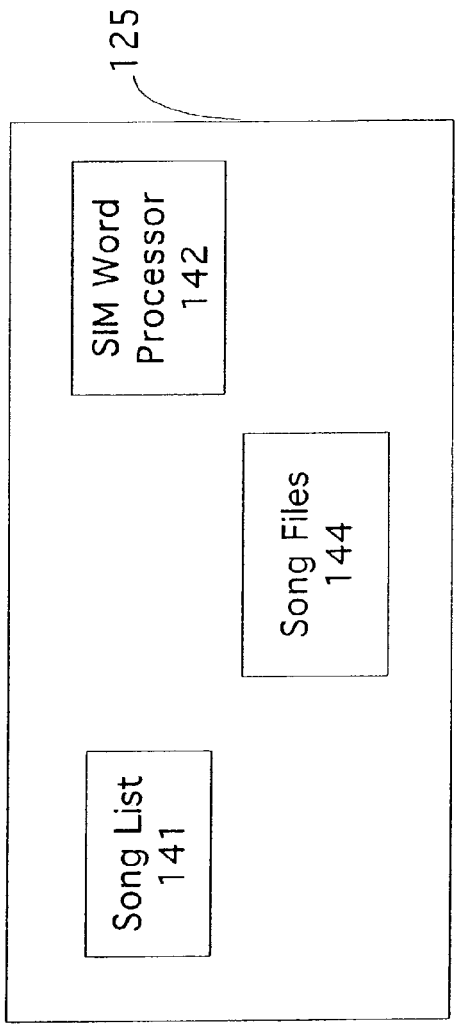
FIG. 3 further illustrates that the Song Information Management Module of FIG. 2 and comprises a Song List, Word Processor and Song Files. Song List which work together to allow the user to create, store and modify songs.

The SIM 125 is the area in which the user accesses personally entered ideas including lyrics, notes and melodies. The SIM 125 also allows the user to access both the information selected by the user during a search of the databases 111 of FIG. 1 and the information stored by the Audio Module 127 of FIG. 2. The SIM 125 is a software module that is optimized for song writers in that it allows a user to create and access various components associated with a song or work. FIG. 3 illustrates that the SIM 125 of FIG. 2 comprises a Song List 141, SIM Word Processor 142 and Song Files 144. Song List 141, SIM Word Processor 142 and Song Files 144 work together to allow the user to create, store and modify a plurality of different songs.

The Song List 141 of FIG. 3 contains an entry for each song or record that the user has written. FIG. 5 depicts an example of a graphical user interface or screen displaying Song List 141 of FIG. 3. These are all songs (lyrics and sketches or at least titles for songs that the user intends to write the lyrics for) that the user has previously created or is in the midst of creating. The Song List displayed in FIG. 5 comprises Demo Song 1, Demo Song 2 and Demo Song 3. This is in the main portion of this graphical user interface which for this selection is divided into rows depicting from left to right "Song Title", Dexcription, V# (version #), and Group for the group assigned to a song if the user chooses to assign it a group. Above these columns is a scroll arrow 121, a search entry 302 and field, a type entry 304, and a group entry 306. These items will be further discussed in the following paragraphs. This row is then topped by selection buttons including Song List 310, files 320, sketches 330, split 340, collected 350, audio 360 and song info 370. These selection choices repeat themselves on most of the screens that follow pertaining to the SIM. Above these buttons, are the menu selections including Songs 210, Rhymes, Rhymed-Phrases, Phrases, Alliterations, Pop Culture, Dictionary, Thesaurus, Notebooks. All of these menu items should now be familiar to the reader as they represent the dictionaries/references above detailed and will be further addressed as additional screens are shown.

Note that for FIG. 5, we are in the SIM mode because Songs 210 has been highlighted. We further note that we are seeing the Song List since that button 310 has been clicked and is highlighted. That list shows that three song names have been entered, Demo Song 1, Demo Song 2, and Demo Song 3. These names are displayed on the screen. The user simply needs now to click on any one of these songs to see its lyrics that the user has entered if any. Since in FIG. 5 the area Groups 306 reads "none" (which is selected by using the selection scroll arrow next to Groups 306), all songs are shown. If instead, SG 4 had been selected by using the selection scroll next to Group 306, only the songs in SG 4 would be shown. To create new songs, the user would click "New Song" in the second row of choices in FIG. 5. A blank screen will appear. Now turn to FIG. 8. In this screen, the user previously has entered a title for this new song, "Demo Song 1". The user has also entered lyrics for the song "ends don't meet with just one job". If the user now clicks on "Song List" the user will see Demo Song 1 in the Song List as seen in FIG. 5. If the user decides that the song is no good, the user simply clicks on Demo Song 1 and clicks on the "Delete", button, the button next to the New Song button on the second row of FIG. 5. The lyrics entered by the user for a song are changeable as in any word processing program. So, returning to FIG. 8, if the user does not like some of the lyrics there, those lyrics may be changed as in any word processing situation. If the user needs help, in the bottom right hand corner of the screens and so in FIGS. 5 and 8, the user clicks on the ? key and the help will open to the page having to do with the screen the user is using. In FIG. 8, that is the lyrics split screen for songs. In FIG. 5, that is the song list screen. And if the user wants to move to another area of the help, there is a Table of Contents button in the help to take the user to the index to choose another area for review. All of this will be revisited in greater detail in the paragraphs that follow. Also, the help information is set out in full in the Appendix here attached. Particularly special about this help is that it opens automatically to the screen where the user is and if the user changes screens, the help page changes with the screen and thus tracks the user's movement. Once the user is done working with a new song, the user may simply switch to another matter. The new song will be saved automatically.

Each Song File 144 stored in the SIM 125 of FIG. 2 is preferably an individual record created by the user. Each individual record may comprise any of the items shown in FIG. 4 such as lyrics files 143, sketches files 145, Collected Words and Phrases files 147, Selected Audio Tracks files 148 and Song Information files 149 all of which are further discussed in this paper.

In the one embodiment as seen in FIG. 5, search engine module 121 of FIG. 2 preferably accesses the Song Files 144 and Song List 141 of FIG. 3. Here Songs button 210, the Song Files 144 and Song List 141 of FIG. 3 is depicted by clicking on the above noted buttons. Further exploring FIG. 5, a user may enter a word or phrase in Search field 302. The user may also select from the Type 304 pull-down menu a plurality of different fields in which to search for the word or phrase entered in search field 302. The fields in the Type 304 pull down menu are, Song Title, Lyrics, Sketches, Lyrics and Sketches, Writer, Publisher, Style, Song Notes, Audio Notes, Song and Audio Notes, Date Created. With this information, suppose the writer could not remember the name of the song, but remembered a phrase in the lyrics. The user could then enter the phrase remembered in the Search field 302 and then select "Lyrics" from the Type 304 pull-down menu. The result would be song titles that included that phrase. In addition, when a song is created, it can be assigned by the user to a specific group such SG-01, SG-02 as seen in FIG. 5 and as discussed above. Accordingly, songs in the song list 310 may also be filtered according to their group by selecting the group to be displayed from the Group 306 button. Thus, when one chooses a title for a song to be written, it may be assigned a song group, such as SG 01. If one wants to title this group such as "Jazz" one holds the mouse over the song group and is then given the option to edit that field. So, in FIG. 5, next to Demo Song 2 in the "Group" column, Demo Song 2 is categorized as being in SG 02. By placing the mouse over SG 02 and holding it down, the user is given the option of editing the name of all song groups and may in this way identify the desired group as "Jazz". To assign a song group to a song go one may click the button Song List 310 as in FIG. 5. The mouse is then moved over to the column for "Group" and held over the line pertaining to the song in issue. Thus, assume that you have Demo Song 2 in SG 02 as shown in FIG. 5. But, you want to put that song in SG 03, simply click the mouse and hold it over SG 02 opposite Demos Song 2 and you are given the option of changing or creating the song group for that song from something other than SG 02.

Turning back to FIG. 4, Lyrics files 143 are a collection of files, each file containing the lyrics for a given song. These are lyrics entered into the program by the user under the name of a Song. A user may select a Song from Song List 141 of FIG. 3, preferably by double-clicking a song, such as Demo Song 1, shown in FIG. 5. The lyrics for the selected song may be displayed using SIM Word Processor 142 of FIG. 3. As earlier noted, FIG. 8 shows this. So too does FIG. 6 which depicts an example of a graphical user interface display or screen when the user clicks on or chooses Lyrics 320 after clicking on Demo Song 1 from FIG. 5. By selecting the lyrics button 320, the user is provided with a place where the user can type in lyrics for a given song using SIM Word Processor 142 of FIG. 3. Alternatively, the lyrics could be a poem or other work.

Figure 4:
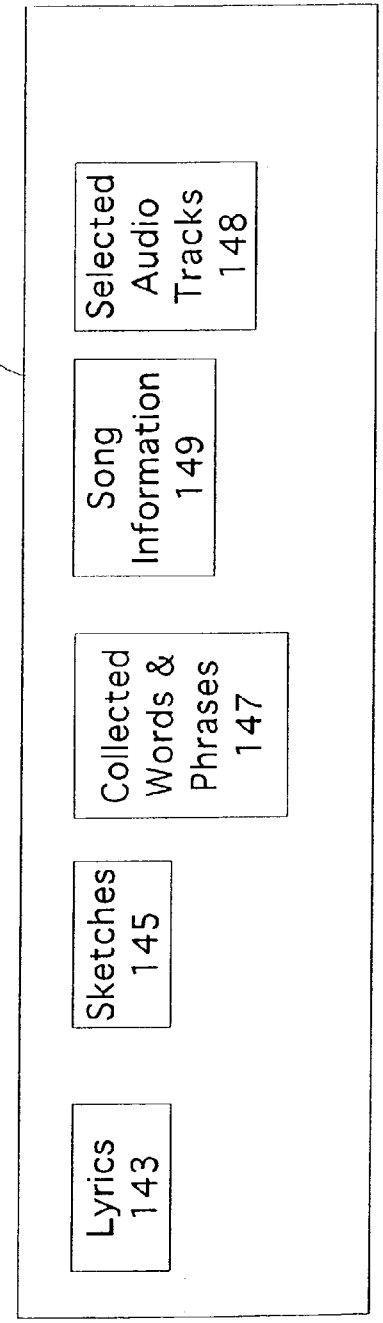
FIG. 4 shows individual records that may be created in the program such as files for lyrics, sketches, Collected Words and Phrases, Selected Audio Tracks and Song Information.
Figure 6:
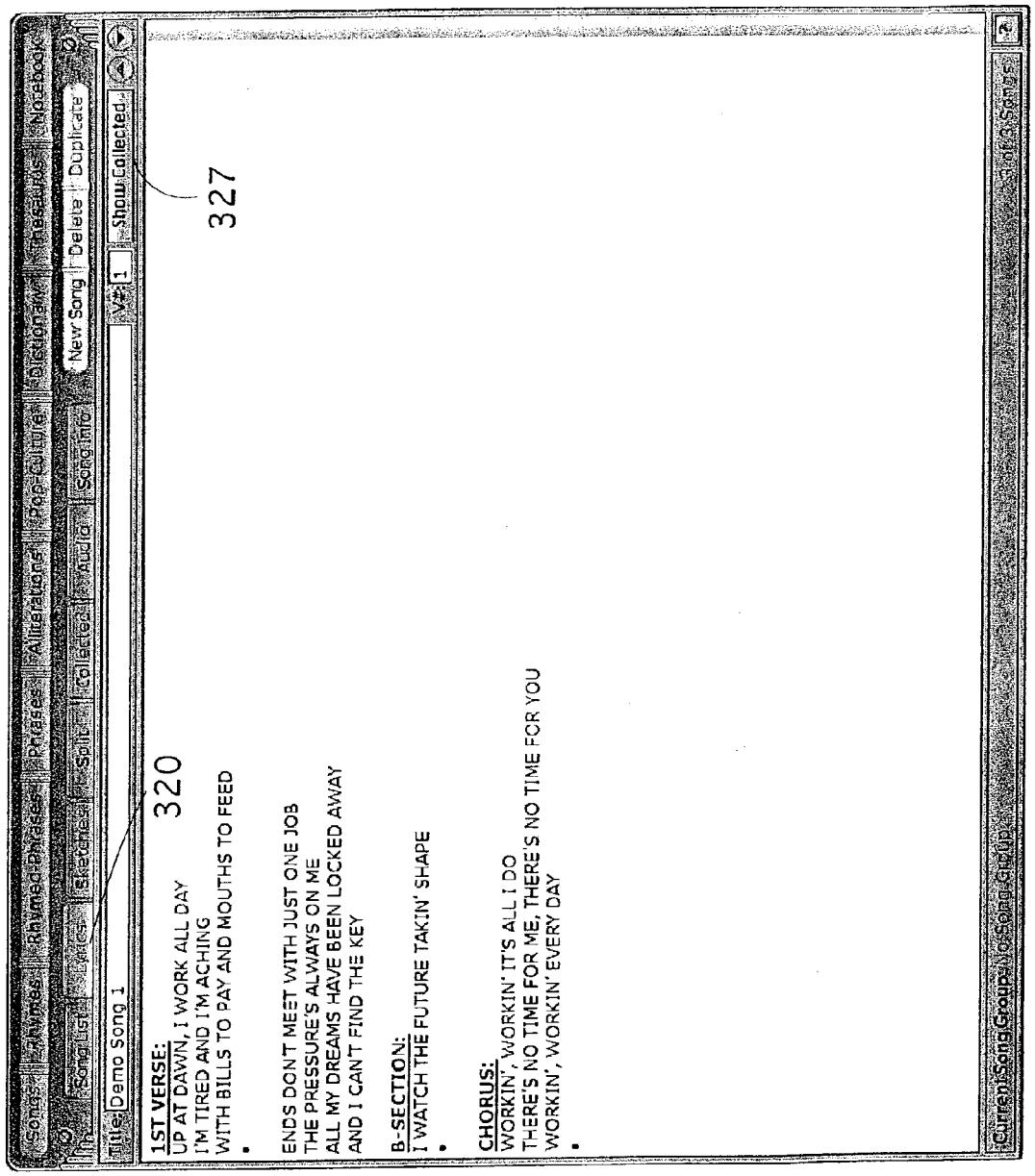
FIG. 6 is a computer screen shot depicting an example of a graphical user interface display when the user chooses lyrics area after selecting Demo Song from FIG. 5.
Figure 7:
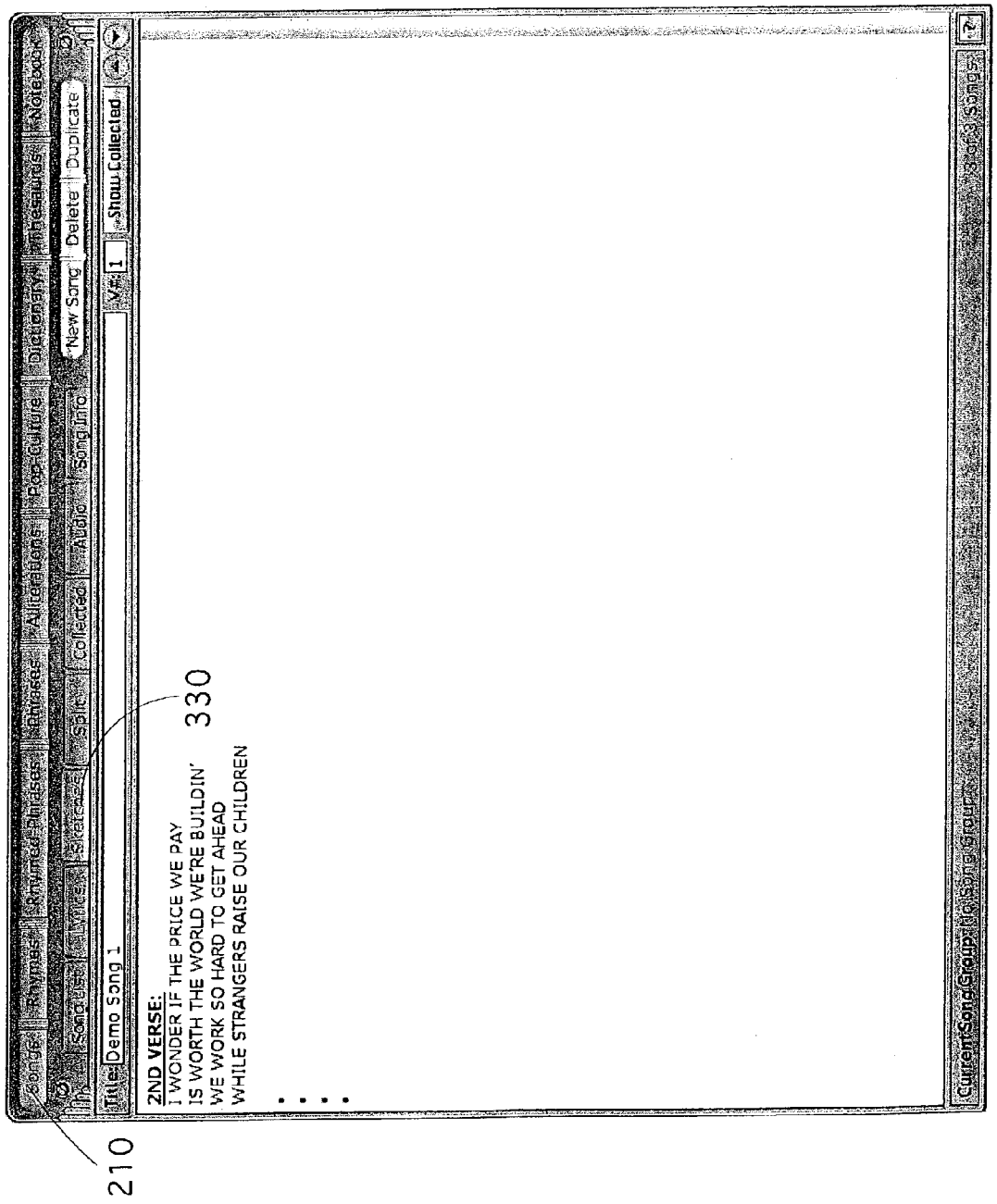
FIG. 7 is a computer screen shot depicting an example of a graphical user interface display when the user chooses sketches area after selecting Demo Song from FIG. 5.

Sketches files 145 of FIG. 4 are a collection of files, each file containing alternative lyrics or ideas separately from the main ideas or lyrics of the song. A user may select a song from Song List 141 of FIG. 3, preferably by double-clicking a song shown in FIG. 5. The sketches for the selected song may be displayed using SIM Word Processor 142 of FIG. 3 by clicking on the sketches button 330, see FIG. 7. FIG. 7 depicts an example of a graphical user interface display when the user chooses sketches button 330 after selecting Demo Song 1 from FIG. 5. To clarify what the reader is seeing, in FIG. 7, a second verse is presented. The user has not decided that this second verse is exactly what is wanted and so this second verse rests in the sketches file by choice of the user, for further modifications or comparison against other alternative second verses that can be written. In FIG. 6, there is a first verse, chorus and base. The user has decided that these are preferred and placed them in the lyrics file 143. Of course both the lyrics file 143 and the sketches file are 145 are modifiable by the user to change the end products displayed. They both are run by word processing programs for entry of the sketches and lyrics.

Returning to FIG. 8, it depicts how a user may desire to display both the lyrics and the sketches for a given song by selecting split area 340. SIM Word processor 142 allows a user to access both the Lyrics files 143 and the Sketches files 145 simultaneously. Split button 340 displays, in a split screen, both the lyrics and the sketches for the song to enable the user to look at both and choose the best words from the two areas. Thus, FIG. 8 shows the lyrics and sketches seen separately in FIGS. 6 and 7.

Now turning to the Collected Words and Phrases files 147 of FIG. 4, these contain words and phrases that a user has collected from the Databases 111 of FIG. 2 by the search engine module 121 of FIG. 2. Further, these Collected Words and Phrases files 147 have been associated with a particular song by the user. A discussion of the collecting and displaying process will be further discussed following the discussion of the Databases 111 and search engine module 121. However, this writing in the first paragraph of this section has already alluded to this situation when discussing how the SIM accesses the Dictionaries to assist the user in writing lyrics and sketches and places the selected and accessed words from the dictionaries in a collected area of the program. Those collected words are also placed in the Favorites Dictionary as will become apparent as one reads further. As a short introduction, the reader is directed to FIG. 43. That figure shows that the button "Collected" 350 has been chosen and that the program is running in "Songs" 210. The screen is divided into a top portion and a lower portion. In the top portion is the lyrics also seen in FIG. 6. In the bottom portion are the collected words "slaughter", "sea otter" and "globetrotter". These are words that the user has clicked on when using the program to search the rhymes dictionary for the word "water". While the term "water" does not appear in the lyrics, the user nonetheless searched this word while working on this song in the lyrics. Thus to arrive at the FIG. 43, the user has gone to the Song List screen such as shown in FIG. 5. The user has clicked on a song "They can't take that away" (not shown on FIG. 5). clicked on the button "collected" 350" and come to a screen much like that in FIG. 43. However, when FIG. 43 is first entered, it would offer the lyrics and the searches (left hand side of the screen) showing the word "water" thereunder. Also the "Rhymes" button under the title "collected categories" is highlighted showing that the user had searched in Rhymes earlier for the word "water". The user then clicks on the word "water" and in the lower section of the screen, the words that the user had found most interesting in the Rhymes section and had double clicked on are shown in that lower section. Those words are "slaughter", "sea otter" etc.

Stepping back, for the reader's understanding we take this whole matter from the beginning. The user opens up the program described herein and clicks on "New Song". There, in the field of Title, the user enters a title (for example "They Can't Take That Away"). The user then can immediately start typing lyrics in the screen below or click on "sketches" and type proposed lyrics in that screen. During the entry of lyrics, the user perhaps has a line, "life is like water" or simply wishes to search the word "water". The user needs some word to rhyme with "water" and does not like the words that come to mind. The user clicks on the "Rhymes" button in the top menu buttons next to the "Songs" 210 button and selects a number of words after either entering the search word "water" or double clicking on that word "water" in the line "life is like water" in the sketches screen and clicking the "Rhymes" button. The selected rhyme words are "slaughter", "sea otter" and "globe trotter". Now the user clicks again on "Song List". The song "They Can't Take That Away" is shown. The user clicks on that song and then clicks on the button "collected". A screen opens such as in FIG. 43 with "Rhymes" under the Collected Categories highlighted. The user clicks on Rhymes and the word "water" appears under the header "Searches" in the left hand side of the screen. The user then clicks on "water" and obtains the words collected in the lower portion of the screen "slaughter", "sea otter" "globe trotter".

Figure 9:
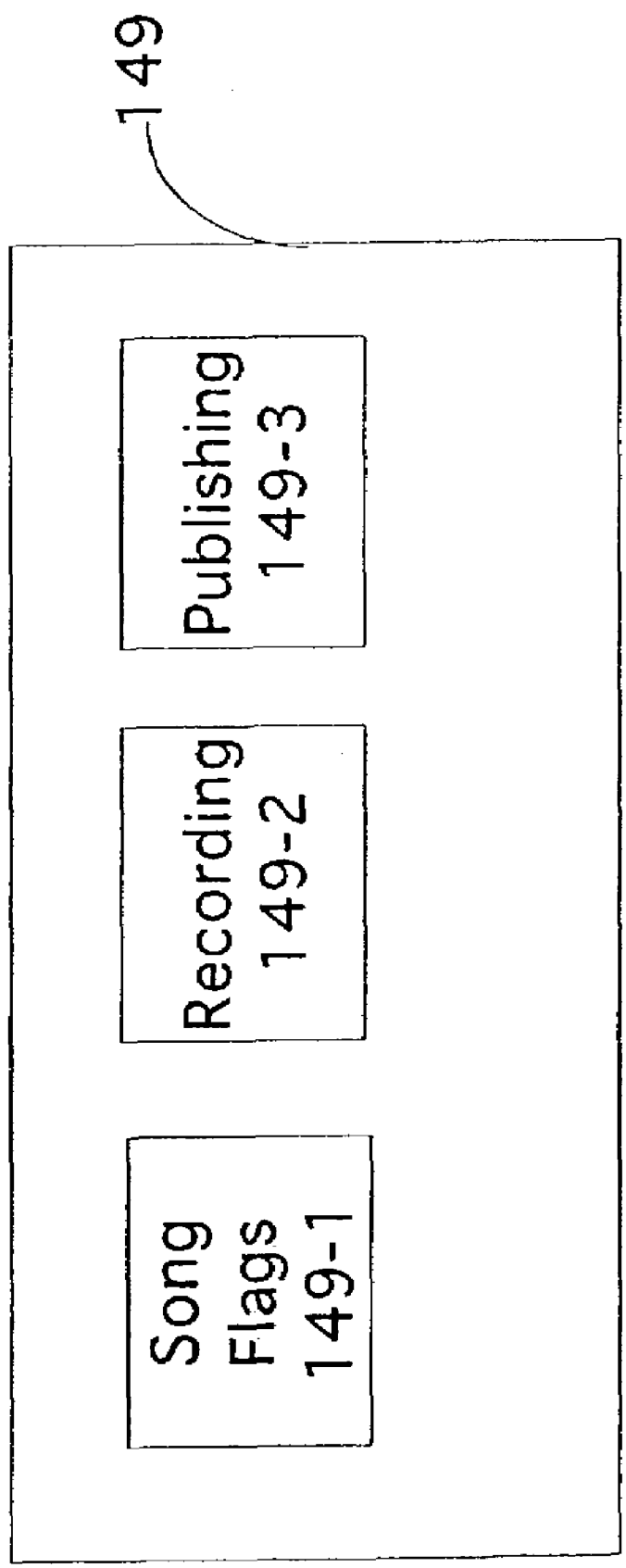
FIG. 9 is a graphical depiction of Song Information Files further broken into Song Flags, Recordings, and Publishing
Figure 10:
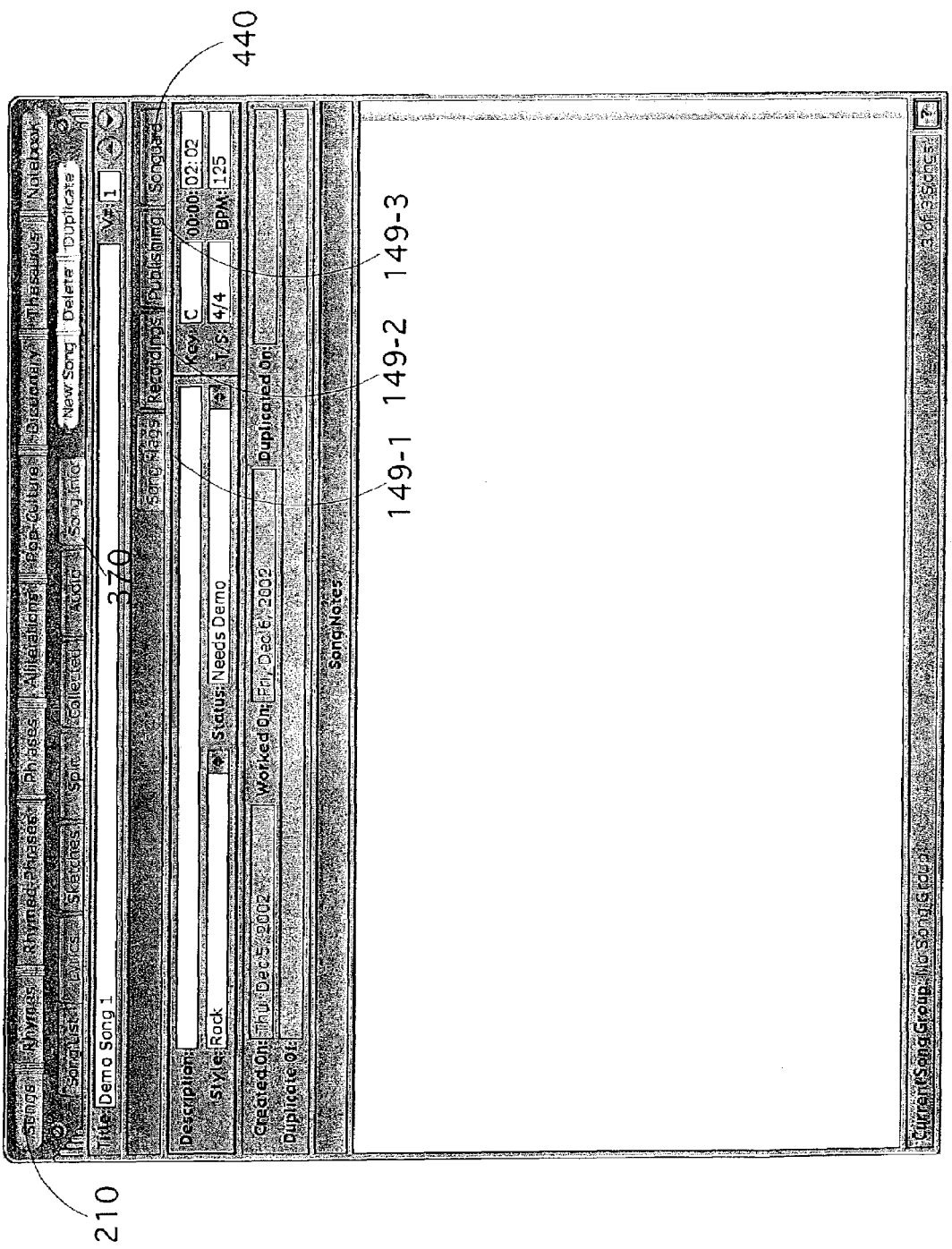
FIG. 10 is a computer screen shot illustrating an example graphical user interface where the Song Flags sub-category contains Description, Style, Status, Date of Creation, Date last worked on, Any Duplications, Key, Time Signature, Length, Beats per Minute and any Song Notes.

The Song Information Files 149 of FIG. 4 is further elaborated upon in FIG. 9. Song Information Files 149 may be further broken into sub-categories Song Flags 149-1, Recordings 149-2 and Publishing 149-3. The Song Flags sub-category 149-1 may contain any information that would be useful in cataloging the song. FIG. 10 illustrates an example graphical user interface where the Song Flags sub-category 149-1 is highlighted or clicked on. To have arrived at this screen, one would have clicked on Song Info 370. Once doing this, the screen of FIG. 10 would be achieved with "Song Flags" 149-1 having been highlighted. That screen offers enterable information such as Description, Style, Status, Date of Creation, Date last worked on, Any Duplications, Key, Time Signature (T/S), Length 9(00:00), Beats per Minute (BPM), and any Song Notes. In the Status field, information may be stored regarding the current status of the song's completion. Note in FIG. 10, that status is indicated as "needs demo". In the Key field, information may be stored regarding the proposed key for the song. The Song Notes area may be shared and displayed between the Song Flags sub-category 149-1, Recordings sub-category 149-2 and Publishing sub-category 149-3 of FIG. 9 as seen in FIGS. 11 and 12.

Figure 11:
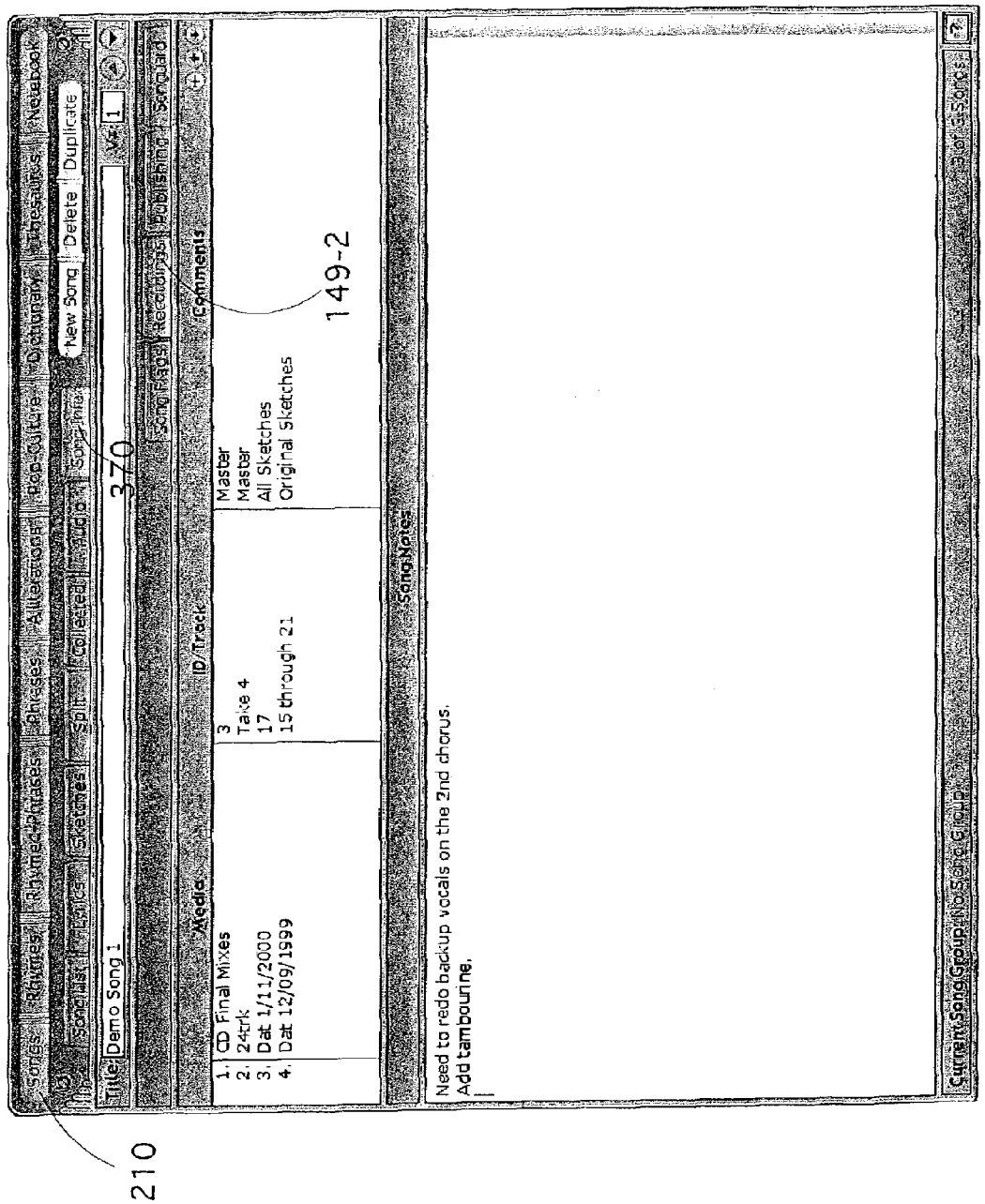
FIG. 11 is a computer screen shot illustrating an example graphical use interface where Recordings sub-category of FIG. 9 that contains any information that may be useful to catalog the recording of the song.

FIG. 11 illustrates an example graphical user interface where the Recordings 149-2 of the Song Flags of FIG. 9 has been clicked on for display. For Recording sub category 149-2, there is seen any information that may be useful to catalog the recording of the song including information on the media type, track information or ID information, and a comments area in addition to the Song Notes area which appeared for Song Flag 149-1.

Figure 12:
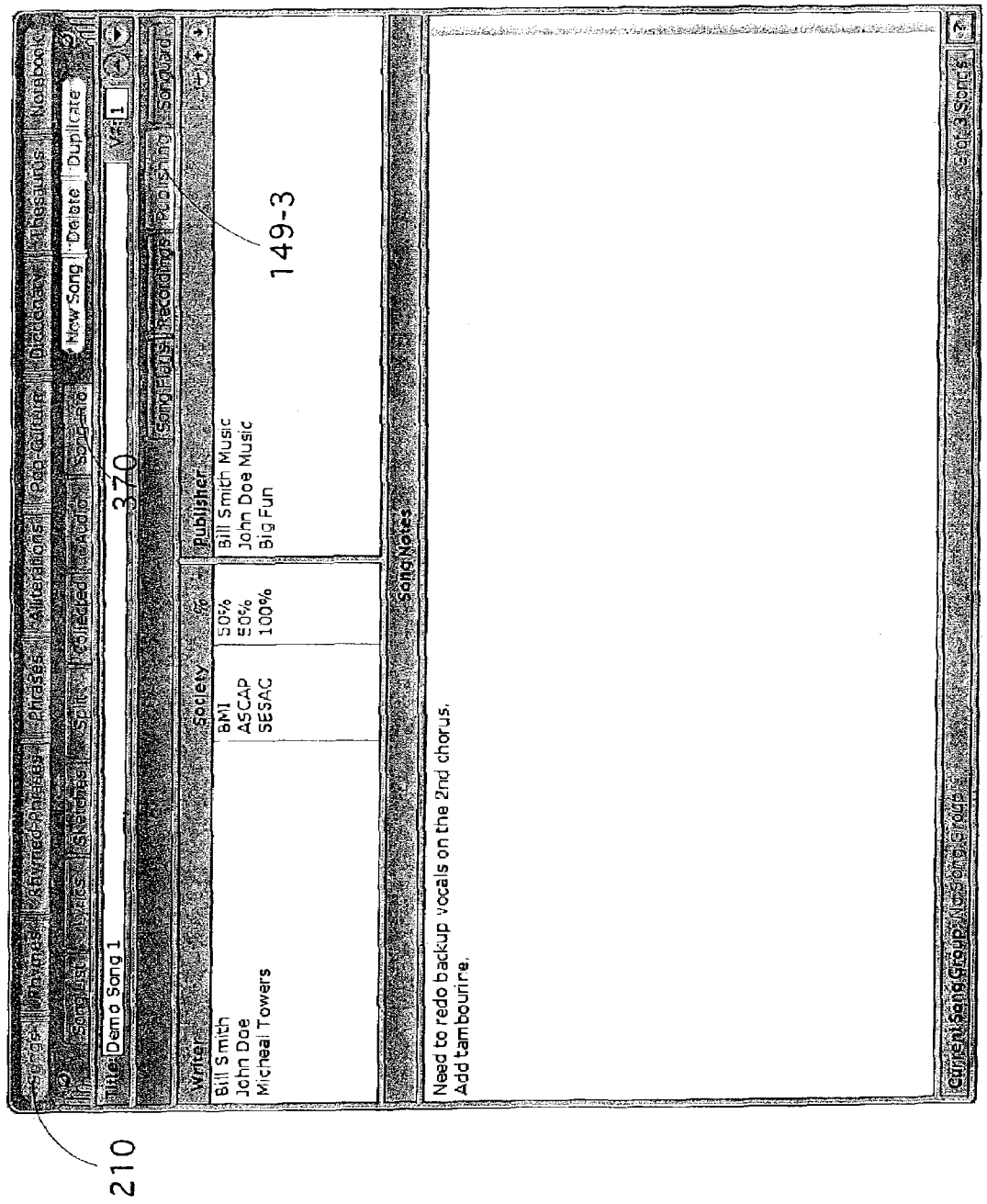
FIG. 12 is a computer screen shot illustrating an example graphical user interface where Publishing sub-category of FIG. 9 contains information important to the songwriter regarding the publishing of the song.

FIG. 12 illustrates an example graphical user interface where the Publishing sub-category 149-3 of FIG. 9 has been clicked on. It may contain information important to the songwriter regarding the publishing of the song such as the writer and publisher information, percentages and the Performance Society. This allows the writer to keep track of the creative information associated with the song as well as some practical information as well. Note as well that the Song Notes from Song Flags 149-1 is still shown.

Audio Module

Figure 13:
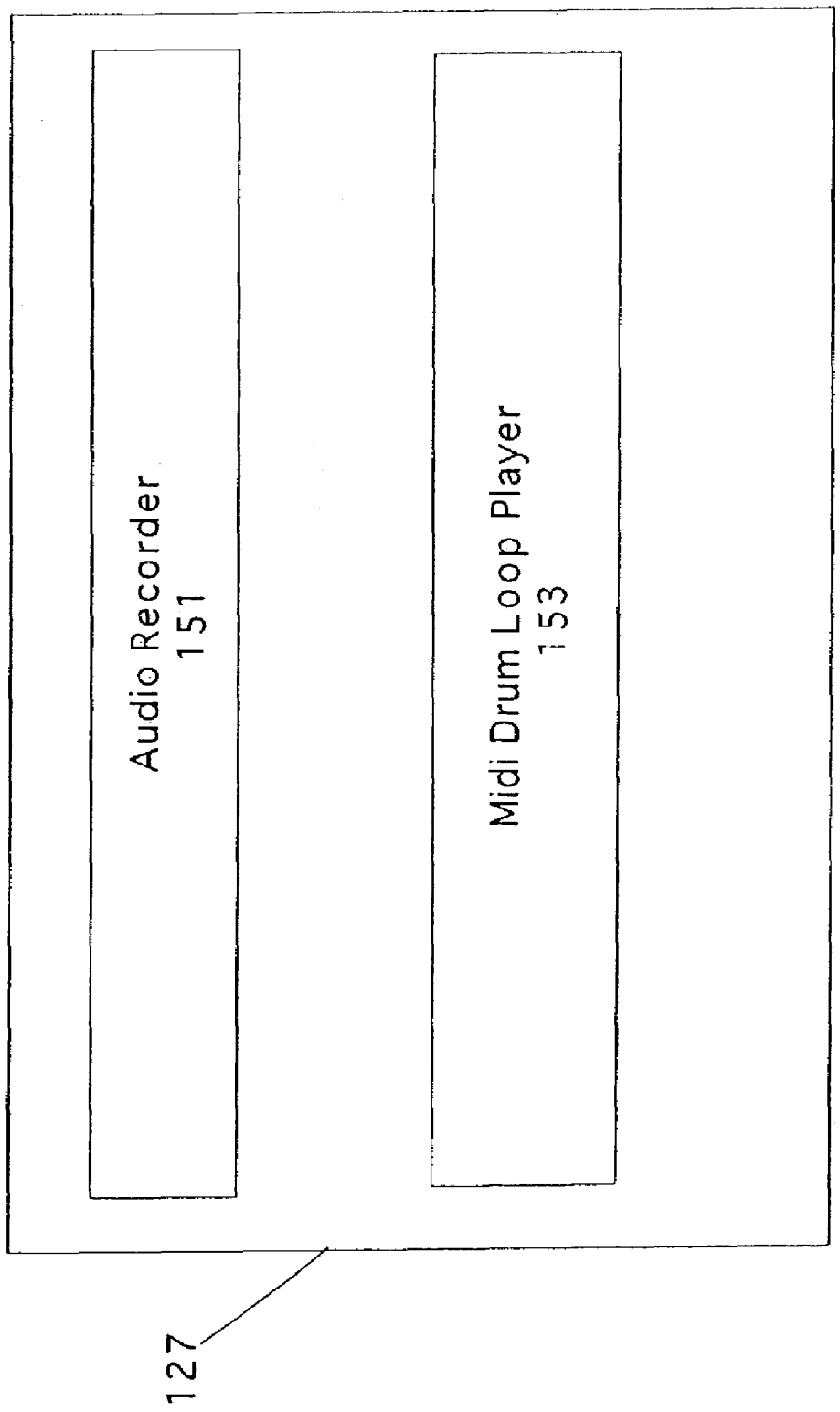
FIG. 13 is a graphical depiction of the Audio Module comprising an Audio Recorder and a MIDI Drum Loop Player.

Returning momentarily to FIG. 4, there is also included Selected Audio Tracks 148 as a subset of the Song Files 144 contained in the SIM 125. Recall that the Audio Module 127 of FIG. 2 accesses the SIM 125. This is through the Audio Track Files 148. The Selected Audio Track files 148 of FIG. 4 are created, modified and stored through Audio Module 127 of FIG. 2. As illustrated by FIG. 13, the Audio Module 127 comprises an Audio Recorder 151 and a MIDI Drum Loop Player 153. It could comprise even further aspects, such as bird sounds, violins, etc. The Audio Recorder 151 is preferably a stereo digital hard-disk audio recorder 151 with basic recording and playback features. The controls of the Audio Recorder 151, are shown graphically in FIG. 14 as buttons which may be clicked and are optionally graphically similar to those that you would find on a basic recording device: Record, Play, Pause, Stop and Rewind. To access the screen of FIG. 14, Audio tab or button 460 has been clicked.

Figure 14:
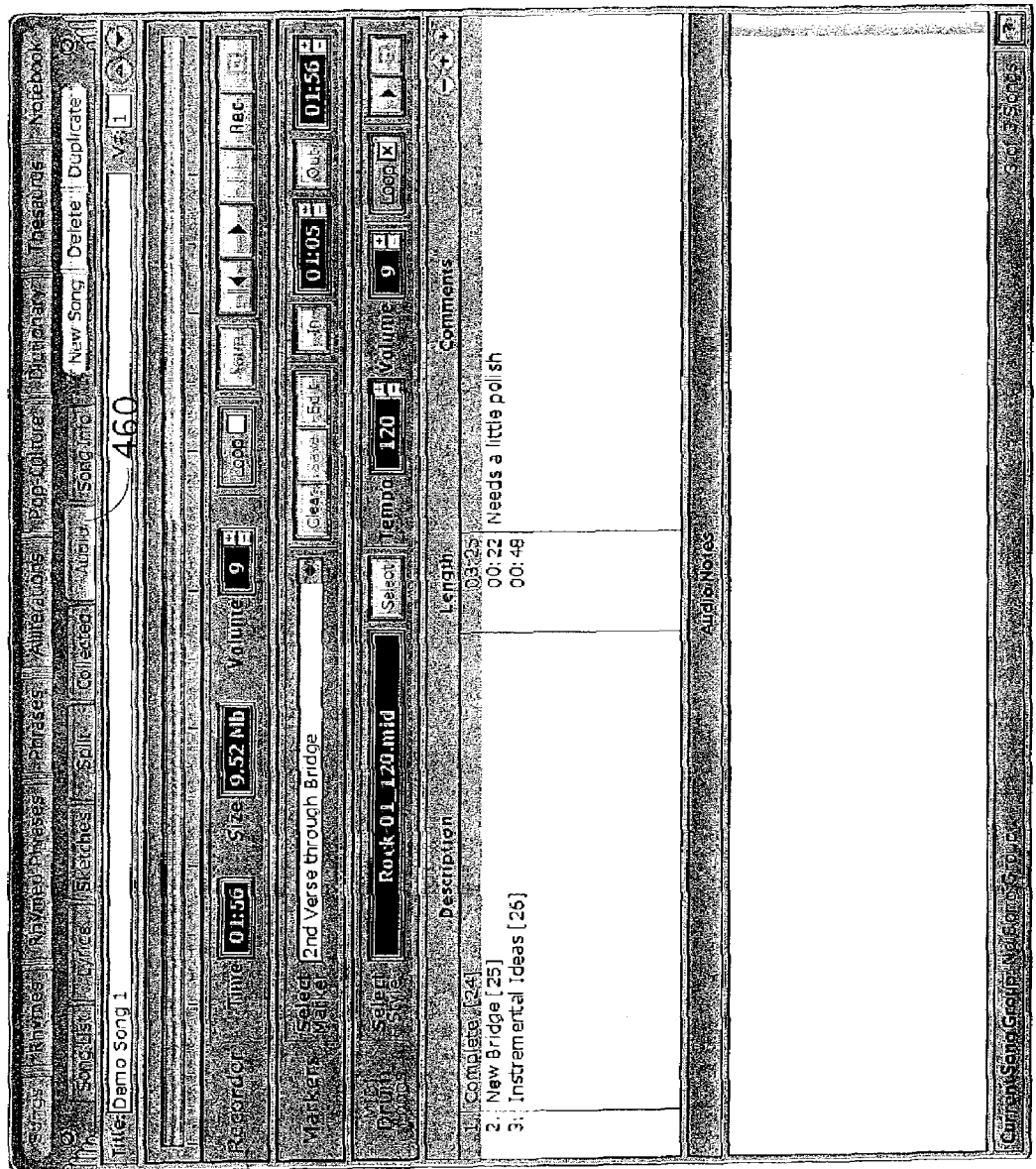
FIG. 14 is a computer screen shot depicting an example of a graphical user interface that may be used to access the Audio Module of FIG. 2 through Audio Tab.

FIG. 14 has as a top menu row containing Songs, Rhymes, etc. seen in the previous screen views; below that are the buttons, "Song List", "Lyrics", also seen in the previous screen views. Under this area however is the mock Audio Recorder with its row of time, size, volume, loop, forward and back arrows, loop, save and record. Under that is a Markers row to be discussed which gives a fill in portion to select the marker, clear, save edit, In and out. Below that is a row for the midi drum loops. It has an enterable select space, tempo, volume, loop and forward arrow. Below this is the main portion of the screen with a Description area, a length of song area, and a comments area. This is followed by a lower portion for audio notes.

Returning to the substance of what the screen of FIG. 14 portrays, the Audio Recorder 151 allows the user to record audio material via an external or internal computer microphone and once the material is recorded, to play the material back. The user may also import external audio files including but not limited to: MP3, AIFF, WAV, and Quicktime. The benefit of the Audio Recorder 151 is that it stores the recorded material as individual audio files in the Selected Audio Tracks 148 of FIG. 4. This allows the user to associate an individual audio file with an individual song to which it belongs. Note in FIG. 14, Demo Song 1 appears in the Title portion and is associated with the material thereunder.

In addition to the normal playback mode of the Audio Recorder 151, the user may utilize markers to select a specific in and out point for playing a specific area of a song. Thus, utilizing a loop function, the user can select a section of the audio recording to replay continuously. These options are all seen in FIG. 14 as above noted, with the "Markers" row containing an "In" point and "Out" point. The marked point is also identified next to "select marker" as "$2^{nd}$ verse through bridge". A display area, that is the main portion of the screen headed by the words "description", "length" and "comments" is available to organize the number of tracks recorded along with any pertinent information. In FIG. 14, the reader will see that three melodies are reviewed with the second being noted as needing "a little polish". These, as just noted, have all been associated with Demo Song 1 for which lyrics and sketches exist or can be made to exist.

The Midi Drum Loop player 153, also graphically seen in FIG. 14 as well as denoted in FIG. 13, allows a user to play a collection of Midi Drum Loops that can be selected according to style, type and tempo desired. A songwriter may find the use of the Midi Drum Loops 153 particularly helpful when trying to create a type of "groove" or musical feel to the song they are composing.

A Stereo Track may be added to the Selected Audio Tracks 148 of FIG. 4. A user may then utilize the MIDI drum loop player 153 to play selected audio tracks from the Selected Audio Tracks 148. This results in providing the ability for the user to use the Audio Recorder to recorder his/her voice along with the selected audio track being played by the MIDI drum loop player. Thus, the user can record the music along with the lyrics to truly get a feel for the song.

Again, the workings of FIG. 14 are readily accomplished with current technology by those skilled in the art.

Notebook Module

Figure 15:
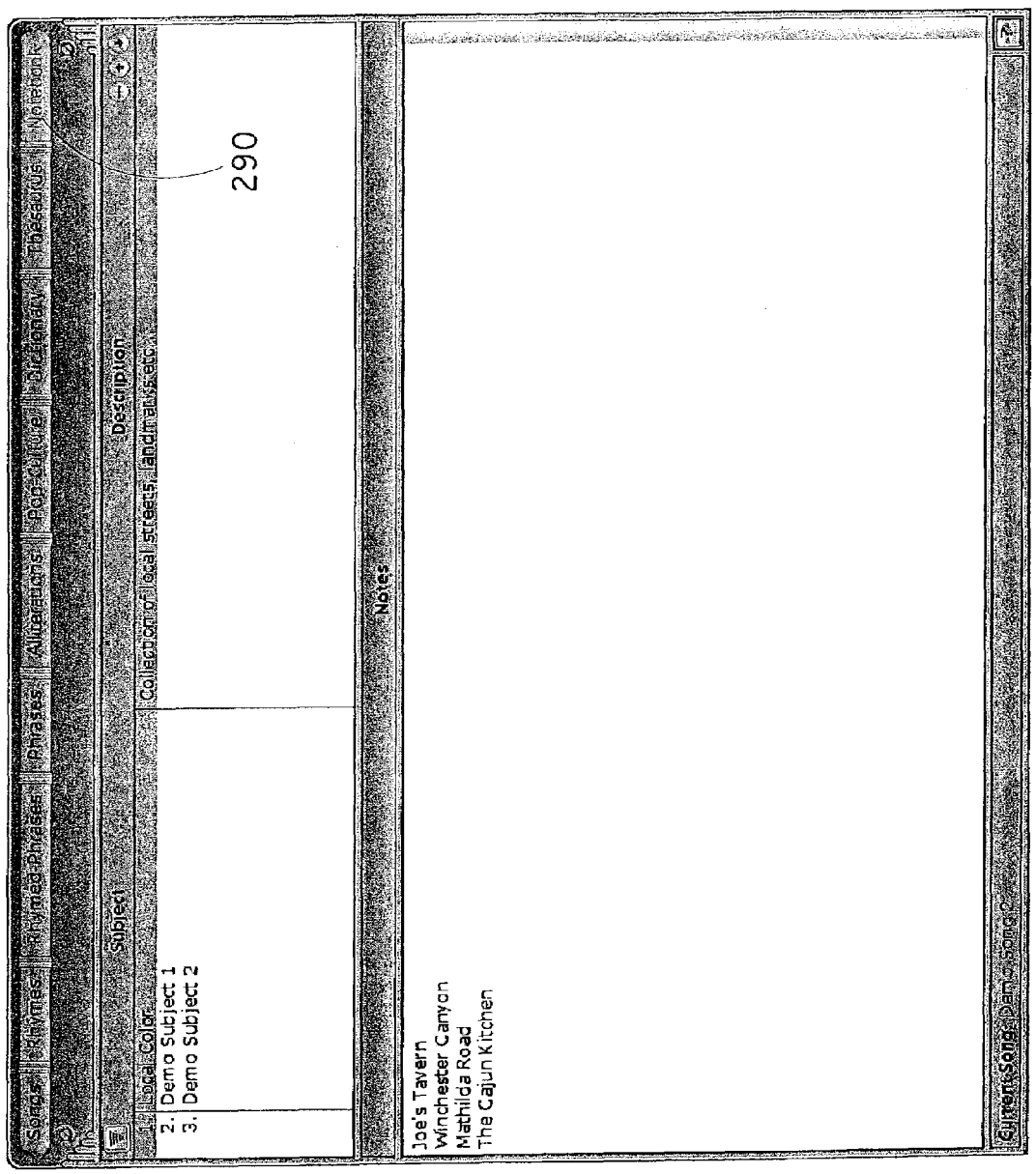
FIG. 15 is a computer screen shot depicting an example of a graphical user interface that may be used to access the Notebook module of FIG. 2 through a Notebook menu.

Returning again to FIG. 2, the Notebook module 123 is now discussed. Notebook module 123 is an optional software module and is an area where a user can create categories and list any information that the user desires. The Notebook module is meant to be a means to record thoughts and ideas of the user. While most often this will be written notes, it could as well be graphics, photographs, sounds, and the like. FIG. 15 depicts an example of a screen or graphical user interface that may be used to access Notebook module 123 of FIG. 2 through clicking on Notebook button or tab 290. As seen in FIG. 15, Notebook module 123 of FIG. 2 is comprised of a Subject area, a Description area for organizational purposes, and a section for Notes. The bottom margin lists "Current Song" and in this instance, showing next to this entry is "Demo Song 2". (In preceding screens, the bottom margin listed "Current Song Group" and most often "none" was identified as the song had not been assigned a song group.) Thus the Notes of FIG. 15 pertain to Demo Song 2. Of course, it is within the contemplation of this writing that the Notebook be searchable and sortable regardless of the song to which the entries were made. Thus if one were in Prague and taking notes generally, the notes could be earmarked as "Prague Notes" and when a sorting function were used, by entering perhaps foreign countries, the entries for Prague would be earmarked.

As is now apparent, the Notebook module 123 of FIG. 2 is an idea storage place. For example, a user wants to write a song or poem with local flavor. Therefore, the user, accompanied by a laptop, goes out on the town and observes the restaurants, street names, and other landmarks. The user can then make notes of interesting names through clicking on in the Notebook button 290 of FIG. 15. They might also take pictures of these places, make recordings of these places and download information about these places all of which can be entered into the Notebook and again sort functions and search functions are contemplated to better access the information in this Notebook as well as the association of Notebook entries with specific songs.

Songuard™ Module

Figure 16:
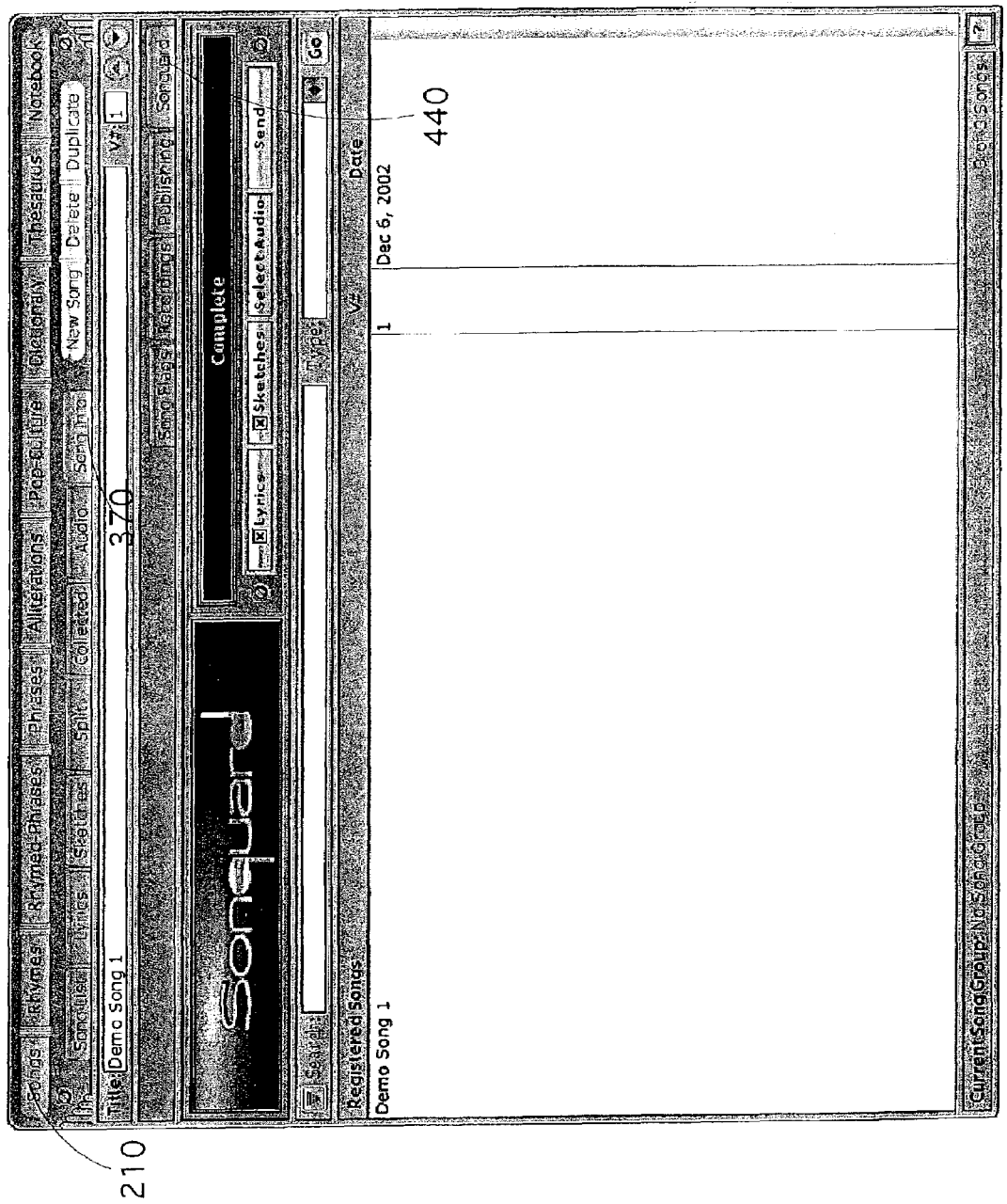
FIG. 16 is a computer screen shot depicting an example of a graphical user interface that may be used to allow the user to select the lyrics, sketches, and audio files for sending to a remote main data storage area over the network.

Songuard™ module is an online, date-of-creation, registration service. Through the Songuard module the user has the ability to register lyrics, audio recordings, and writer and publisher information with an online storage company by means of an online transmission which is validated with a digital signature and digitally date-stamped. This information is stored and is available to the user when and if the user should need it. Upon receipt of this transmission, a confirmation is sent to the user. This procedure is accomplished by selecting Lyrics Files 143 of FIG. 4 and/or Sketches files 145 of FIG. 4, selecting an Audio track the user wishes to send from the Selected Audio Track Files 148 of FIG. 4, and sending these files to a main data storage area over a network. The writer and publisher information is automatically transmitted. FIG. 16 depicts an example of a graphical user interface that may be used to allow the user to select the lyrics, sketches, and audio files for sending to the remote main data storage area over the network. Note that under the word "Complete" the boxes for Lyrics and Sketches are both checked and the select audio button is highlighted. Note also the songuard button 440 has been clicked. The user has sent a copy of the Lyrics, Sketches, and an Audio track for the Demo Song 1 through the SONGUARD program. That sending has been confirmed as received by the dated of Dec. 6, 2002 appearing on the screen as seen in FIG. 16. The selected files are stamped with a digital signature and digital timestamp before being sent to the remote main data storage area.

Databases Overview

As now is clear to the reader, the present program enables a person to search words in various databases either independently or through the writing of sentences and the highlighting of words in those sentences. These databases, which hold the dictionaries or references and the filters used with these databases to select certain elements from them are now described.

Figure 17:
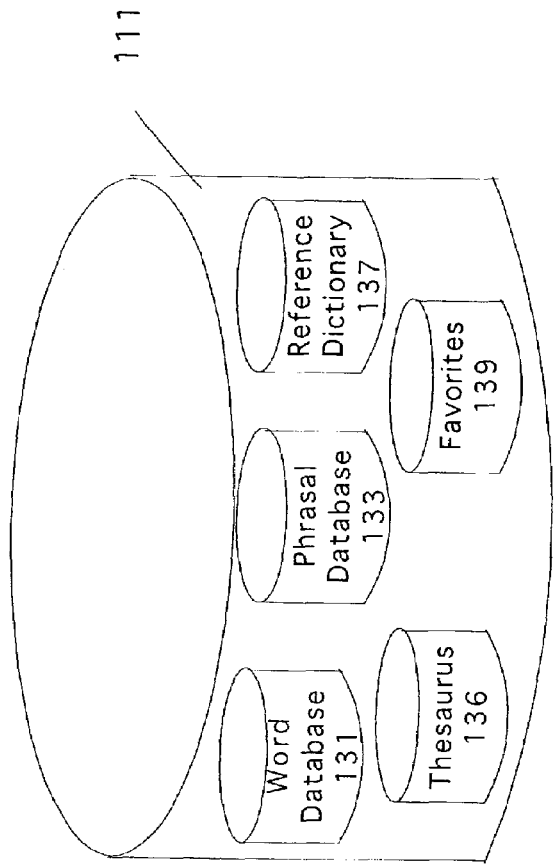
FIG. 17 is a graphic depiction of the Databases comprising a number of reference tools such as a word database, a phrasal database, a thesaurus, a reference dictionary, and a Favorites database.
Figure 19:
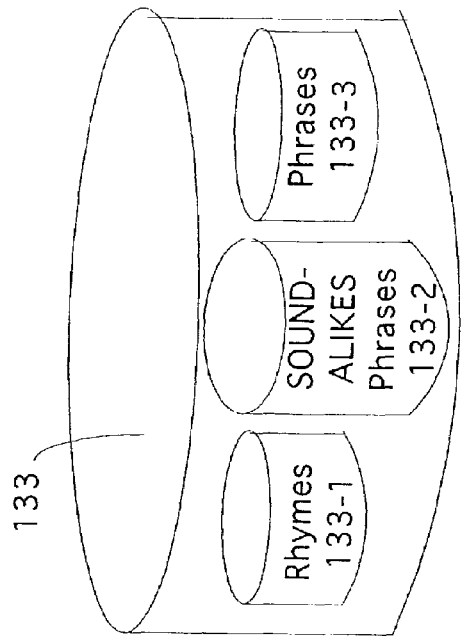
FIG. 19 depicts an illustration of how the reader may imagine the Phrasal Database 133 of FIG. 17 as actually being broken down into three separate databases: a Rhymed Phrasal Databases, SOUND-ALIKES Phrasal Database and a Phrasal/Cliché/Sayings/Word Combinations Database.
Figure 18:
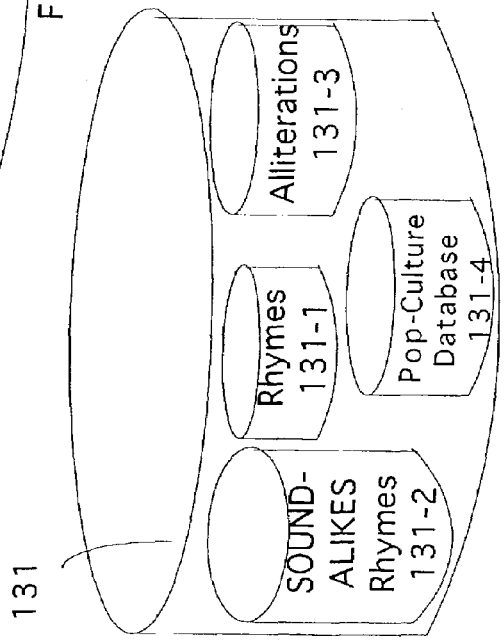
FIG. 18 depicts an illustration of how the reader may imagine the Word Database of FIG. 17 as actually being broken down into four separate databases: Rhymes database; SOUND-ALIKES database; Alliteration database and Pop-Culture database.

Turning again to FIGS. 1 and 2, search engine module 121 preferably includes a graphical user interface that allows a user to search Databases 111 which is comprised of the reference tools or dictionaries earlier presented in this paper, A writer can use these tools to find the best words to complete a song or work. FIG. 17 illustratively depicts the make up of Databases 111. There it is seen that Databases 111 comprises a number of reference tools such as the word database 131, the phrase database 133, a thesaurus 136, a reference dictionary 137, and a Favorites database 139. One skilled in the art will appreciate that there are many additional reference tools that can be added to or substituted for the set of Databases 111 provided in FIG. 17. Some such databases could be mathematical formulae, scientific conversions, colors on the color wheel, etc. The relationship of these Databases 111 will be further explored with a view to FIGS. 20 and 21. However glancing quickly to FIGS. 18 and 19, it is seen that the dictionaries Rhymes 131-1, 133-1 and SOUND-ALIKES 131-2, 133-2 are both sub data bases of the Word Database 131 and the Phrase Database 133. Pop-Culture 131-4 and Alliterations 131-4 are also sub data bases of the Word Database 131 and Phrases 133-3 is a sub data base of the Phrase Database 133. Thus a search of the Word Database 131 searches as well all of the sub data bases related to it are shown in FIG. 18. A search of the Phrase Database 133 searches as well all of the sub databases related to it as shown in FIG. 19.

Figure 20:
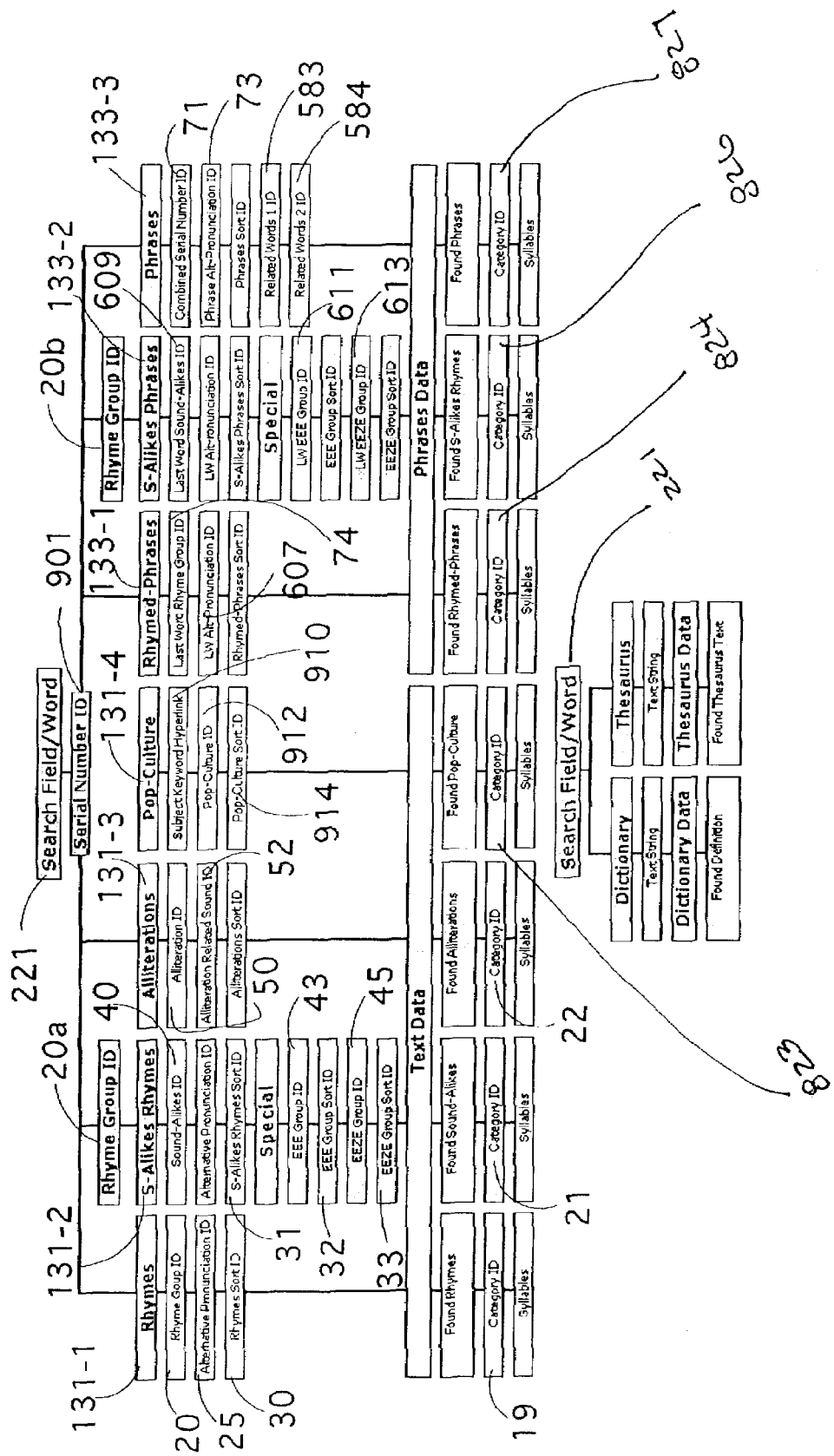
FIG. 20 depicts a flow chart of the plurality of IDs that are associated with each phrase in the Rhymed Phrasal Databases, SOUND-ALIKES Phrasal Database and a Phrasal/Cliché/Sayings/Word Combinations Database
Figure 21:
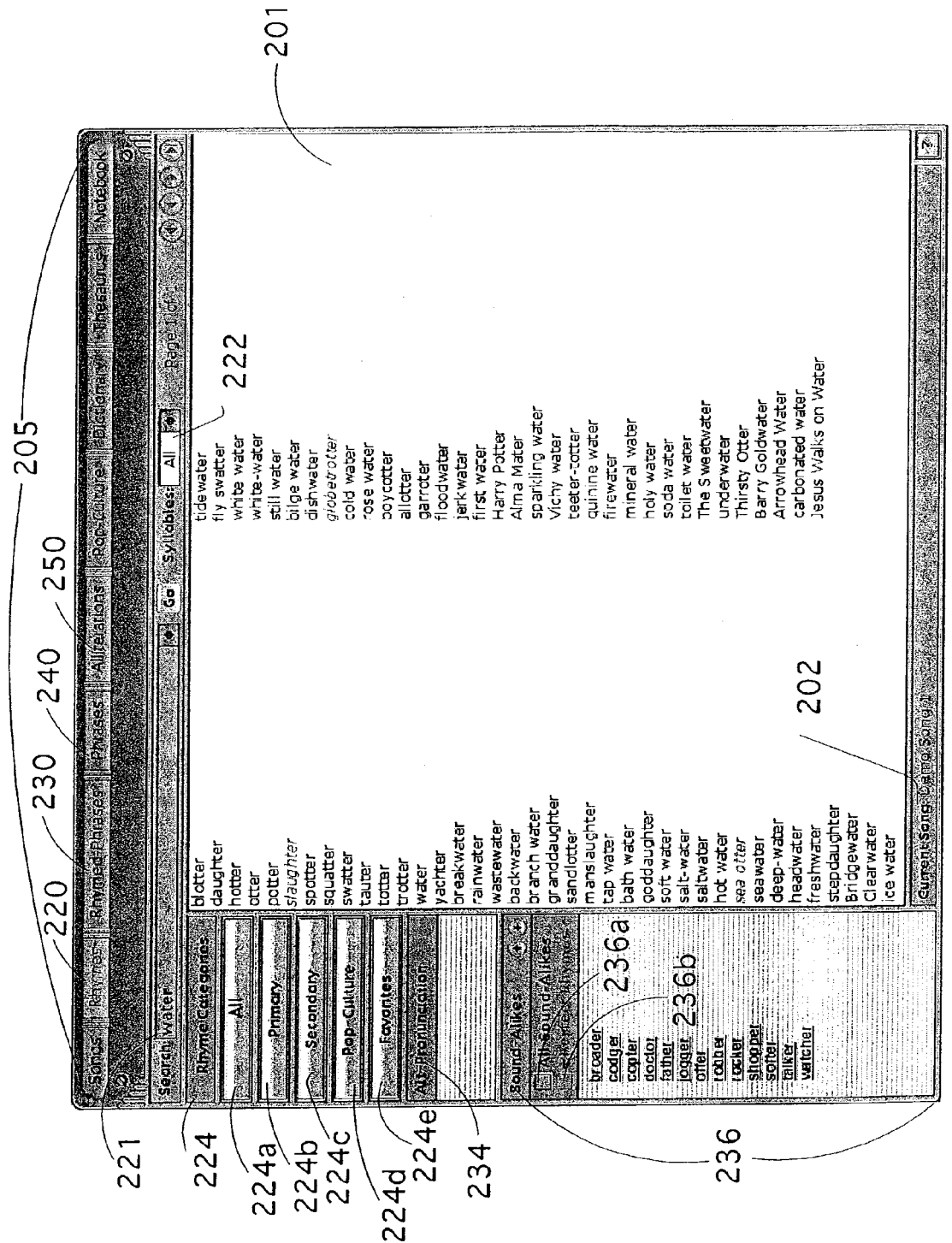
FIG. 21 is a computer screen shot illustrating an example of a graphical user interface into Rhymes Database of FIG. 18.

FIG. 20 is a flow chart of the manner of searching words. FIG. 21 is another graphical interface or screen. It is the sort of screen that might be used when one is searching the data bases for the word "water" as seen in the searched word in that figure. In FIG. 21 this is being done in conjunction with the SIM module. Note in FIG. 21 that the top menu bar 205 and the bottom bar 202 parallel the information of previous screens, In FIG. 21 that bottom bar refers to the current song which is Demo Song 1. The remainder of the screen contains a search line 221 for entering the word searched, and a syllables designator 222 to place emphasis on the syllables to be shown in the results, Below this search line, the screen is broken into a main or primary 201 portion with a side smaller section containing buttons for rhyming filters (All 224*a*, Primary 224*b*, Secondary 224*c*, Pop Culture 224*d*, and Favorites 224*e*), for the manner of pronunciation 234, and for SOUND-ALIKES 236 words. The main portion 201, of the screen is reveals the words found. These sections are now further discussed.

Queries

Studying FIGS. 20 and 21 further, the reader will see that a word is entered into the search field. In FIG. 21, that word is "water". Looking now at FIG. 20 and FIG. 2, the search engine module 121 of FIG. 2 queries the Word Database 131 of FIG. 17 to see if the search word "water" is in the database. If it is, it will carry an identification number or Serial Number ID. The search engine module 121 uses the Serial Number ID 901 of FIG. 20 assigned to the text string for "water" to the databases for that entry. This is clearly seen in FIG. 20 as 901 links into the Rhyme Group ID 20*a* and 20*b*, Rhymes 131-1, Alliterations 131-3 etc. However, in one embodiment, the search engine module 121 of FIG. 2 uses the text string rather than the ID number to locate entries in the Reference Dictionary 137 and Thesaurus 138 of FIG. 17. This is because an over the counter thesaurus and dictionary have been inputted and have words not in the other dictionaries or references. Those words have not been assigned ID numbers. This is depicted in FIG. 20 where the Dictionary and Thesaurus are searched separately with the use of the "Search Word" whereas the other databases are searched with the use of "Serial Number ID" 901. One skilled in the art will appreciate that the use of the Serial Number ID 901 results in faster response time because number searches are typically faster than text string searches. Accordingly, assigning words in the Data Bases results in a faster system. Thus, one skilled in that art will also realize that modifying an over the counter database to include ID numbers would facilitate searching these databases. As just noted, in FIG. 20, it is seen that the Serial Number ID 901 links directly into Rhymes 131-1, Rhyme Group ID 20*a*, Alliterations 131-3, Rhymed Phrases 133-1, and Phrases 133-3. One skilled in the art will appreciate that while the Pop-Culture database 131-4 can be seen as a separate database, words associated with Pop-Culture are also included in the Rhymes database 131-1, the SOUND-ALIKES database 131-2 and the Alliterations database 131-3.

Figure 45:
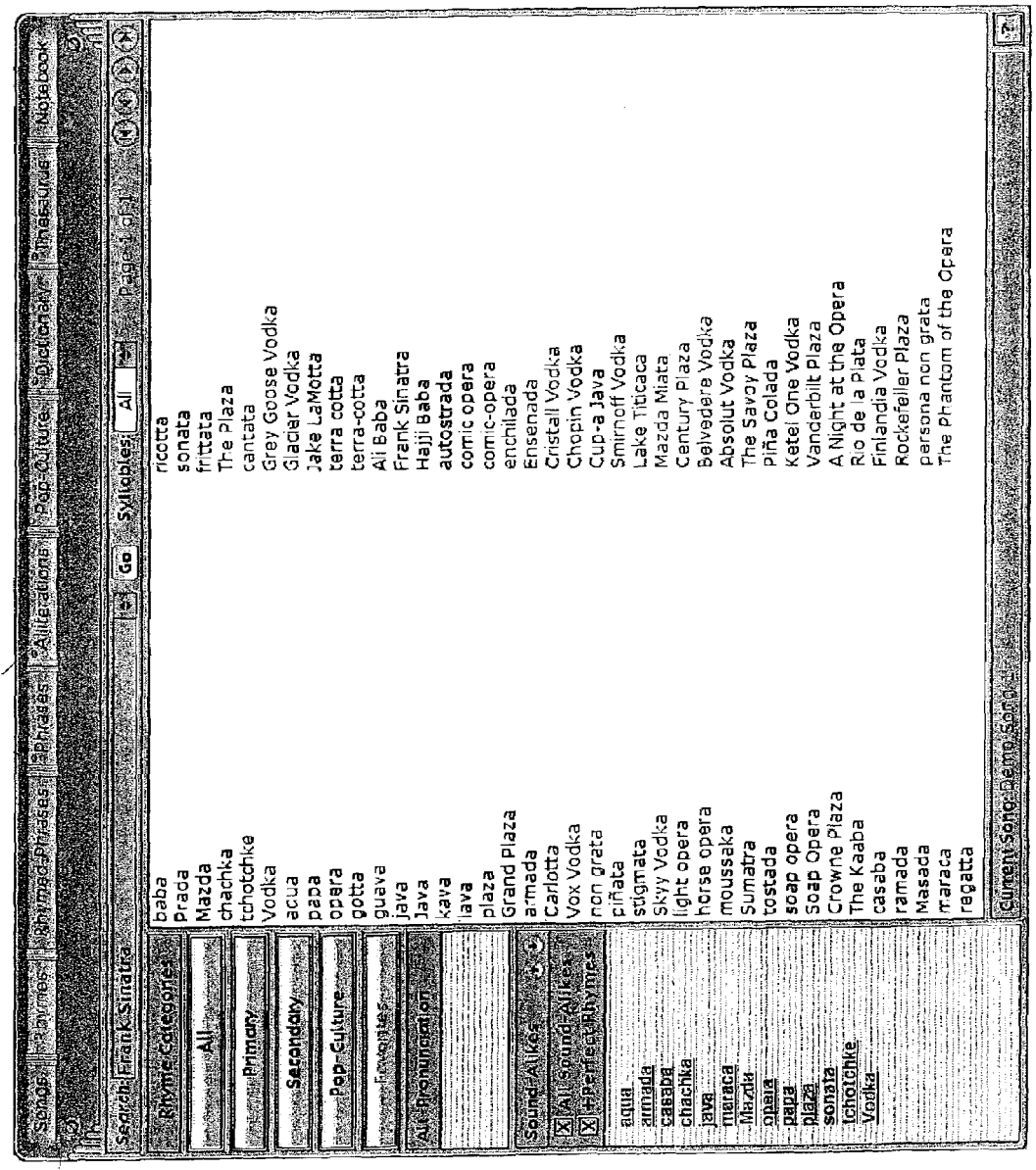
FIG. 45 is a computer screen shot depicting a notification feature consisting of a red oval with a minus sign is displayed to let the user know there are no results for the current search text in that dictionary.

The search engine module 121 preferably searches each database. If a database does not contain a valid result the user is notified preferably by an icon indication next to the database. In one embodiment, shown in FIG. 45, a red oval with a minus sign 451 is displayed to let the user know that there are no results for the current search text in that dictionary. The reader will note in FIG. 45 in the top menu bar that notification feature next to the buttons Alliteration, and Phrases. This saves the user time by allowing the user to quickly glance, to see if there are any results instead of the user having to select each database to determine if results were found. For purposes of clarity only FIG. 45 is quickly reviewed. It shows a screen in which the data base Rhymes in the top menu bar is highlighted. All SOUND-ALIKES and + perfect rhymes in the left side bar area are also checked providing an output below of words for the user to consider. Those words begin with "aqua" and "armada". The words entered in the Search filed are "Frank Sinatra. In the main portion of the screen which is not restricted to perfect rhymes and SOUND-ALIKES, are words such as "baba" "Prada" "Mazda". This list includes the perfect rhymes and the SOUND-ALIKES words "aqua", "armada" and "casaba Word Database Turning back to FIG. 17, the Word Database 131 is designed to comprise a large collection of words. One of the challenges of providing a large collection of words is to provide a user with a quick response time to a variety of different types of queries. FIG. 18 depicts an illustration of how the reader may imagine the Word Database 131 of FIG. 17 as actually being broken down into four separate databases: Rhymes database 131-1; SOUND-ALIKES database 131-2; Alliteration database 131-3 and Pop-Culture database 131-4. The Pop-Culture database 131-4 is a collection of words that reflect the icons of American and World Pop-Culture. Returning to FIG. 20, one can see an exemplary depiction of the plurality of ID that are associated with each word in the Rhymes database 131-1, the SOUND-ALIKES database 131-2, the Alliterations database 131-3 and the Pop-Culture database 131-4. Each ID, such as 20, 25, and 30, 71, 73, etc. allows the search engine module 121 of FIG. 2 to quickly find, sort and display words that match a given query. These IDs will be discussed yet again as we continue to review FIGS. 17 through 21.

Rhymes Database

Searching in the Rhymes database 131-1 will display the perfect rhymes for the word being searched. Turning back to FIG. 20, the reader is directed to Rhyme Group ID 20, which is a unique number that is assigned to a unique rhyme group. A Rhyme Group is comprised of words that have been grouped together by their phonetic sounds. They are also known as perfect rhymes. Because the words "water", "daughter" and "Harry Potter" are perfect rhymes, they will belong to the same Rhyme Group and thus have the same Rhyme Group ID, ID 20.

FIG. 21 illustrates an example of a graphical user interface screen into Rhymes Database 131-1 of FIG. 18. In FIG. 21, the Rhymes button 220 is selected from menu bar 205. Clicking on Rhymes button 220 allows the user to begin using search engine module 121 of FIG. 2 to search the Rhymes Database 131-1 of FIG. 18 for perfect rhymes. A user enters a search word in the search field 221 and begins the search. In FIG. 21, that word is "water". As discussed above, the search engine module 121 of FIG. 2 preferably determines if the search word has a Serial Number ID 901 of FIG. 20. If a Serial Number ID 901 is found, the search engine module 121 of FIG. 2 locates the Rhyme Group ID, ID 20 of FIG. 20 in the Rhymes Database 131-1 to see if the current search word belongs to a Rhyme Group. If the word doesn't have a serial # ID, the system has to be programmed to deal with that. If the current search word belongs to a Rhyme Group, the search engine module 121 finds all of the words in the Rhymes Database 131-1 that have the same Rhyme Group ID, ID 20 as the current search word, and prepares the words for display to the user in main display window 201 of FIG. 21. Thus, main display window 201 in response to a search of the word "water" contains words such as "blotter", "yachter", "boycotter" and "Alma Mater". (It is of note that when searching a term, the system also looks for SOUND ALIKES words which are words that are not perfect rhymes. In the search of "water" these are found as seen in FIG. 21 in the side bar section 236. If the user the clicks "All SOUND-ALIKES" 236a, the main screen will change to show all of the rhyming words that are similar. If the user also clicks +Perfect Rhymes 236b, the main portion of the screen will show both the perfect rhyme words and the SOUND ALIKES words.)

Other rhyming dictionaries are sorted first by syllable and then alphabetically. However, rhymes are based on phonetic sounds from right to left. Further, the sorting of the rhymes alphabetically is in direct contradiction of the definition of a rhyme The Rhyming Data base herein sorts from right to left. The words in the Rhymes Database 131-1, shown in FIGS. 18 and 20, have been pre-sorted and assigned a Rhymes Sort ID 30 of FIG. 20 to increase the speed of the sorting process and to allow the words to be displayed in a special phonetic sort order. The special phonetic sort order creates rhyming groups within the main list of rhymes. The phonetic sort order algorithm first sorts the words by syllables. All one-syllable words are grouped and displayed alphabetically. Next, two syllable words are sorted by syllable one's sound. The two syllable words are further sorted by syllable one's consonant and then alphabetically. Three syllable words are sorted by syllable one's sound, then by syllable two's sound, then by syllable one's consonant, and then alphabetically. Four plus syllable words are sorted by syllable one's sound, then by syllable two's sound, then by syllable three's sound, then by syllable one's consonant and then alphabetically. The words displayed in FIG. 21 illustrate this special phonetic sort order.

In FIG. 21, with the search word "water" the words which rhyme with this word are displayed according to the special sort order placing all one-syllable words first in alphabetical order. In the case of water, there are no one syllable words that rhyme with water. The special sort order displays two-syllable words based on syllable one's sound. This results in the list of two syllable words displayed in main display window 201 beginning with "blotter" and ending with "yachter". The words "blotter" through "yachter" all share the same syllable one's sound of "a". Since they all have the same syllable one's sound they are next sorted alphabetically.

Looking to the three syllable words displayed in FIG. 21, the special phonetic sort order is clearly seen. The first three-syllable word listed is "breakwater" followed by rainwater, wastewater and backwater. In a traditional, i.e. alphabetic, sort order, these words would be listed with backwater first. However, three syllable words are sorted by syllable one's sound first. Syllable one's sound for breakwater is "long a", syllable one's sound for rainwater is "long a", syllable one's sound for wastewater is "long a", and syllable one's sound for backwater is "short a". So, breakwater, rainwater, and wastewater are grouped together because they have the same first syllable sound. Breakwater, rainwater and wastewater have the same second syllable sound. Breakwater's syllable one's consonant is "br", rainwater's syllable one's consonant is "r" and wastewater syllable one's consonant is "w". The words are then sorted by syllable one's consonant sound. Thus, the result is breakwater is separated from backwater by the words rainwater and wastewater. Therefore, the words are organized in a unique manner that further facilitates a user finding the word that best completes her poem or lyric.

The search engine module 121 of FIG. 2 does not only display words that rhyme with the current search word, the search engine module 121 it also automatically suggests words that a user might want to search on in addition to the current search word. Referring back to FIG. 20, the search engine module 121 checks the Alternative Alternative Pronunciation ID 25 to determine if the current search word has any alternative pronunciations. But, for the word "water" there is none and therefore none is shown in FIG. 21 at 234 Alt Pronunciation.

Following now, are two examples of ways in which a word may have an alternative pronunciation. First, the word may be spelled the same but pronounced two different ways. For example, the word "tear" can be pronounced by phonetic sound "ear" or phonetic sound "air". Thus, the rhyme for which a user would be searching would depend on the way the word is pronounced. The second way a word may have an alternative pronunciation is if the word has a slang pronunciation. For example, the word "making" is pronounced "maa-king" but when the "g" is replaced with an apostrophe the word is makin' pronounced "maa-kuhn". Thus, by using the slang of the current search word other rhymes may be provided to the user. One skilled in the art will appreciate that the presentation of a slang alternative pronunciation may greatly increase the words available to the user.

Figure 22:
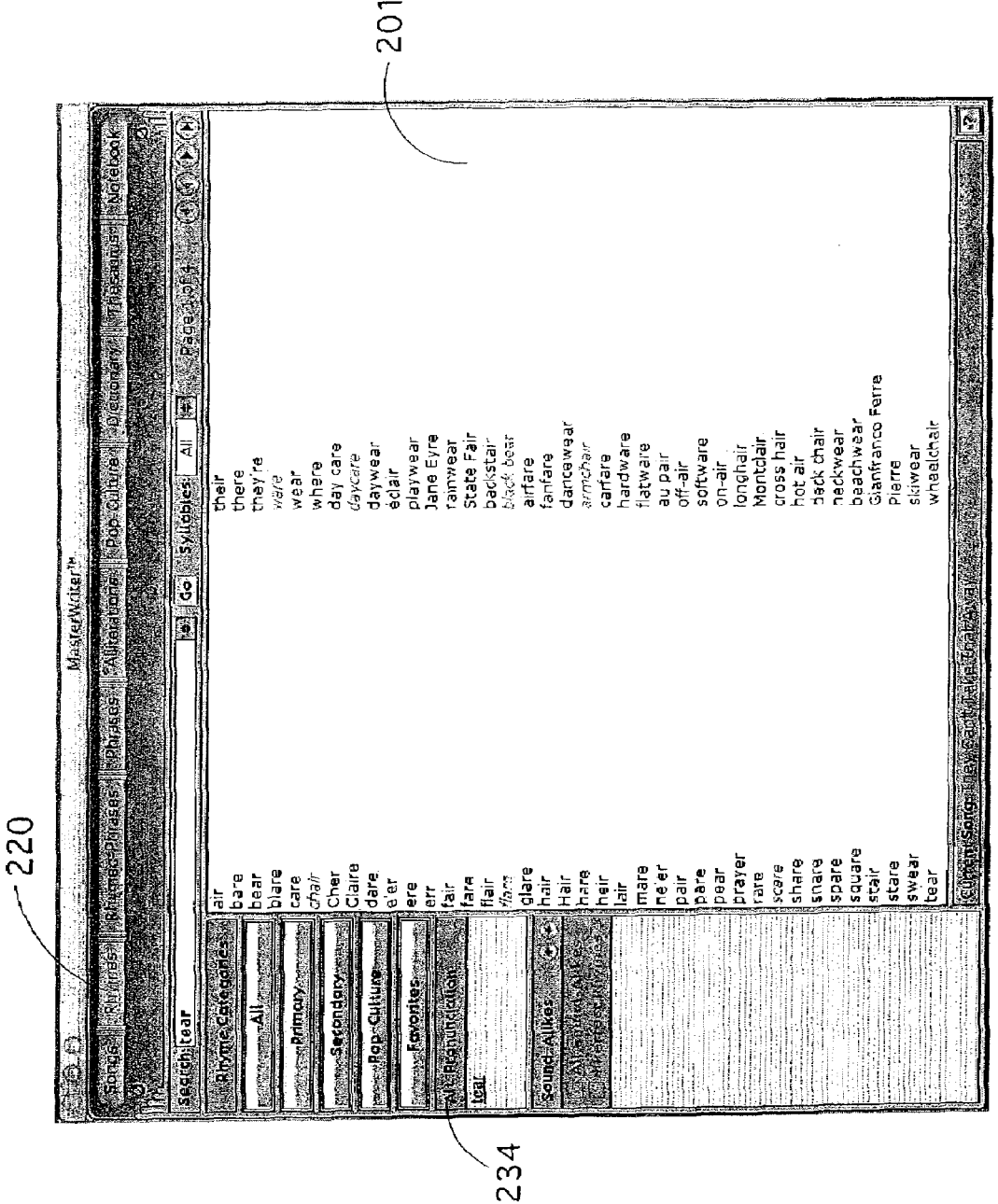
FIG. 22 is a computer screen shot illustrating how alternate pronunciations may be displayed the Alt-Pronunciation window.
Figure 23:
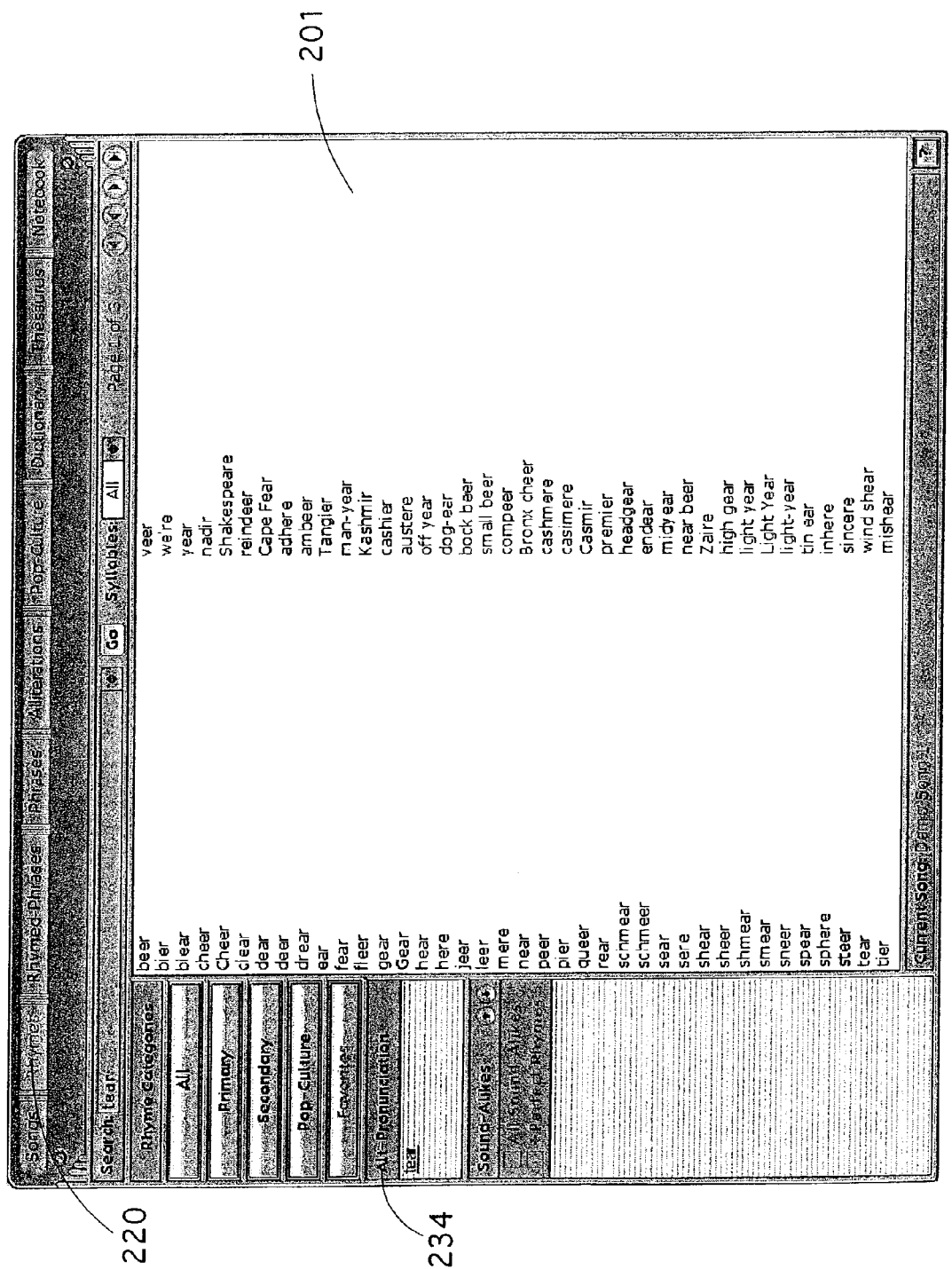
FIG. 23 is a computer screen shot illustrating words that rhyme with the second pronunciation of the word "tear", such as beer, tier, veer and New Year.

FIG. 22 illustrates how alternate pronunciations may be displayed in the Alt-Pronunciation window 234. The current search word is "tear". The word "tear" has two pronunciations: i) one with a short "e" which is a verb meaning to rip, and ii) the other with a short "i" which is a noun meaning a drop of liquid from an eye. If a user enters the word "tear", the search engine module 121 of FIG. 2 will first return words from Rhymes Database 131-1 of FIG. 18 that rhyme with one of the pronunciations of the word "tear", such as "air", "bare", "their", "Pierre", and "wheelchair" as shown in main display window 201 of FIG. 22. The user can select the word in the Alt-Pronunciation window 224 and the search engine module 121 of FIG. 2 will return words from Rhymes Database 131-1 of FIG. 18 that match a second pronunciation. FIG. 23 illustrates words that rhyme with the second pronunciation of the word "tear", such as beer, tier, veer and New Year.

Figure 24:
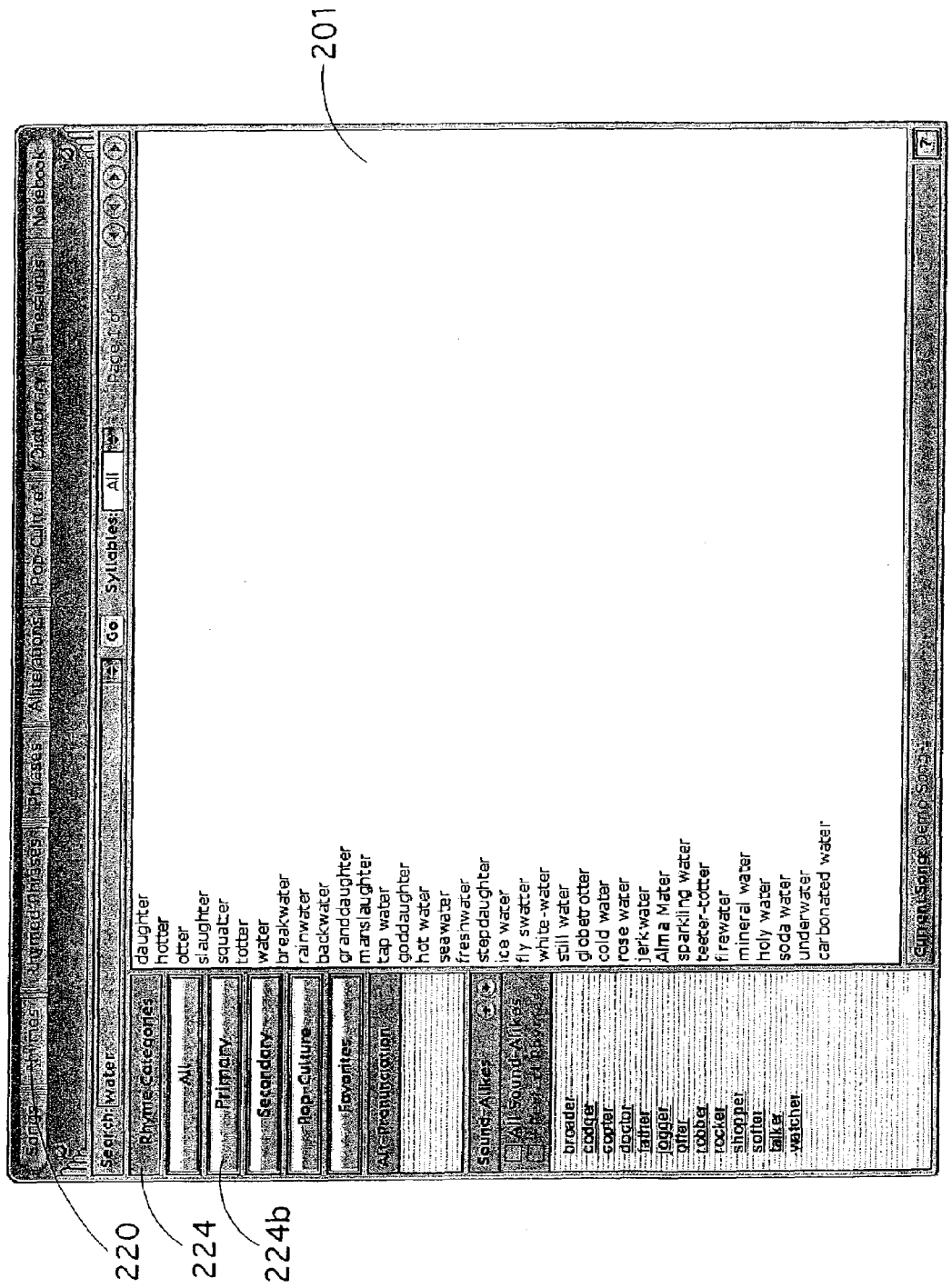
FIG. 24 is a computer screen shot illustrating the current search word for "water" where the option PRIMARY is selected resulting in a display of the words daughter, otter and totter.

A user can change the words displayed when using the Rhymes data base through clicking on button 220. This is through a variety of filters and FIG. 21 is again referred to review those filters numerically. One set of filters is the Rhyme Categories Filters 224. In FIG. 21, the Rhyme Category Filter 224, comprises the options of ALL 224*a*, PRIMARY 224*b*, SECONDARY 224*c*, POP-CULTURE 224*d*, and FAVORITES 224*e*. When the PRIMARY 224*b* option is selected, the search engine module 121 of FIG. 2 looks to the Category ID 19 of FIG. 20 of the rhymes found and displays all the rhymes whose Category ID 19 is Primary. The words returned as Primary are a subset of the rhymes that are more common in everyday speech. Each word in the e-CPT has been grouped into at least one of three categories, Primary, Secondary and Pop-Culture. In FIG. 24, the current search word is "water" and the option PRIMARY 224*b* is selected with words of all syllables being selected. The results, which are displayed in main display window 201 of FIG. 24, include words like "daughter", "otter" and "totter". Note in that figure also SOUND-ALIKES are shown in the side window. This is automatic. If an entered word has a SOUND ALIKE word, that word will appear under the SOUND-ALIKES column in the left hand side of the screen. In FIG. 24 these words are "broader", "codger" and "cooler".

Figure 25:
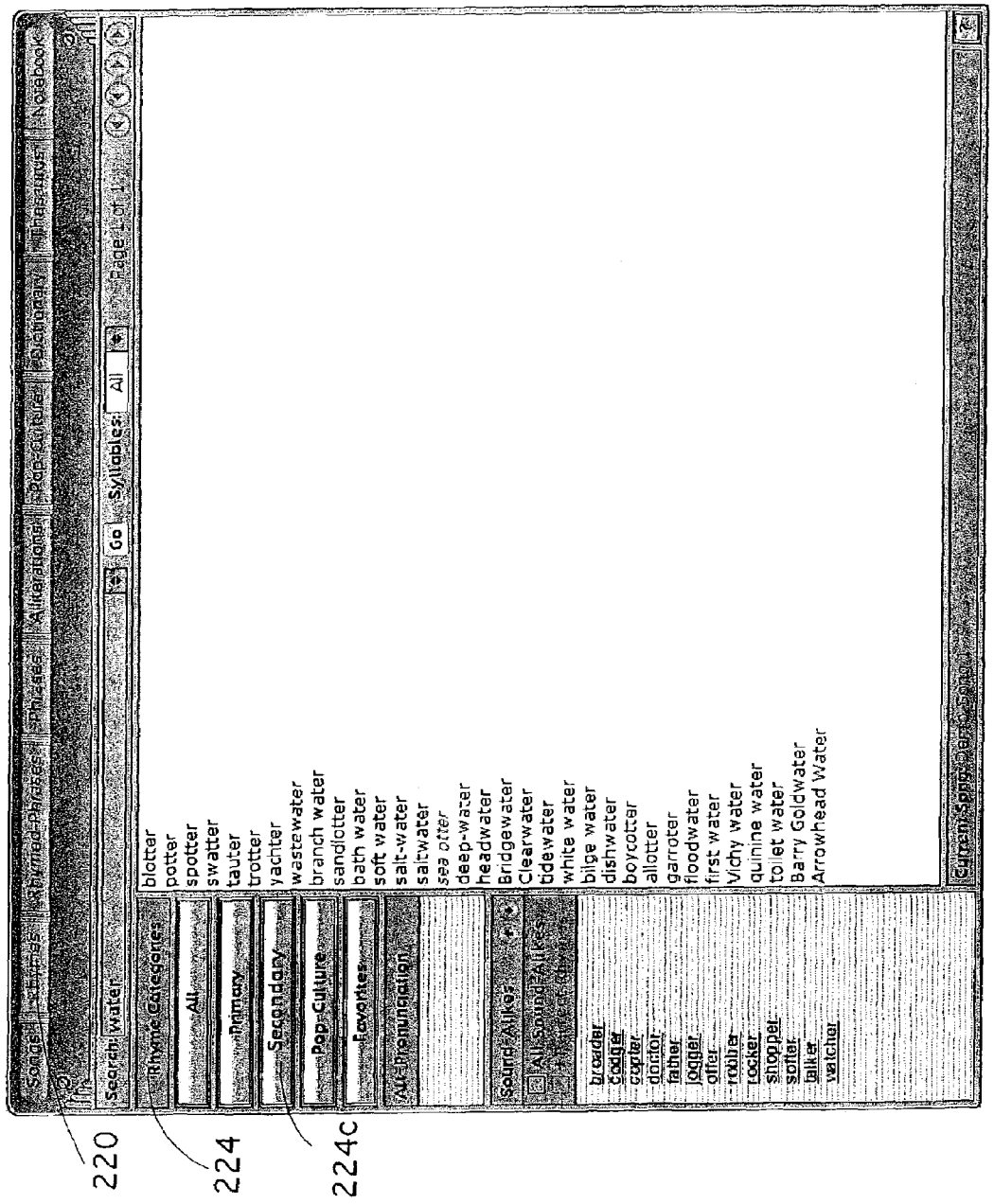
FIG. 25 is a computer screen shot illustrating the results when a user selects the Rhyme Category Filter option SECONDARY.

FIG. 25 illustrates the results when a user selects the Rhyme Category Filter option SECONDARY 224*c*. The search engine module 121 of FIG. 2 looks to the Category ID 19 of FIG. 20 of the rhymes collected and returns all of the rhymes whose Category ID 19 is Secondary. The words returned as Secondary are a subset of the rhymes that are less commonly used. In FIG. 25, the current search word is "water" and the option SECONDARY 224*c* is selected. The results, which are displayed in main display window 201 of FIG. 25, include words like potter, dishwater and garrotter. Again, SOUND ALIKE words are also shown.

Figure 26:
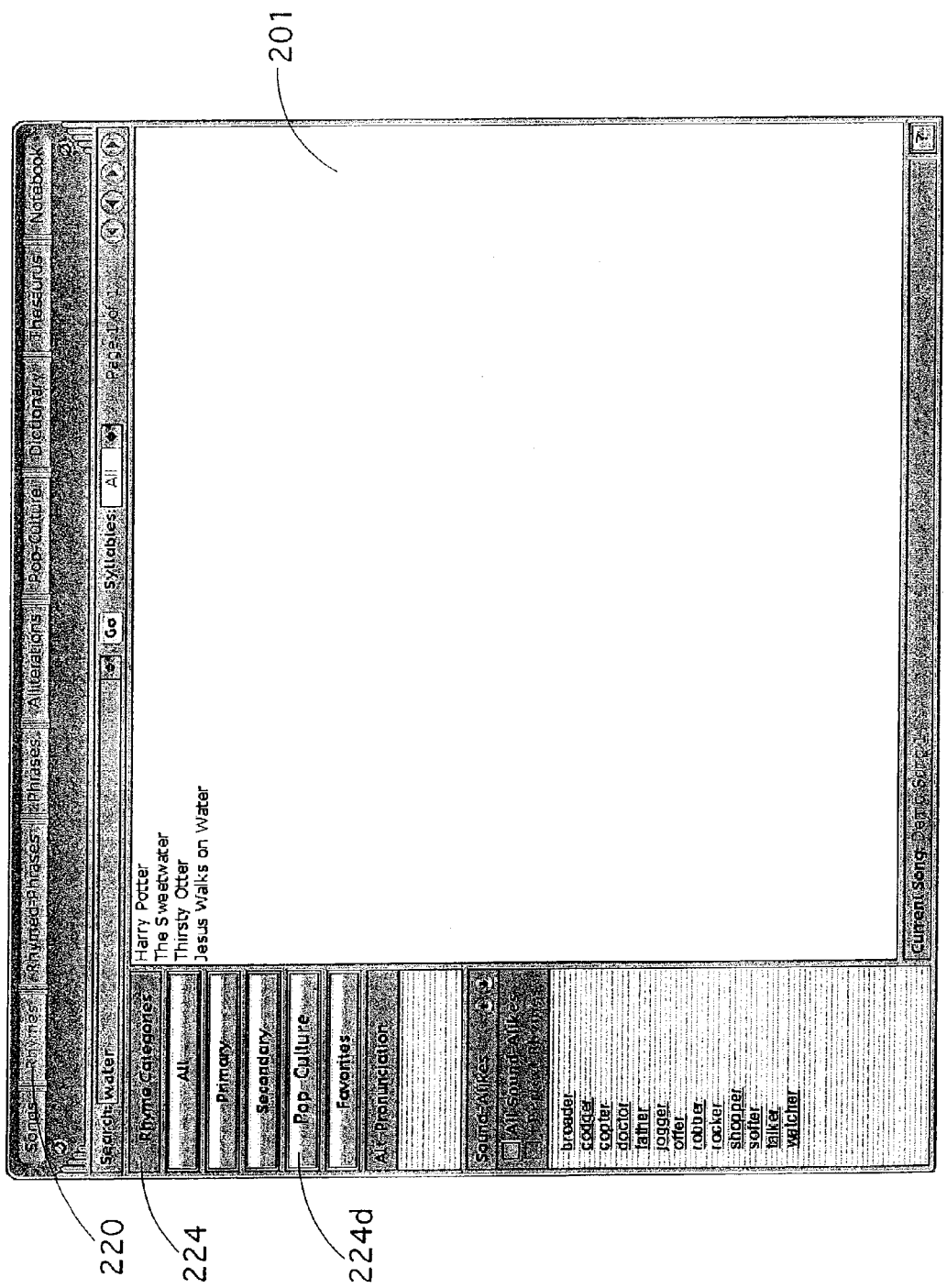
FIG. 26 is a computer screen shot illustrating the results when a user selects the Rhyme Category Filter POP-CULTURE.

FIG. 26 illustrates the results when a user selects the Rhyme Category Filter POP-CULTURE 224*d*. with the search word of "water". The search engine module 121 of FIG. 2 looks to the Category ID 19 of FIG. 20 and returns all of the rhymes whose Category 19 is Pop-Culture. The results, which are displayed in main display window 201 of FIG. 26, include words like Harry Potter and The Sweetwater.

There is one more Rhyme Category Filter called Favorites. The Favorites filter 224*e* of FIG. 21 will display the user's collected favorites. A discussion of this filter will follow the section describing the Collecting of the Rhymes and Phrases. However with the search word "water" by clicking on Favorites only those words that rhyme with "water" will be shown from the Favorites since we are in the Rhymes Database.

Another filter that is provided is the syllables filter 222 as shown in FIG. 21. The syllable filter allows the user to only display words in the main display window 201 that have the requisite number of syllables. Thus, if the user wants to see only two syllable words, the user can select two from the syllables filter so only two syllable words which rhyme with the current search word are shown.

Sound-Alikes Database

Searching the SOUND-ALIKES database will display rhymes that are close but not perfect rhymes for the word being searched. Turning back to FIG. 20, the reader is directed to SOUND-ALIKES ID 40, which is a unique number that is assigned to a unique SOUND-ALIKES Group. A SOUND-ALIKES Group may contain two or more Rhyme Groups. SOUND-ALIKES are words that sound similar to the search word, but are not perfect rhymes with the search word. For example, the words "bopper," "chopper" and "pauper" all sound similar to the word "water", but they are not perfect rhymes with "water". However, "bopper," "chopper" and "pauper" all belong to the same Rhyme Group. The SOUND-ALIKES ID 40 is used by the search engine module 121 of FIG. 2 to determine to which (if any) SOUND-ALIKES Group the current search word belongs.

Figure 46:
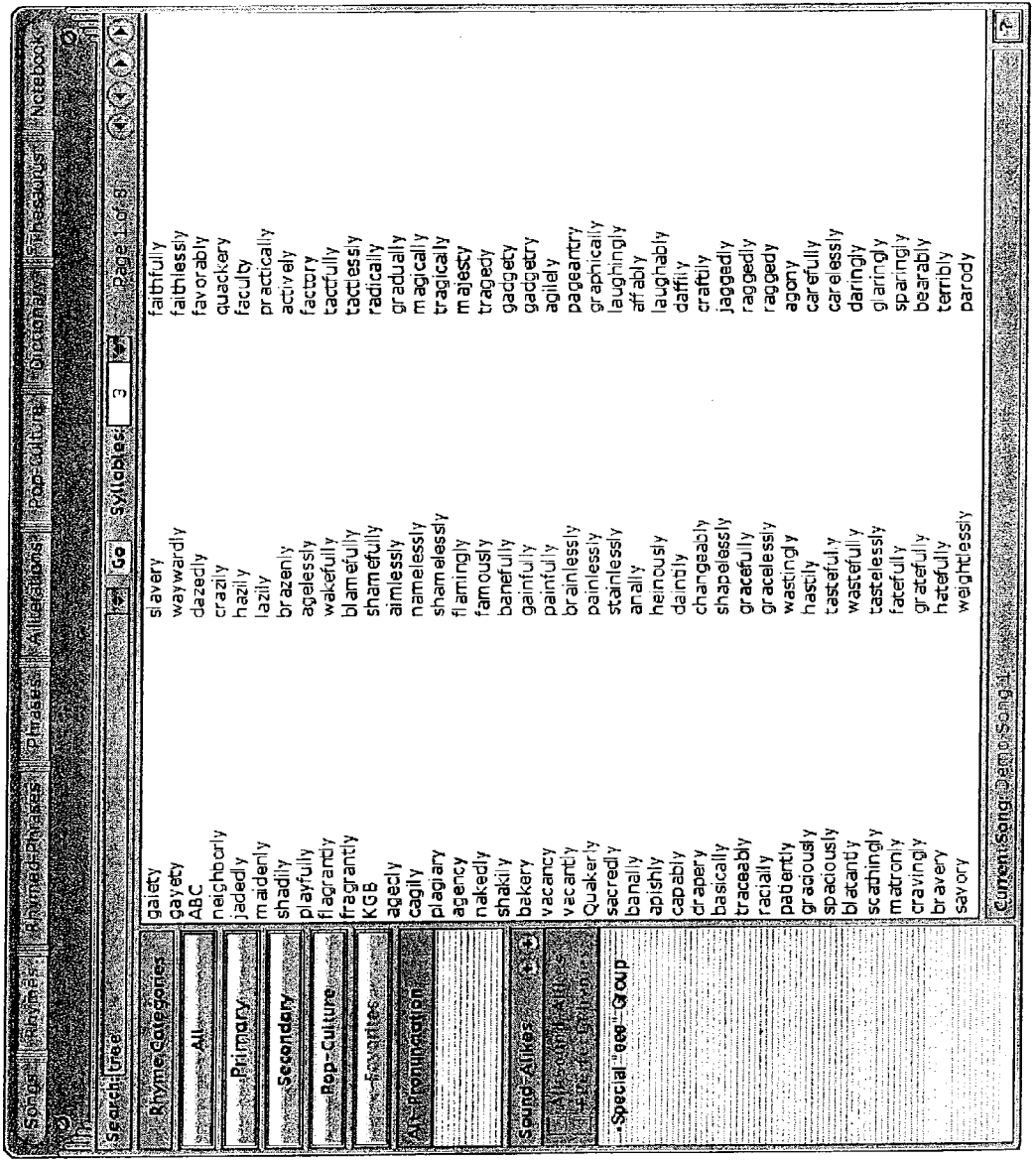
FIG. 46 is a computer screen shot of a graphical illustration of how an EEE group may be indicated.
Figure 47:
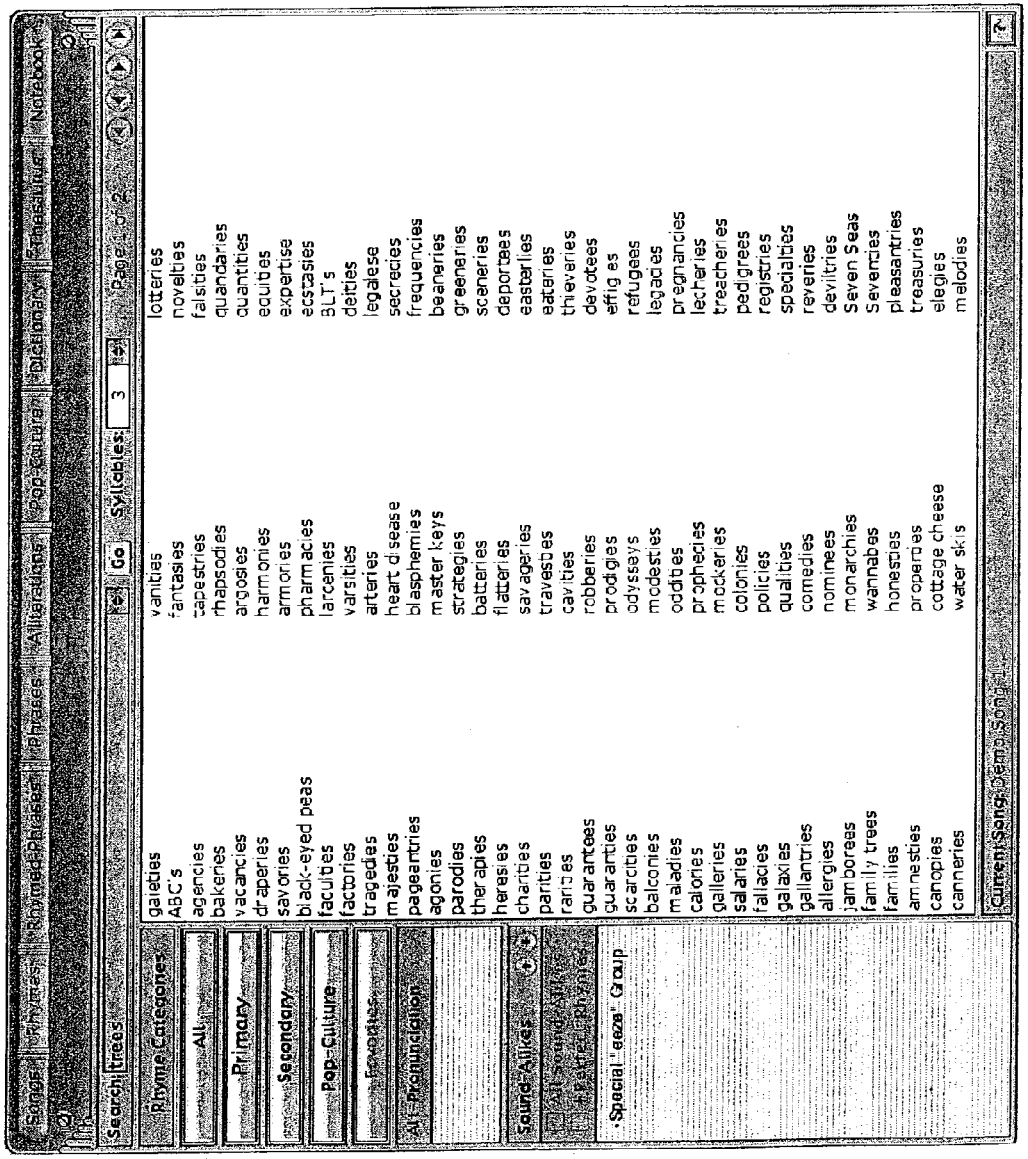
FIG. 47 is a screenshot of a graphical illustration of how an EEE group may be indicated.

In addition to checking the SOUND-ALIKES ID 40 of FIG. 20, the search engine module 121 of FIG. 2 will also check the EEE Group ID 43 and the EEZE Group ID 45 to see if the current search word has a corresponding EEE Group or an EEZE group. An EEE Group is a special type of SOUND-ALIKES group. According to traditional rhymes, the words "tree" and "reality" are not rhymes. However, in song writing, these words work well together. If a user looks for SOUND-ALIKES for the word "tree", there are more than 4000 SOUND-ALIKES. These words are generally three syllables or greater with a hard "e" sound at the end. Examples include ability, futility, society, and responsibility. Thus, the EEE group ID 43 is a means to break up the many SOUND-ALIKES with this sound. The EEZE group contains the plurals of the words found in the EEE group. FIG. 46 is a graphical illustration of how an EEE group may be indicated. Words up to three syllables are shown. For a search of the word "tree" emphasis is on the third syllable the main portion of the screen contains such words as "shadily", "bakery", "agony" and "carefully". Note that the screen presentation in the side section for SOUND-ALIKES advises the user that the EEE Group has been searched and it is by clicking on that entry that the SOUND ALIKE words shown in FIG. 46 are found. FIG. 47 is a graphical illustration of how an EEZE group may be indicated. It contains words such as "blasphemies", "bakeries", and "agencies". The word searched is "trees" with emphasis on the third syllable. Again, the side section of the screen under SOUND-ALIKES advises the user that the EEZE group has been searched and it is by clicking on that information that the SOUND ALIKES words are shown.

FIG. 21 illustrates an example of a graphical user interface into SOUND-ALIKES Database 131-2 of FIG. 18. To access SOUND-ALIKES Rhymes, the user clicks on Rhymes button 220. A user then enters a search word in the search field 221 and begins the search. As discussed above, the search engine module 121 of FIG. 2 preferably determines if the search word has a Serial Number ID 901 of FIG. 20. If a Serial Number ID 901 is found, the search engine module 121 of FIG. 2 locates the Rhyme Group ID 20*a* of FIG. 20 to determine if the word belongs to a Rhyme Group. Next, the search engine module 121 of FIG. 2 looks to the SOUND-ALIKES Group ID 40 of FIG. 20 in the SOUND-ALIKES Database 131-2 to see if the Rhyme Group belongs to a SOUND-ALIKES Group. Each Rhyme Group within a SOUND-ALIKES Group is assigned a Rhyme Group keyword in order to allow the user to select which Rhyme Group to display.

If the Rhyme Group belongs to a SOUND-ALIKES group, the search engine module 121 finds all of the other Rhyme Groups in the SOUND-ALIKES Database 1312 that have the same SOUND-ALIKES Group ID 40 as the current Rhyme Group, and prepares the Rhyme Group keywords for display to the user in the SOUND-ALIKES display area 236 of FIG. 21. Thus, for the search word "water" SOUND-ALIKES display area 236 contains words such as "broader", "doctor", "softer" and "watcher".

Similar to the words in the Rhymes Database 131-1, the words in the SOUND-ALIKES Database 131-2 have been pre-sorted and assigned a SOUND-ALIKES Rhymes Sort ID 31, an EEE Group Sort ID, ID 32 or an EEZE Group Sort ID, ID 33 to increase the speed of the sorting process and to allow the words to be displayed in a special phonetic sort order. The special phonetic sort order creates SOUND-ALIKES groups within the main list of SOUND-ALIKES. The phonetic sort order algorithm first sorts the words by syllables. All one-syllable words are grouped and displayed alphabetically. Next, two syllable words are sorted by syllable two's sound. Further, the two syllable words are then sorted by syllable one's sound. The two syllable words are further sorted by syllable one's consonant and then alphabetically. Three syllable words are sorted by syllable three's sound, then by syllable one's sound, then by syllable two's sound, then by syllable one's consonant, and then alphabetically. Four plus syllable words are sorted by syllable four's sound, then by syllable one's sound, then by syllable two's sound, then by syllable three's sound, then by syllable one's consonant and then alphabetically. The words displayed in FIG. 28 illustrate this special phonetic sort order.

Figure 28:
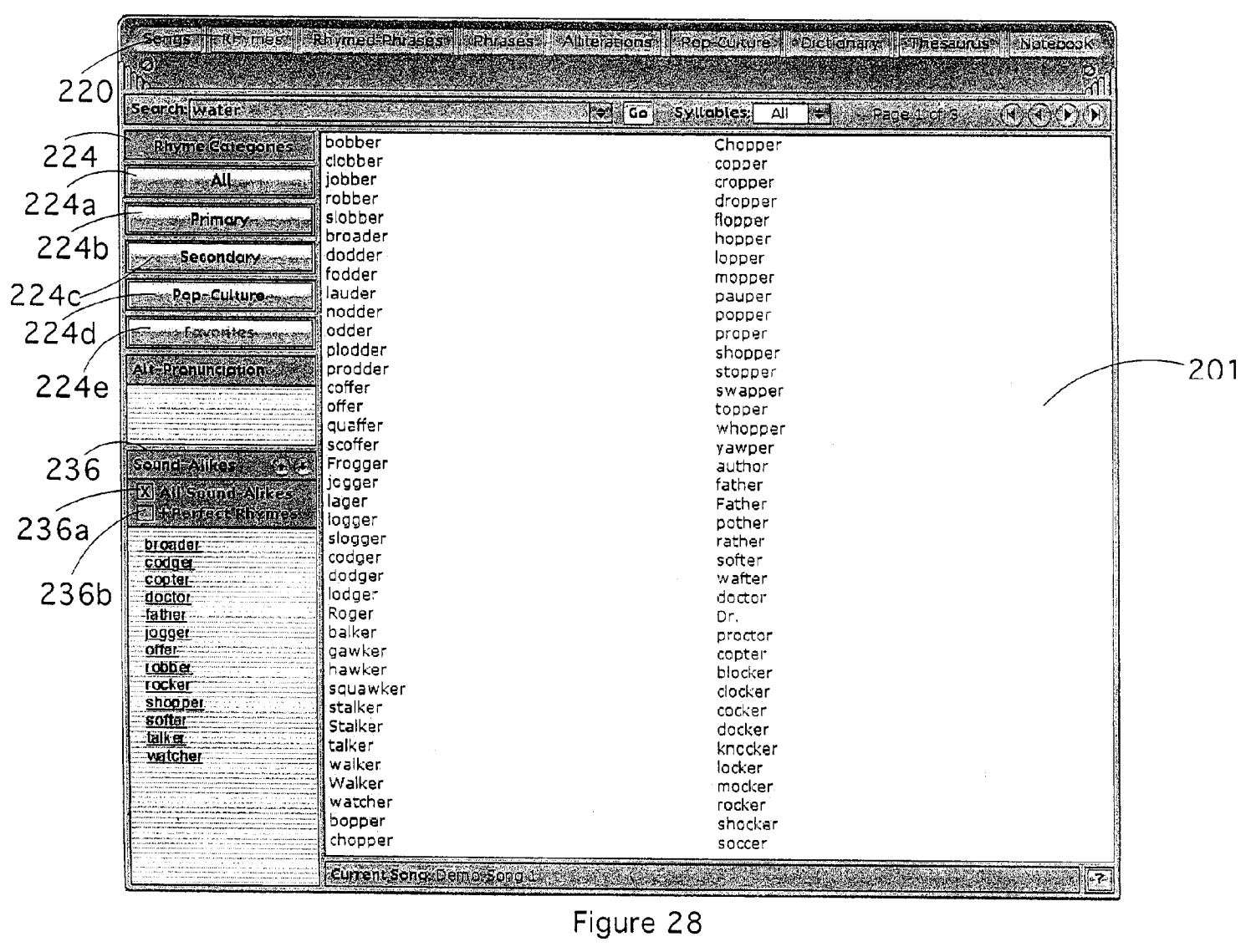

In FIG. 28, the current search word is "water". The syllables selected for display are "all". Instead of viewing the SOUND-ALIKES by keyword, the user can choose to display in the main display window 201 all of the SOUND-ALIKES for the current search word found by search engine module 121 of FIG. 2. FIG. 28 illustrates the results when a user checks an All SOUND-ALIKES box 236a. When the All SOUND-ALIKES box 236a is selected, all of the SOUND-ALIKES for the current search word are displayed in the main display window 201. As illustrated in FIG. 28, SOUND-ALIKES "broader" and "father" are displayed as well as "shopper" and "pauper". One skilled in the art will appreciate that when the All SOUND-ALIKES box 236a is checked, all of the Rhyme Groups that have the same SOUND-ALIKES ID 40 of FIG. 20 are displayed except for the Rhyme Group that actually contains the current search word.

As discussed above, the words are displayed in FIG. 28 according to the special sort order placing all one-syllable words first in alphabetically order. In the case of "water", there are no one syllable words that are SOUND-ALIKES with water. The special sort order displays two-syllable words based on syllable two's sound first, then syllable one's sound, then syllable one's consonant and then alphabetically. This results in the list of two syllable words displayed in main display window 201 being broken up into several sub-lists. For example, the first sub-list starts with "bobber" and ends with "slobber", while the second sub-list starts with "broader" and ends with "prodder". The words in the first sub-list all share the same syllable two's sound of "ber", while the words in the second sub-list all share the same syllable two's sound of "der". The words within each sub-list are then ordered according to syllable one's sound, syllable one's consonant and then alphabetically. In the first sub-list all of the words share the same syllable one's sound of a "short a". Since they all have the same syllable one's sound they are next sorted by their consonant sounds and then alphabetically. Therefore, the words are organized in a unique manner that further facilitates a user finding the word that best completes his or her poem or lyric. As a summary note, FIGS. 28 and 21 differ as in FIG. 21 rhymes are portrayed in the main portion while in FIG. 28 SOUND-ALIKES are portrayed in the main portion. In the latter case this caused by clicking on "All SOUND-ALIKES" 236a.

Figure 27:
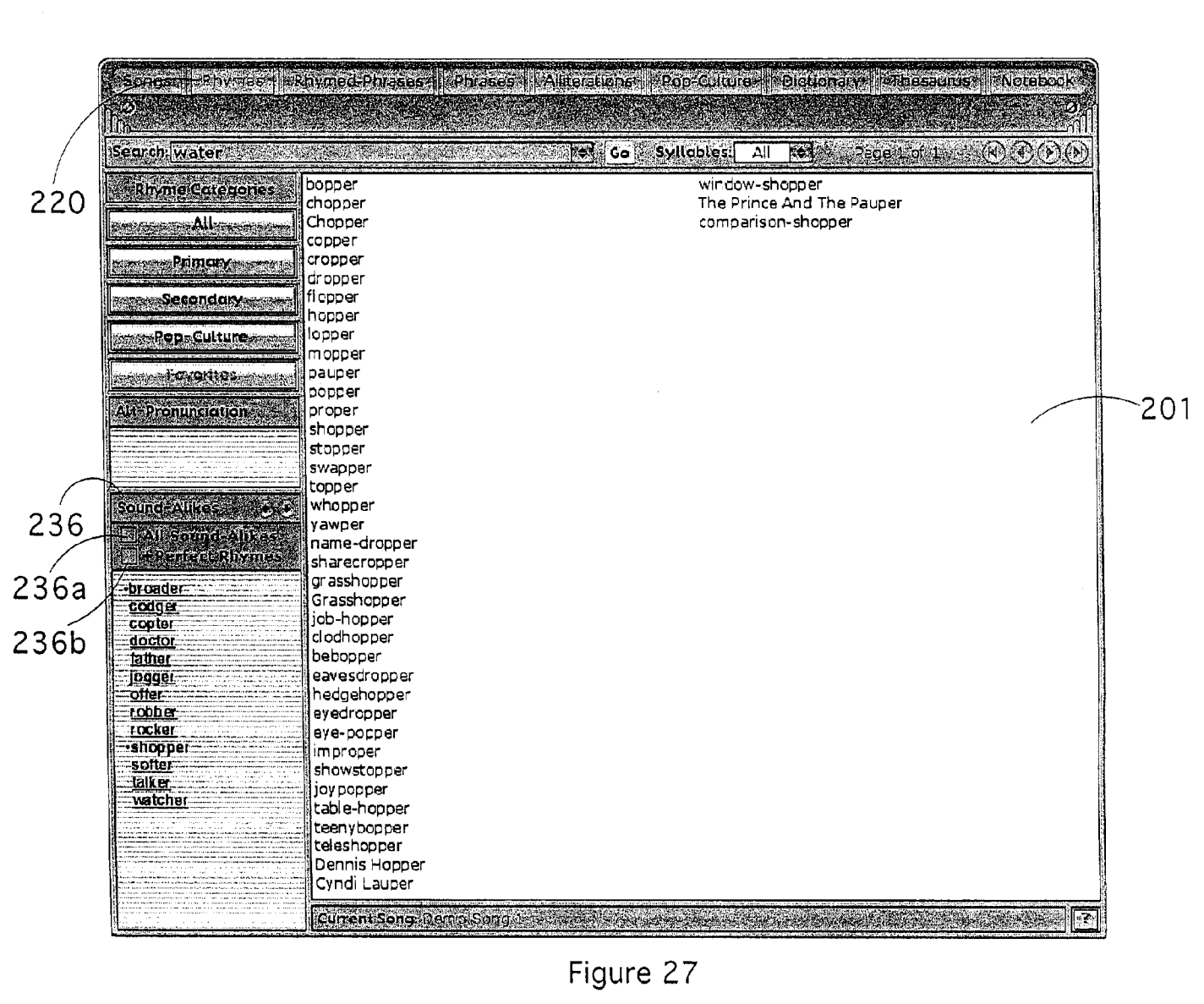

FIG. 27 depicts the display of the words that are associated with the keyword "shopper" from FIG. 28's SOUND-ALIKES area 236. If a user desires to view the SOUND-ALIKES to the search word "water" the user may select any one of the keywords displayed in the SOUND-ALIKES area 236. For example, if the user selects the Rhyme Group keyword shopper, the perfect rhymes to the keyword shopper, which are SOUND-ALIKES to the search word water, are displayed in main display window 201 of FIG. 27, i.e. chopper, pauper and whopper. Thus, if the user is unable to use one of the perfect rhymes for water, the user may select the keyword shopper to see if one of the words displayed in main display window 201, i.e. pauper, would provide a close enough rhyme to the word water to complete the lyric. The user could not click on a word in the main section 201 of FIG. 28 and also automatically get rhymes for it. The user would have to hold down the option key, click on a dictionary, and then would get the results from that dictionary. Another way to, obtain a rhyme for a word in the main section 201, the user would have to enter that word in the Search area and press "Go" to obtain rhymes for that word.

Figure 29:
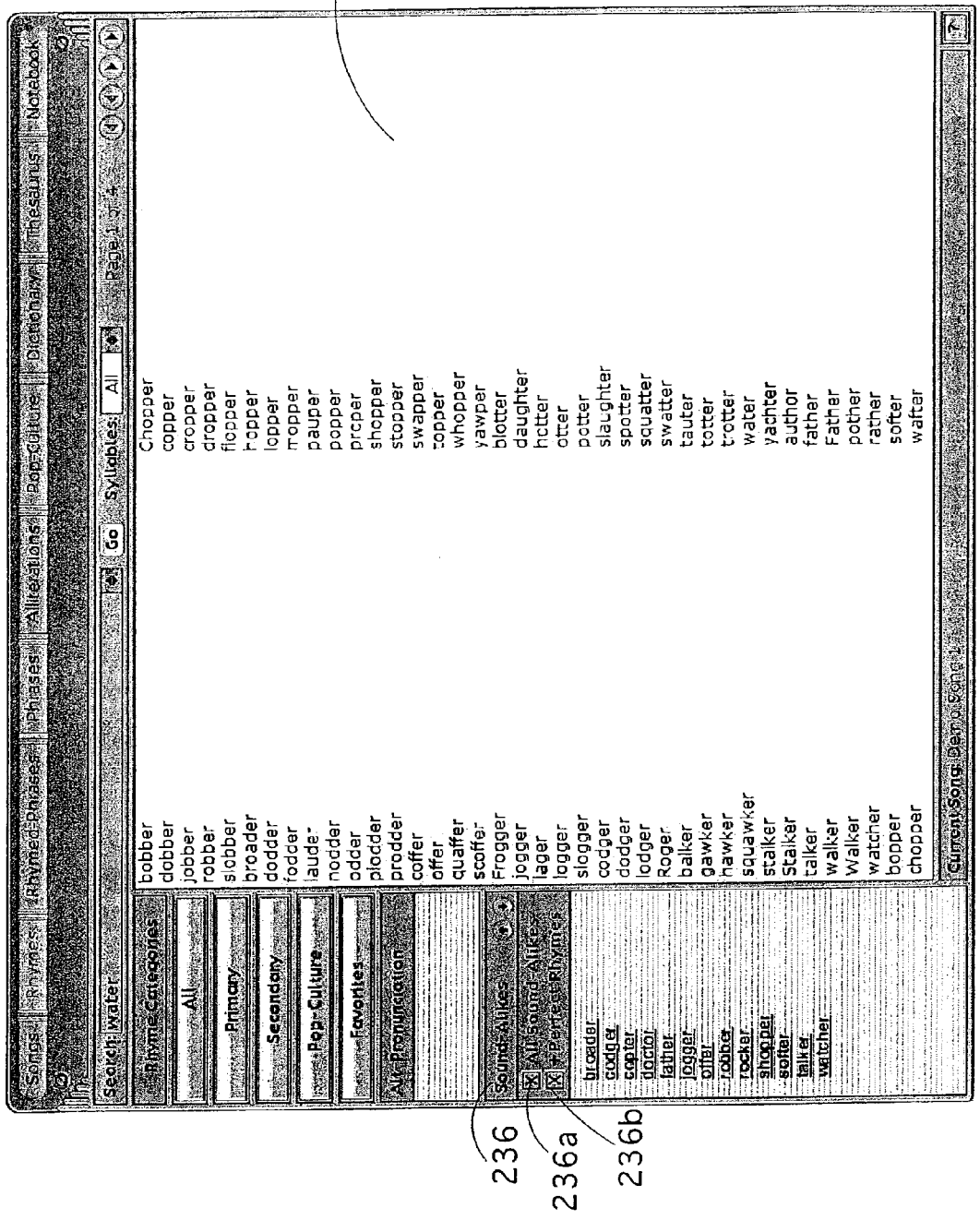
FIG. 29 is a computer screen shot illustrating an example of a graphical user interface displaying the results of the user selecting the option of displaying the All SOUND-ALIKES and the perfect rhymes together.

FIG. 29 illustrates an example of a graphical user interface displaying the results of the user selecting the option of displaying the All SOUND-ALIKES and the perfect rhymes together. Display of both SOUND-ALIKES and perfect rhymes is achieved when the user selects the +Perfect Rhymes box 236b shown in FIG. 29. By selecting the +Perfect Rhymes box 236b with the All SOUND-ALIKES box 236a, the words displayed in the main display window 201 include all of the perfect rhymes for the current search word and all of the SOUND-ALIKES for the current search word. As shown in FIG. 29, water's perfect rhyme, "daughter," is displayed along with water's SOUND-ALIKES "broader" and "father". Due to the special sort order described in the previous section, the display of the SOUND-ALIKES with the perfect rhymes creates tighter sub-groups within the list of words based on the second and third syllable sounds. One skilled in the art will appreciate that when the All SOUND-ALIKES box 236a is checked and the +Perfect Rhymes box 236b is checked, all of the words in all of the Rhyme Groups having the same SOUND-ALIKES ID 40 of FIG. 20 are displayed. giving the user a much larger list of words from which to choose.

Figure 30:
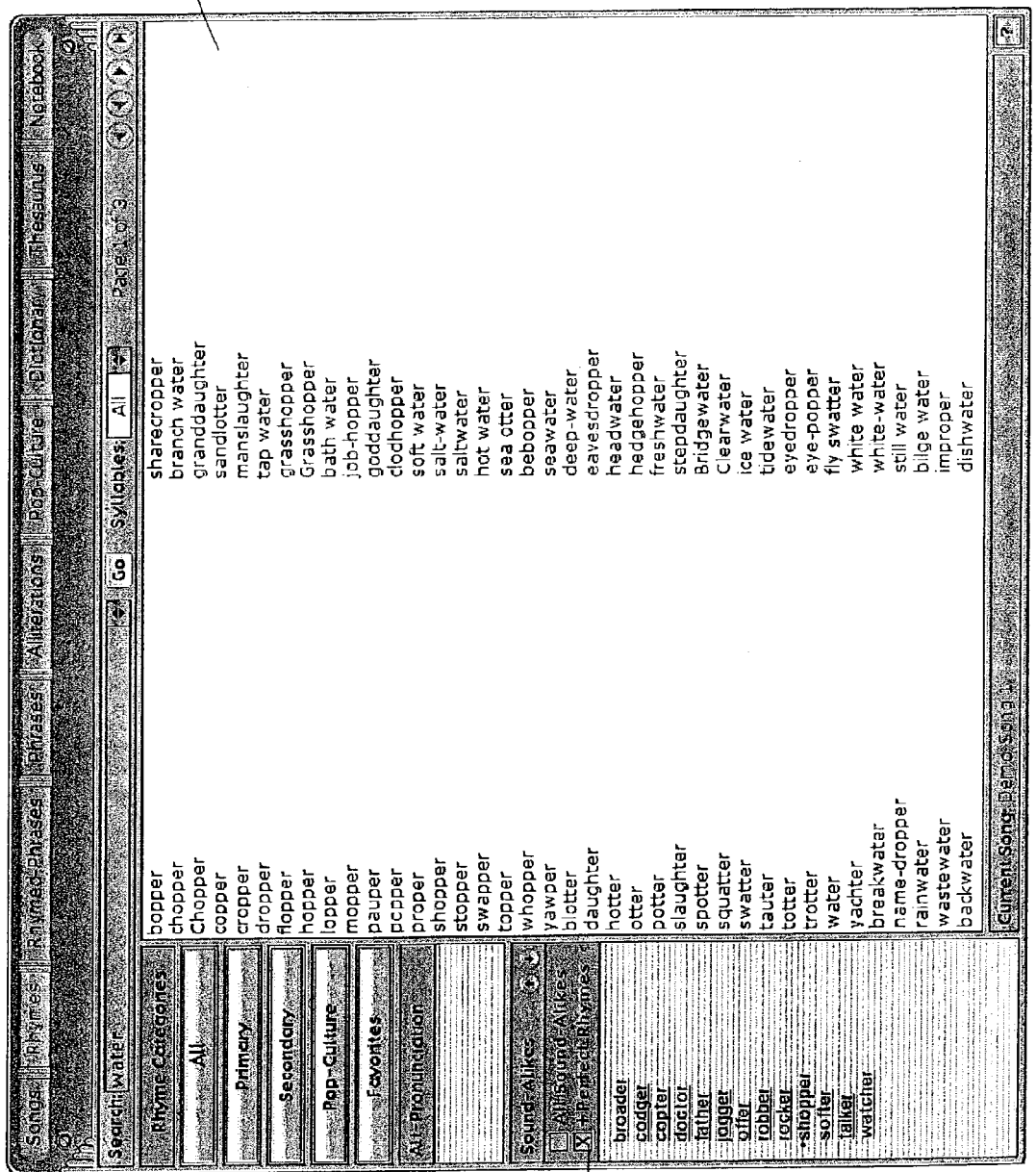
FIG. 30 is a computer screen shot illustrating that the user can choose to display all of the perfect rhymes for the current search word and the words associated with just one of the SOUND-ALIKE keywords.

Another option is illustrated in FIG. 30. The user can choose to display all of the perfect rhymes for the current search word and the words associated with just one of the SOUND-ALIKES keywords. This is accomplished by clicking on one of the keywords, for example "hopper" and selecting the +Perfect Rhymes box 236b. FIG. 30 illustrates the results displayed in main display window 201, where the current search word's perfect rhyme "daughter" is displayed along with "chopper" from SOUND-ALIKES keyword shopper.

A user can change the words displayed through a variety of filters that can be used. These filters interact with the SOUND-ALIKES database 131-2 in relatively the same manner as described above with relation to the Rhymes database 131-1. For example, when the PRIMARY 224b option of FIG. 28 is selected the search engine module 121 of FIG. 2 looks to the Category ID 21 of FIG. 20 of the SOUND-ALIKES found and displays all the SOUND-ALIKES whose Category ID 21 is Primary. The words returned are a subset of the SOUND-ALIKES that are more common in everyday speech. Each word in the SOUND-ALIKES Rhymes has been grouped into at least one of three categories, Primary, Secondary and Pop-Culture. In FIG. 28, the current search word is "water" and the option PRIMARY 224b is selected along with the All SOUND-ALIKES button 263a. The results, which are displayed in main display window 201 of FIG. 28, include words like coffer, watcher and chopper. The syllables filter 222 also operates in the same manner as described above in the Rhymes database 131-1 section.

One skilled in the art will appreciate that if the +Perfect Rhymes button 236b is selected and the PRIMARY 224b option is selected the search engine module 121 of FIG. 2 looks to the Category ID 21 for the SOUND-ALIKES and to Category ID 19 for the Rhymes to determine which words to display in the main display window 201.

As a final caveat, the SOUND-ALIKES database heretofore described, takes one through a narrow choice of similar words. However this choice could be much broader such as "night" and "eye", "day" and "make", "tree" and "week". Some slang broad SOUND-ALIKES are "gun" and "Freeee DOM", "day" and "partay" (slang for "party"), "day" and "may" (mispronunciation of "me").

Particularly in song, loose usage of similar sounds works well.

Alliterations Database

Returning to FIGS. 18 and 20 for the search of a word in the Alliteration database 131-3, FIG. 18 allows for the display of words that begin with the same sound as the word being searched. In FIG. 20, the reader is directed to Alliteration ID 50, which is a unique number that is assigned to a unique Alliteration Group. An Alliteration Group in this writing, is comprised of words that begin with the same sound. Because the words "fruit", "fracas" and "Frankfurt" all begin with the "fr" sound, they are alliterations, and they will belong to the same Alliteration Group and thus have the same Alliteration ID 50.

Figure 31:
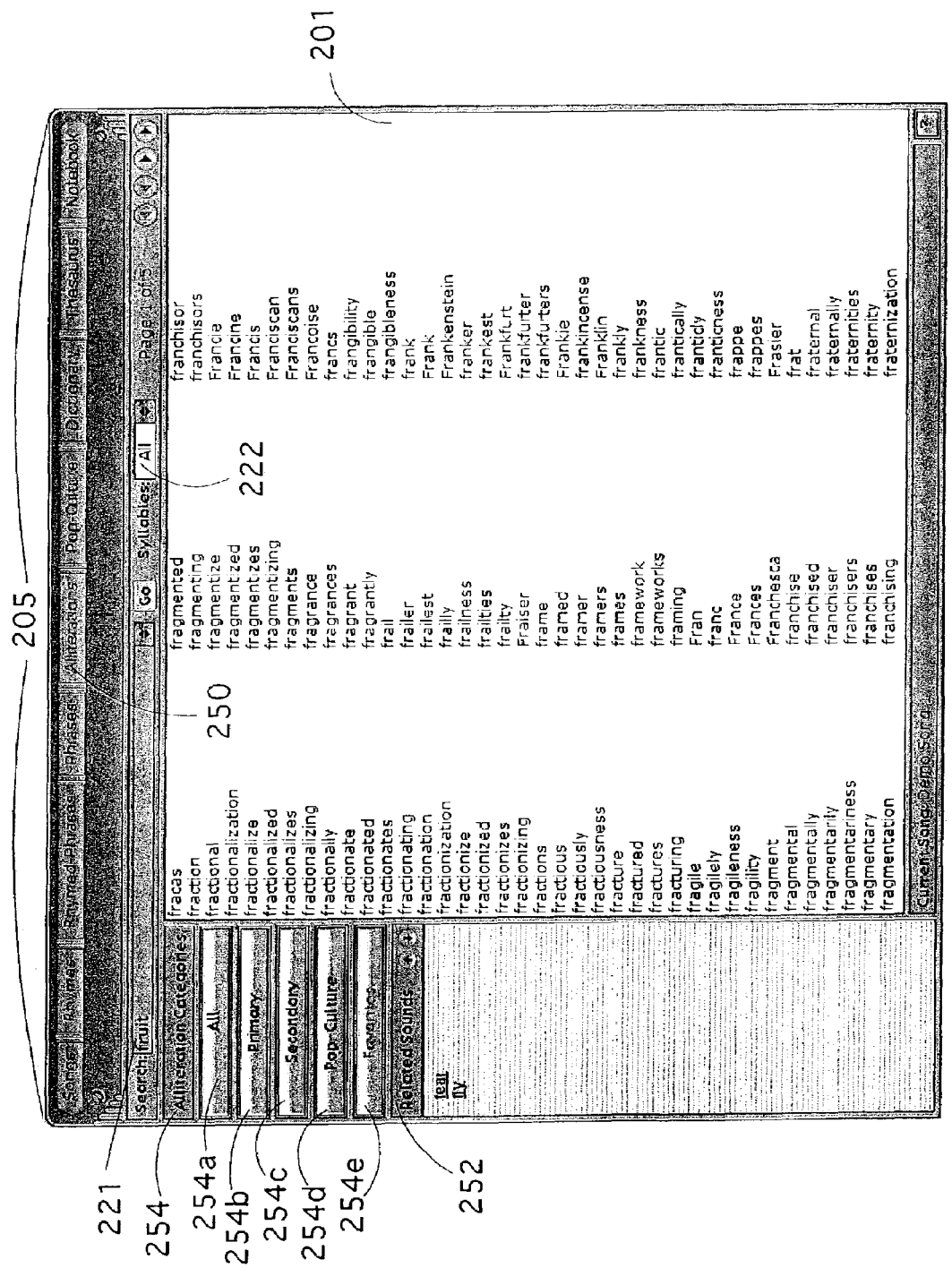
FIG. 31 is a computer screen shot illustrating an example of a graphical user interface into Alliterations Database of FIG. 18.

FIG. 31 illustrates an example of a graphical user interface into Alliterations Database 131-3 of FIG. 18. In FIG. 31, Alliterations button 250 is selected from menu bar 205. To search the alliterations dictionary the user clicks on Alliterations button 250. A user then enters a search word in the search field 221 and begins the search. As discussed above, the search engine module 121 of FIG. 2 preferably determines if the search word has a Serial Number ID 901 of FIG. 20. If a Serial Number ID 901 is found, the search engine module 121 of FIG. 2 locates Alliteration ID 50 of FIG. 20 in the Alliterations Database 131-3 to see if the current search word belongs to an alliterations group. If the current search word belongs to an alliterations group, the search engine module 121 finds all of the words in the Alliterations Database 131-3 that have the same Alliteration ID 50 as the current search word, and prepares the words for display to the user in main display window 201 of FIG. 31. Thus, main display window 201 contains words such as fracas, Frankfurt, and frat.

The search engine module 121 of FIG. 2 not only displays words that are alliterations of the current search word, the search engine module 121 also suggests Related Sound Groups for the current search word. Referring back to FIG. 20, the search engine module 121 checks the Alliteration Related Sound ID 52 to determine if the current search word has any Related Sound Groups.

Related Sound Groups are groups of words that are alliterations of each other, but are only related to the beginning sound of the current search word. For example, the search word fruit has a beginning sound of "fr." However, "f" and "fl" sounds are related to the "fr" sound. Thus, words that have the "f" sound or the "fl" sound would be related sounds that may be used in a lyric or poem.

Figure 32:
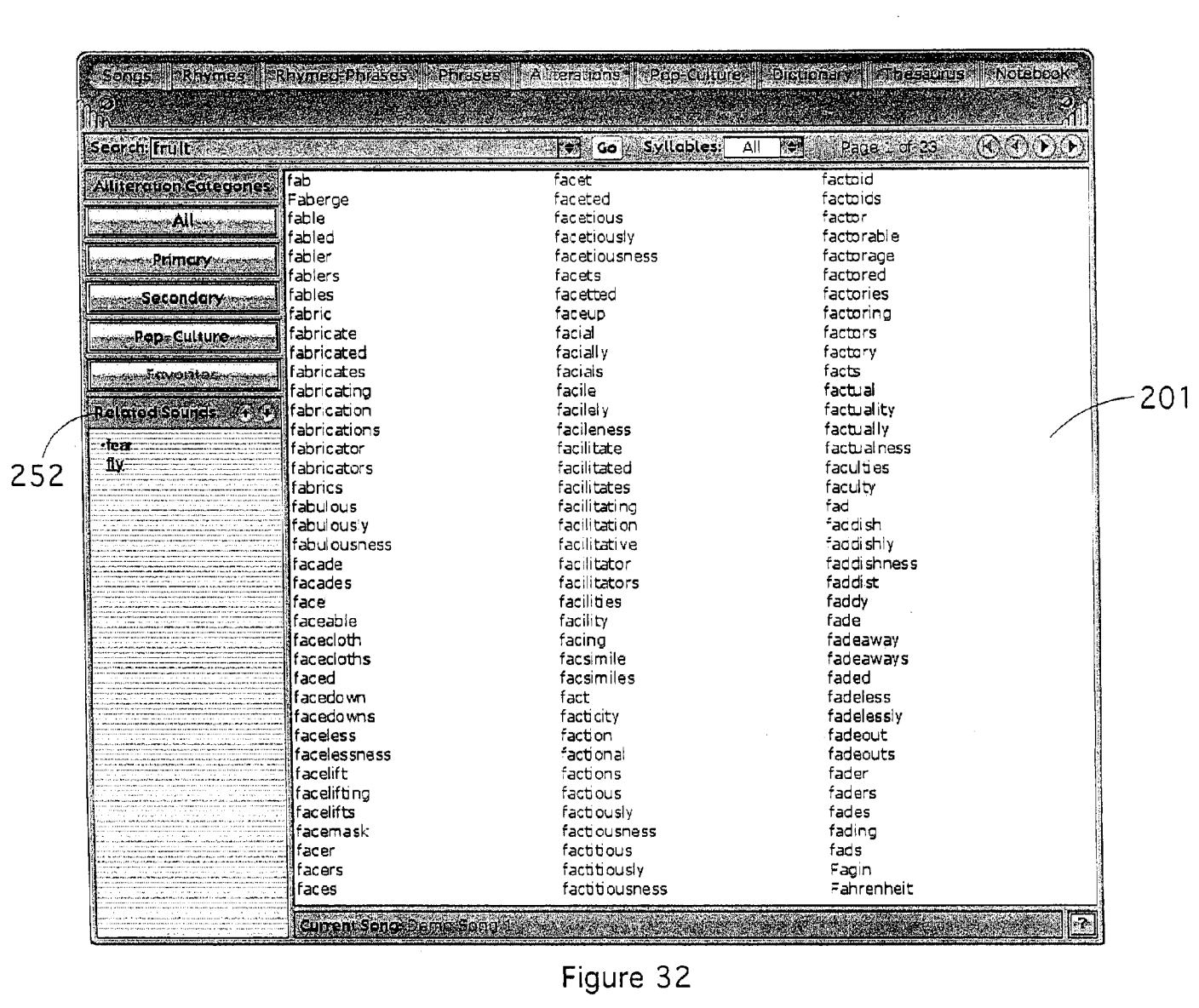

FIG. 31 illustrates how related sounds may be displayed in the Related Sounds window 252. The current search word is "fruit". The word "fruit" has two Related Sound Groups 1) "f" represented by the word "fear", and 2) "fl" represented by the word "fly", thus the word "fruit" would have two Alliteration Related Sound IDs 52 of FIG. 20. A keyword related to each of the Related Sound Group is displayed in Related Sounds window 252 which contains the words "fear" and "fly". In the main screen portion 201 the words which are alliterations with the word "fruit" are displayed considering as well that in syllables 222 the choice of "all" has been selected. Words seen are "fracas" "fraction" "fractional" along with other "fr" words". The user can select the Related Sound keyword in the Related Sounds window 252 and the search engine module 121 of FIG. 2 will return words from the Alliterations Database 131-3 of FIG. 18 that match the related sound. This is seen in FIG. 32 where from FIG. 31, the word "fear" in the related sounds side box 252 has been clicked on. FIG. 32 illustrates words that match the Related Sound Group keyword "fear", such as "fab", "fade" and "Fagin". Note that in FIG. 32, the word "fear" has a carrot next to it so that the user knows that it is this word in the Related Sounds 252 section which is being acted upon and the display in main portion 201 relates to that word. Note as well that the search word still reflect "fruit" giving the user the history of where the search began.

A user can change the words displayed through a variety of filters that can be used. These filters interact with the ALLITERATIONS database 131-3 in relatively the same manner as described above with relation to the Rhymes database 131-1. For example, when the PRIMARY 224b option is selected the search engine module 121 of FIG. 2 looks to the Category ID 22 of FIG. 20 of the Alliterations (or related sounds) found and displays all the Alliterations (or related sounds) whose Category ID 22 is Primary. The words returned are a subset of the alliterations that are more common in everyday speech. Each word in the e-CPT has been grouped into at least one of three categories, Primary, Secondary and Pop-Culture. In FIG. 31, with the current search word being "fruit" and the option ALL 224a being selected for the syllables, the results which are displayed in the main display window 201 of FIG. 31, include words like "fracas", "Frankfurt" and "frat".

Pop-Culture Database

Returning to FIG. 18, Pop-Culture Database 131-4 is a collection of over 11,000 of the most universally recognizable names, places, people, events, products and icons which makeup and are an important part of the American and World Culture. One skilled in the art will appreciate that the Pop-Culture database may be expanded to contain recognizable names, places, people, events, products and icons from other cultures and languages. Any of a number of different means may be used to organize and present the data provided in the Pop-Culture Database 131-4. The following is just one example of how the Pop-Culture data may be arranged and organized.

FIG. 33 illustrates an example of a graphical user interface that may be used to gain access to the data within the Pop-Culture Database 131-4. A user may select the Pop-Culture menu 260 from the menu bar 205. FIG. 33 depicts the Pop-Culture data organized into four main categories:

"The World," "Famous Names," "Famous Products" and "Food, Drink & Travel". All subjects and categories are displayed when the user selects the: "Index" Tab 261 of FIG. 33. Otherwise, each category can be seen by clicking on the other tabs, "The Word:", "Famous Names":, "Famous Products:" and "Food, Drink & Travel". Each of these categories are preferably broken down into more specific subject categories. By selecting one of the subject categories the words in that category are displayed. FIG. 34 depicts words displayed when the Famous Products category 268 is selected and then the Name Brands and Icon subject category 269 is selected. Words in the "Name Brands and Icon" 269 category could include trademarks such as Ajax®, Folgers® and iMac®, as shown in FIG. 34.

Returning to FIG. 20, Subject Keyword Hyperlink 910 contains a list of the subject categories. When a user selects a subject category, the search engine module 121 of FIG. 2 identifies the Subject Keyword Hyperlink 910 and finds the associated Pop-Culture ID 912 of FIG. 20, The search engine module 121 of FIG. 2 collects for display all of the words in the Pop-Culture Database 131-4 that have the same Pop-Culture ID 912. The words are displayed by the search engine module 121 of FIG. 2 by the Pop-Culture Sort ID 914 of FIG. 20.

A user can change the words displayed through two of the filters, ALL and FAVORITES. These filters interact with the Pop Culture database 131-4 in relatively the same manner as described above with relation to the Rhymes database 131-1. For example, when the All button is selected the search engine module 121 of FIG. 2 looks to the Category ID 823 of FIG. 20 of the Pop Culture found and displays all the Pop Culture. When the Favorites button is selected only the Pop Culture that is in the Favorites is displayed. Also available is the syllables filter 222 discussed in other examples, which affects the number of syllables in the each word displayed.

Phrasal Database

Turning to FIG. 17, the Phrasal Database 133 is designed to comprise a large collection of clichés, phrases, sayings, slang expressions, idioms and word combinations, herein referred to simply as phrases. A more accurate name for the Phrasal Database would be the Phrasal/Cliché/Sayings/Word Combinations Database as will soon be readily appreciated by the reader.

One of the challenges with providing a large collection of phrases is to provide a user with quick response times to a variety of different types of queries. FIG. 19 depicts an illustration of how the reader may imagine the Phrasal Database 133 of FIG. 17 as actually being broken down into three separate databases: a Rhymed Phrasal Databases 133-1, SOUND-ALIKES Phrase Database 133-2 and a Phrasal/Cliché/Sayings/Word Combinations Database 133-3. The reader is invited to FIG. 20, which depicts an example of the plurality of IDs that are associated with each phrase in the Rhymed Phrasal Databases 133-1, SOUND-ALIKES Phrasal Database 133-2 and a Phrasal/Cliché/Sayings/Word Combinations Database 133-3. Each ID allows the search engine module 121 of FIG. 2 to quickly find, sort and display words that match a given query.

A user can change the words displayed through two of the filters, ALL and FAVORITES. These filters interact with the Phrasal database 131-3 in relatively the same manner as described above with relation to the Rhymes database 131-1. For example, when the All button is selected the search engine module 121 of FIG. 2 looks to the Category ID 827 of FIG. 20 of the Phrases found and displays all the Phrases. When the Favorites button is selected only the Phrases that is in the Favorites is displayed. Also available is the syllables filter 222 discussed in other examples, which affects the number of syllables in the each phrase displayed.

Rhymed-Phrasal Database

Searching on a word in the Rhymed-Phrasal database 133-1 will display phrases that end with a word that rhymes with the word being searched. Turning back to FIG. 20, the reader is directed to Last Word Rhyme Group ID 74, which is a unique number that is assigned to a unique Last Word Rhyme Group. A Last Word Rhyme Group is comprised of phrases whose last words have been grouped together by their phonetic sounds. The last word of one of the phrases is a perfect rhyme with the last word of another of the phrases within the same rhyme phrase group. Thus the phrases "a cool drink of water" and the phrase "my long lost daughter" will have the same Last Word Rhyme Group ID since the words "water" and "daughter" are perfect rhymes.

Figure 35:
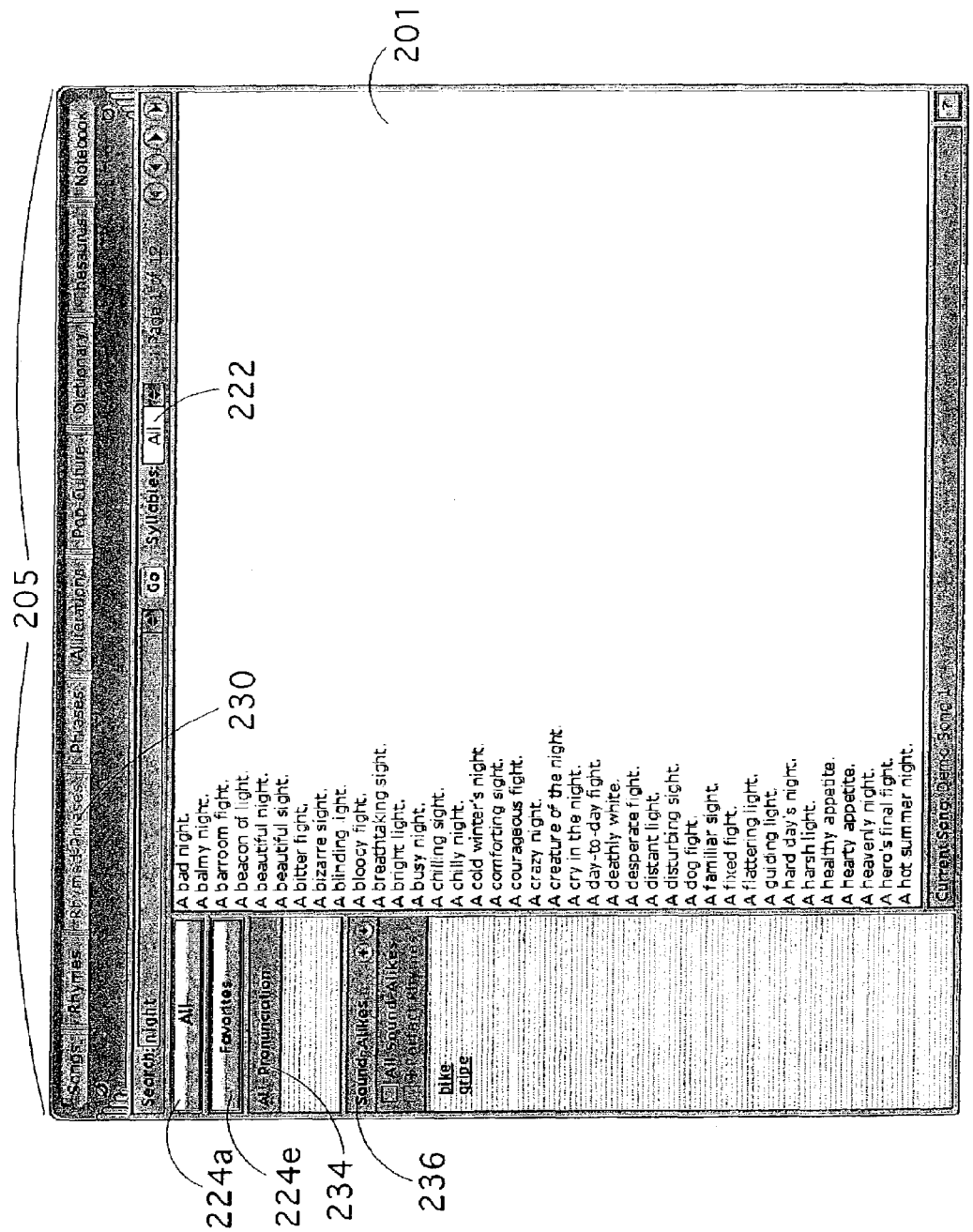
FIG. 35 is a computer screen shot illustrating an example of a graphical user interface into Rhymed Phrases Database of FIG. 19.

FIG. 35 illustrates an example of a graphical user interface into Rhymed Phrases Database 133-1 of FIG. 19. Note in that Figure that Rhymed Phrases 230 is clicked in the main menu bar 205, the syllables chosen are all at 222, and in the side menus, buttons all 224a and favorites 224e as filters are available. The search word is "night". Alternate Pronunciations 234 in the side options is not activated but SOUND-ALIKES 236 contains the words "bike" and "gripe". In FIG. 35 with Rhymed-Phrases menu 230 having been selected from menu bar 205, the user uses search engine module 121 of FIG. 2 to search the Rhymed Phrases Database 133-1 of FIG. 19 for phrases that rhyme. As discussed above, the search engine module 121 of FIG. 2 preferably determines if the search word has a Serial Number ID 901 of FIG. 20. If a Serial Number ID 901 is found, the search engine module 121 of FIG. 2 locates the Rhyme Group ID 20b of FIG. 20 to see if the current search word belongs to a Last Word Rhyme Group. If the current search word belongs to a Last Word Rhyme Group the search engine module 121 finds all of the phrases in the Rhymed Phrases Database 133-1 that have the same Last Word Rhyme Group ID 74 as the current search word's Rhyme Group ID 20b, and prepares the phrases for display to the user in main display window 201 of FIG. 35. Thus, main display window 201 contains phrases such as "A courageous fight" and "A disturbing sight."

The search engine module 121 of FIG. 2 does not only display phrases that rhyme with the current search word, the search engine module 121 also suggest words that a user might want to search on in addition to the current search word. Referring back to FIG. 20, the search engine module 121 checks the Last Word Alternative Pronunciation ID 607 to determine if the current search word has any alternative pronunciations.

The alternative pronunciations for the Rhymed Phrases Database 133-1 of FIG. 19 are found in the same way as they are found in the Rhymes Database 133-1 of FIG. 18 as described above. Category and Syllable Filters may also be used to change the list of phrases displayed to the user from the Rhymed Phrases Database 133-1 of FIG. 19. In the illustration shown in FIG. 35, two Category Filters are provided, the ALL filter 224a and the Favorites filter 224e. The ALL filter 224a allows the user to display all of the phrases returned by the search engine module 121 of FIG. 2, while the Favorites filter 224e will display user's collected favorites. A discussion of the Favorites filter 224e will follow the section describing the Collecting of Rhymes and Phrases. Also available is the syllables filter 222 discussed in other examples, which affects the number of syllables in the each rhymed phrase displayed Sound-Alikes Phrasal Database Searching on a word in the SOUND-ALIKES Phrasal database 131-2 will display phrases that end with a word that is a close but not a perfect rhyme for the word being searched. Turning back to FIG. 20, the reader is directed to Last Word SOUND-ALIKES ID 609, which is a unique number that is assigned to a unique Last Word SOUND-ALIKES Phrase Group. A Last Word SOUND-ALIKES Phrase Group may contain two or more Last Word Rhymed Groups. Last Word SOUND-ALIKES Phrase Groups are groups of phrases whose last word sounds similar to the search word, but the last words are not perfect rhymes with the search word. For example, the word "bike" sounds similar to the word "night", but they are not perfect rhymes with each other. The Last Word SOUND-ALIKES ID 609 is used by the search engine module 121 of FIG. 2 to determine if the current search word belongs to a Last Word SOUND-ALIKES Phrase Group.

In addition to checking the Last Word SOUND-ALIKES ID 609 of FIG. 20, the search engine module 121 of FIG. 2 will also check the Last Word EEE Group ID 611 and the Last Word EEZE Group ID 613 to see if the current search word has a corresponding Last Word EEE Phrase Group or a Last Words EEZE Phrase group. A Last Word EEE Phrase Group is a special type of SOUND-ALIKES Phrase group. According to traditional rhymes, the words "tree" and "reality" are not rhymes. However, in song writing, these words sound well together. If a user looks for SOUND-ALIKES phrases for the word tree, there are more than 1300 Last Word EEE SOUND-ALIKES. The Last Word EEE Group ID 611 is a means to combine the many Last Word EEE SOUND-ALIKES phrases with this sound. The Last Words EEZE Phrase Group contains the plurals of the words found in the EEE Phrase group.

FIG. 35 illustrates an example of a graphical user interface for the SOUND-ALIKES Phrasal Database 133-2 of FIG. 19. In FIG. 35, Rhymed-Phrases menu 230 is selected from menu bar 205. To search for Rhymed Phrases the user clicks on Rhymes Phrases button 230. A user then enters a search word in the search field 221 and begins the search. As discussed above, the search engine module 121 of FIG. 2 preferably determines if the search word has a Serial Number ID 901 of FIG. 20. If a Serial Number ID 901 is found, the search engine module 121 of FIG. 2 locates the Rhyme Group ID 20b of FIG. 20 to determine if the word belongs to a Last Word Rhymed-Group. Next, the search engine module 121 of FIG. 2 looks to the Last Word SOUND-ALIKES ID 609 of FIG. 20 in the SOUND-ALIKES Phrasal Database 133-2 to see if the Last Word Rhyme Group belongs to a Last Word SOUND-ALIKES Phrasal Group. Each Last Word Rhyme Group within a Last Word SOUND-ALIKES Phrase Group is assigned a Last Word Rhyme Group keyword in order to allow the user to select the Last Word Rhyme Group with which they wish to work.

If the Last Word Rhyme Group belongs to a Last Word SOUND-ALIKES Phrase Group, the search engine module 121 finds all of the other Last Word Rhyme Groups in the SOUND-ALIKES Phrasal Database 133-2 that have the same Last Word SOUND-ALIKES ID 609 as the current Last Word Rhyme Group, and prepares the Last Word Rhyme Group's keywords for display to the user in the SOUND-ALIKES display area 236 of FIG. 35. Thus, SOUND-ALIKES display area 236 contains words such as "gripe" and "bike" when the current search word is "night".

One skilled in the art will appreciate that the SOUND-ALIKES Phrasal Database 133-2 of FIG. 19 and the SOUND-ALIKES Database 131-2 of FIG. 18 operate in relatively the same manner. The former holding and displaying phrases while the latter holds and displays words. Thus, the options of displaying All SOUND-ALIKES phrases, All SOUND-ALIKES phrases plus perfect rhyme phrases or just some of the SOUND-ALIKES phrases operates in the same manner as previously discussed with reference to the SOUND-ALIKES Database 131-2 of FIG. 18.

Category and Syllable Filters may also be used to change the list of phrases displayed to the user from the SOUND-ALIKES Phrases Database 133-2 of FIG. 19. In the illustration shown in FIG. 35, two Category Filters are provided, the ALL filter 224a and the Favorites filter 224e. The ALL filter 224a allows the user to display all of the phrases returned by the search engine module 121 of FIG. 2, while the Favorites filter 224e will display user's collected favorites. A discussion of the Favorites filter 224e will follow the section describing the Collecting of Rhymes and Phrases.

Phrasal Database

A user will search the Phrasal Database when looking for a phrase that contains the current search word. Turning back to FIG. 20, the reader is directed to Combined Serial Number ID 71, which is a unique number contains all of the Serial Number IDs 901 of the words within the phrase.

Figure 36:
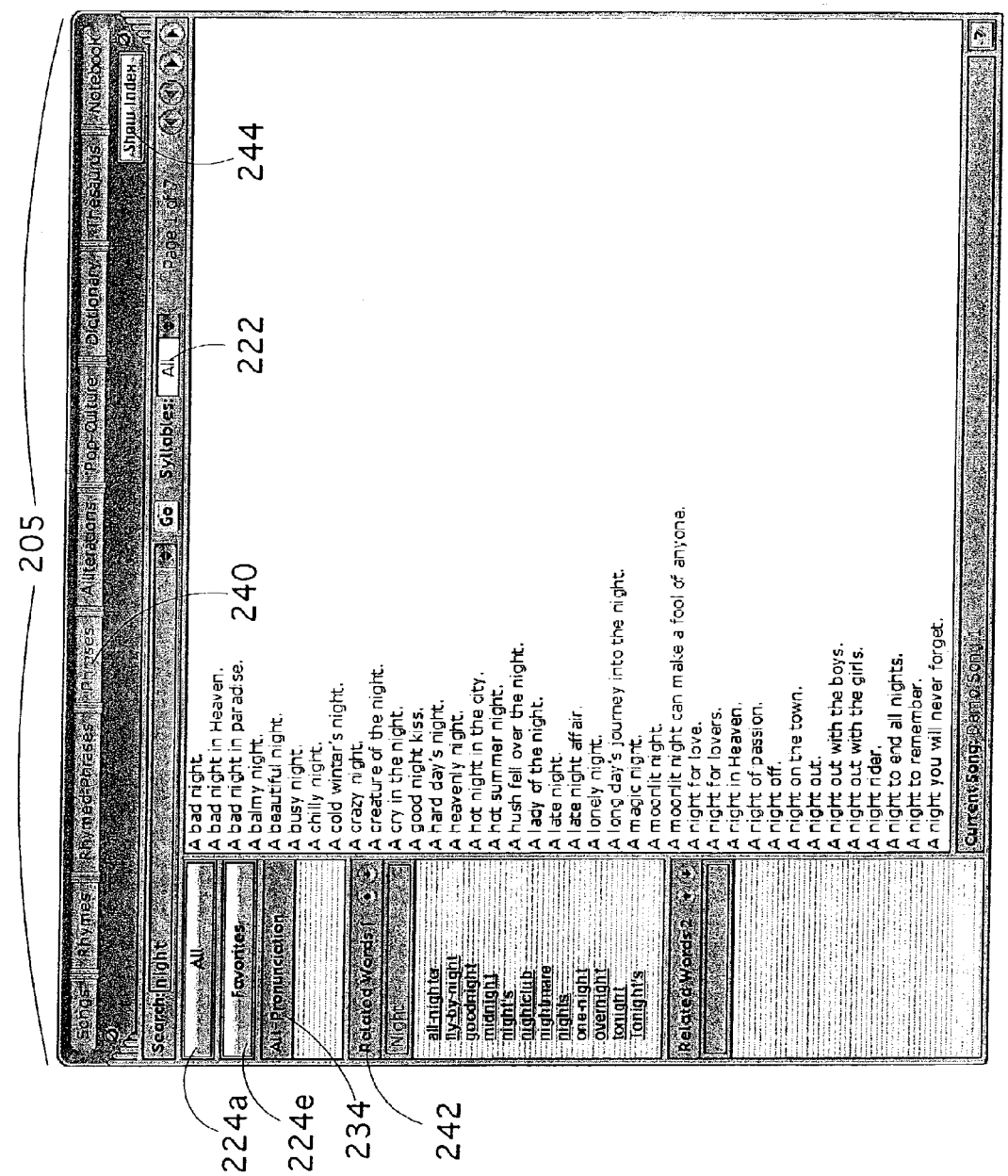
FIG. 36 is a computer screen shot illustrating an example of a graphical user interface into Phrasal Database of FIG. 19.

FIG. 36 illustrates an example of a graphical user interface into Phrasal Database 133-3 of FIG. 19. In FIG. 36, Phrases menu 240 is selected from menu bar 205. To search for phrases the user clicks on the Phrases button. A user then enters a search word in the search field 221 and begins the search. As discussed above, the search engine module 121 of FIG. 2 preferably determines if the search word has a Serial Number ID 901 of FIG. 20. If a Serial Number ID 901 is found, the search engine module 121 of FIG. 2 locates the Combined Serial Number ID 71 of FIG. 20 to determine which phrases contain the current search word by looking for the current search word's Serial Number ID 901 in the phrase's Combined Serial Number ID 71. The search engine module 121 of FIG. 2 then displays all of the phrases that contain the current search word.

The search engine module 121 of FIG. 2 does not only display phrases that contain the current search word, instead the search engine module 121 also suggest words that a user might want to search on in addition to the current search word. Referring back to FIG. 20, the search engine module 121 checks the Phrases Alternative Pronunciation ID 73 to determine if the current search word has any alternative pronunciations.

The alternative pronunciations for the Phrases Database 133-3 of FIG. 19 are found in the same way as they are found in the Rhymes Database 133-1 of FIG. 18 as described above.

In addition to providing possible alternate pronunciations to the user the search engine module 121 of FIG. 2 looks to see if there are related words by looking to Related Word 1 ID 583 and Related Word 2 ID 584 of FIG. 20. Related Words are words that contain the current search word, or a portion of the current search word. This is more clearly explained by the following examples. First, take the word "night". "Night" is a single word, however words such as "goodnight," "nightmare" and "tonight" all contain the word night. Thus, these words are grouped together into a Related Word Group and the ID associated with the Related Word Group is placed in the Related Word 1 ID 583 field, for the word night. Thus, if a user enters "night" as the current search word, shown in FIG. 36, the search engine module 121 of FIG. 2 preferably displays words in the Related Word Group indicated by the Related Word 1 ID 583 that contain the word "night" such as goodnight, nightmare and tonight under Related Words 1 242.

Figure 37:
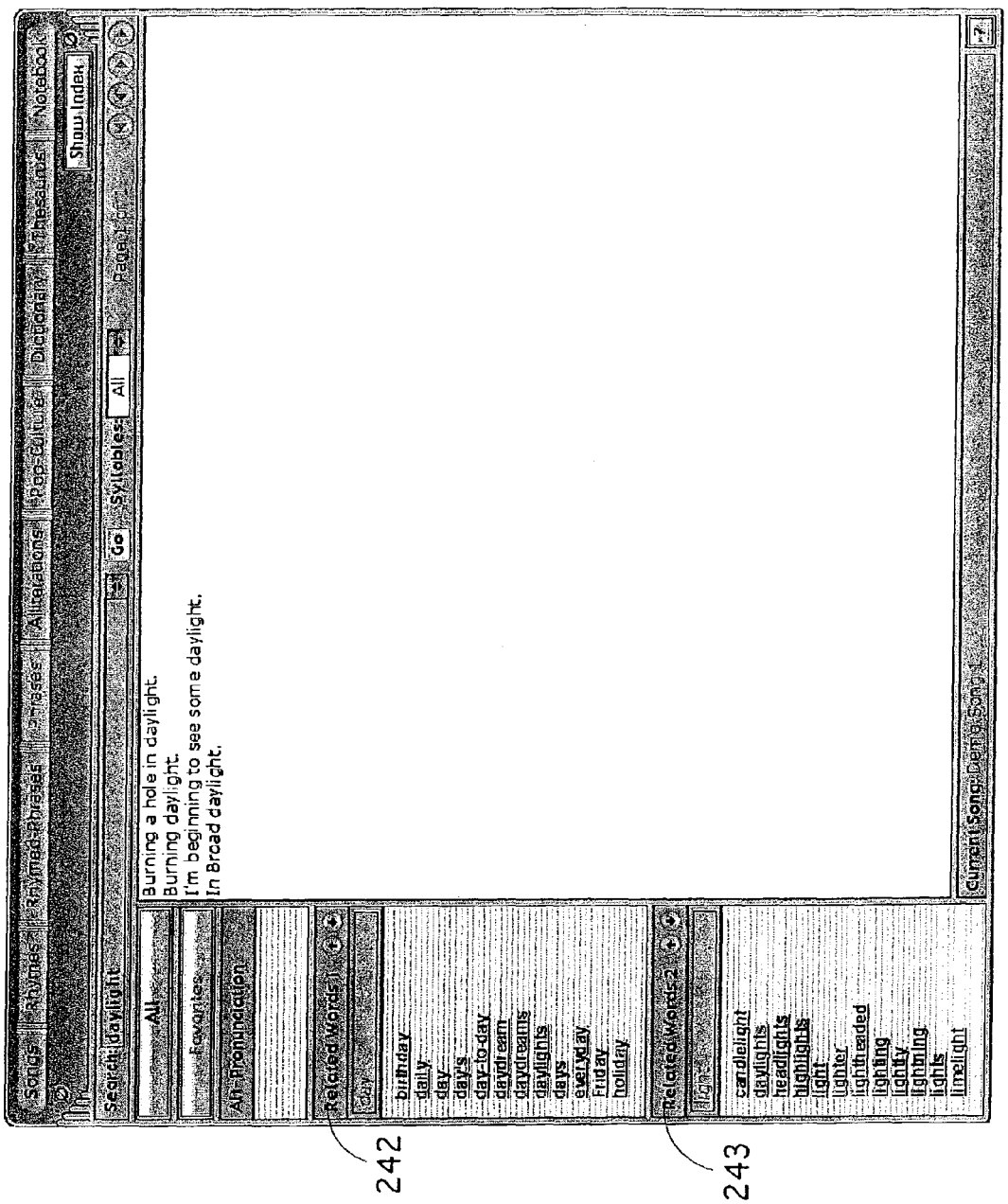
FIG. 37 is a computer screen shot where a user has entered "daylight" and the search engine module of FIG. 2 preferably displays the words in the Related Word Group, indicated by the Related Word 1 ID 583, that contain the first word "day" including the words "daydream" and "everyday" under Related Words.

On the other hand, suppose the current search word is "daylight". "Daylight" is actually made up of two different words "day" and "light". Thus, related words may contain the word "day" such as "daydream" and "everyday" or related words may contain the word "light" such as "lightheaded" and "candlelight". The words containing the word "day" are grouped together into a Related Word Group and the ID associated with the Related Word Group is placed in the Related Word 1 ID 583 field for the word "daylight." The words related to the word "light" are grouped together into a Related Word Group and the ID associated with the Related Word Group is placed in the Related Word 2 ID 585 field for the word "daylight." Thus, if a user enters "daylight" as shown in FIG. 37, the search engine module 121 of FIG. 2 preferably displays the words in the Related Word Group, indicated by the Related Word 1 ID 583, that contain the first word "day" including daydream and everyday under Related Words 1 242. In addition, the search engine module 121 of FIG. 2 preferably displays the words in the Related Word Group, indicated by the Related Word 2 ID 584, that contain the second word "light" including "lightheaded" and "candlelight" under Related Words 1 242. By selecting one of the related words displayed, the search engine module 121 of FIG. 2 will display the phrases containing the related word selected form the Phrasal Database 133 of FIG. 3.

Category and Syllable Filters may also be used to change the list of phrases displayed to the user from the Phrases Database 133-3 of FIG. 19 In the illustration shown in FIG. 36, two Category Filters are provided, the ALL filter 224a and the Favorites filter 224e. The ALL filter 224a allows the user to display all of the phrases returned by the search engine module 121 of FIG. 2, while the Favorites filter 224e will display user's collected favorites. A discussion of the Favorites filter 224e will follow the section describing the Collecting of Rhymes and Phrases.

Figure 38:
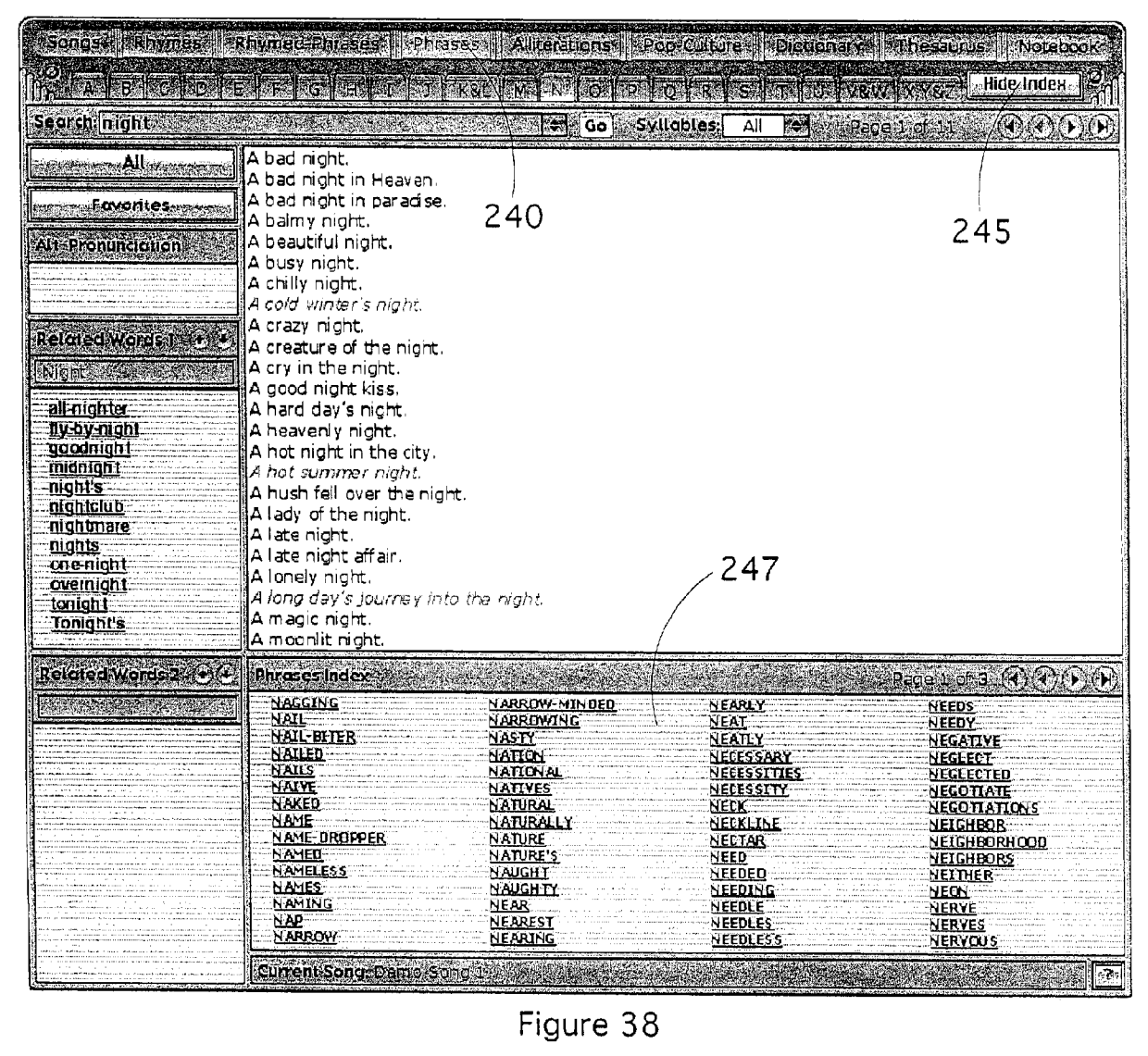

In addition to the phrasal searches described above, a user may access the phrasal database 133-3 of FIG. 19 though a Phrase Index. The Phrase Index alphabetically lists every word contained in the Phrasal Database 133-3 of FIG. 19. Returning to FIG. 36, access to this Phrase Index may be provided by a Show Index Button 244. As shown in FIG. 38, the Phrase Index region 247 is shown at the bottom of the graphic user interface. In addition, at the top of the graphic user interface is a series of tabs each representing a portion of the alphabet. A user can select any of the tabs to display the words listed in the phrasal database 133-3 of FIG. 19. Of course, the user preferably also has the ability to hide the phrasal index. As shown in FIG. 38, this can be implemented with a Hide Index button 245. One of the benefits of being able to display the phrasal index is to help overcome writer's block. There is nothing worse than staring at a blank page. By looking through the Phrases Index, a user finds words and phrases that may stimulate their creative process.

Each phrase is analyzed word by word. When a user selects a word in the Phrases Index region 247, the search engine module 121 of FIG. 2 collects all of the phrases that contain the selected word's Serial Number ID 901 of FIG. 20 in the Combined Serial Number ID 71. Phrases that contain the word selected will be displayed in main display window 201. With the foregoing information a return to FIG. 36 is of use. The word searched is "night". Again filters are available of "All" 224a and "Favorites" 224e. Also available is alternate pronunciations 234. These, as in other screens appear in the side of the screen. There is also the option of selecting Related Words 242 as a first and second choice. In the first choice in FIG. 36 are found such words such as "fly-by-night", "goodnight". As with previous screens, these side bar words can be clicked on to further process them through the databases. Finally, the main portion of the screen 201 contains a full list of words such as "A bad night", "A bad night in Heaven", etc.

Other Databases

Figure 39:
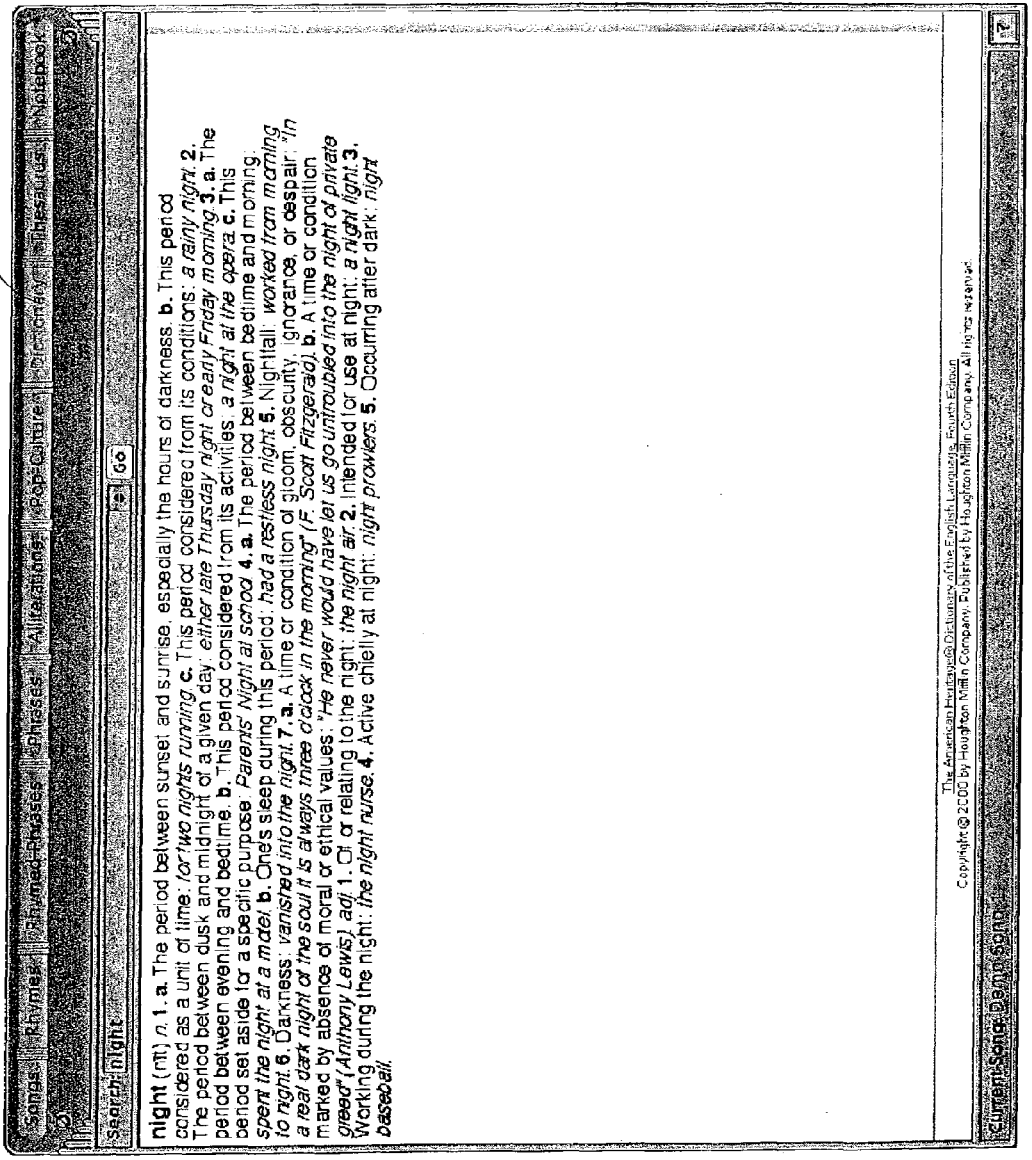
FIG. 39 is a computer screen shot depicting an example of how the search engine of FIG. 2 might display the information for a given word from the reference dictionary of FIG. 18 through a Dictionary area.

In addition, the customized databases described above, the databases 111 of FIG. 17 preferably comprise a reference dictionary 137. In one embodiment, the reference dictionary 137 is the *The American Heritage® Dictionary of the English Language, Fourth Edition* Copyright© 2000 by Houghton Mifflin Company. FIG. 39 depicts an example of how search engine 121 of FIG. 2 might display the information for a given word from the Reference Dictionary 137 of FIG. 18 through Dictionary area 270.

Figure 40:
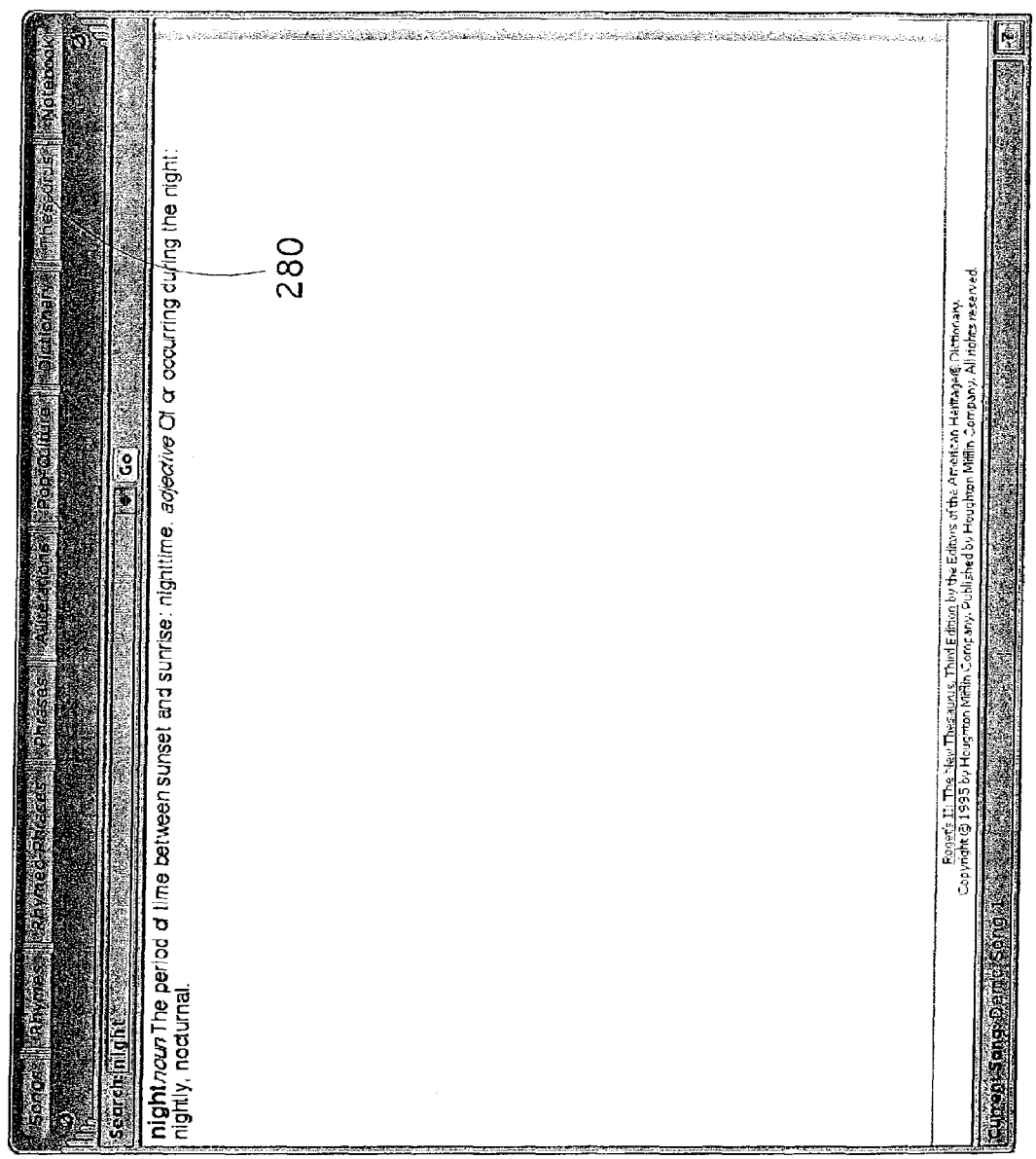
FIG. 40 is a computer screen shot depicting an example of how the search engine module of FIG. 2 might display information for a given word from the thesaurus reference through the Thesaurus area.

Returning to FIG. 17, the reader will note that in addition to a reference dictionary 137, a thesaurus 136 is preferably integrated into databases 111. In one embodiment, the thesaurus 136 is the *Roget's II: The New Thesaurus, Third Edition* by the Editors of the American Heritage® Dictionary. Copyright© 1995 by Houghton Mifflin Company. FIG. 40 depicts an example of how search engine module 121 of FIG. 2 might display information for a given word from the thesaurus 136 through the Thesaurus area 280.

The databases 111 of FIG. 18 discussed above can be used together to provide a plurality of different words and phrases to assist the writer in the creative process. Search engine module 121 of FIG. 2 allows the user to enter the search term once. Then the user can move between the plurality of databases 111 of FIG. 18. Turning back to FIG. 21, the user can move from Rhymes 220 to Phrases 240 to Alliterations 250 without having to re-type the word for each search. Further, a user may select any word within any of the menus and that word will become the current search word in all of the databases 111. This allows a user to go from word to word, search to search without extra typing.

Collecting

As briefly discussed before, the system and method disclosed herein provides interaction between the SIM 125 of FIG. 2 and the databases 111 of FIG. 1 stored within the e-CPT. This interaction allows a user to access words and phrases that have been previously selected by the user from the Word Database 131 of FIG. 17 and/or the Phrase Database 133 from the SIM 125 of FIG. 2. For example, if the user finds a rhyme in the Rhymes Database 131-1 of FIG. 18 or a Rhymed-Phrase from the Rhymed Phrasal Database 133-1 of FIG. 19 that the user wishes to consider as part of the lyric or poem, the user can select that word or phrase, and the e-CPT stores that word or phrase. The user may then access the selected word or phrase while using the modules within the SIM 125 of FIG. 2.

Figure 41:
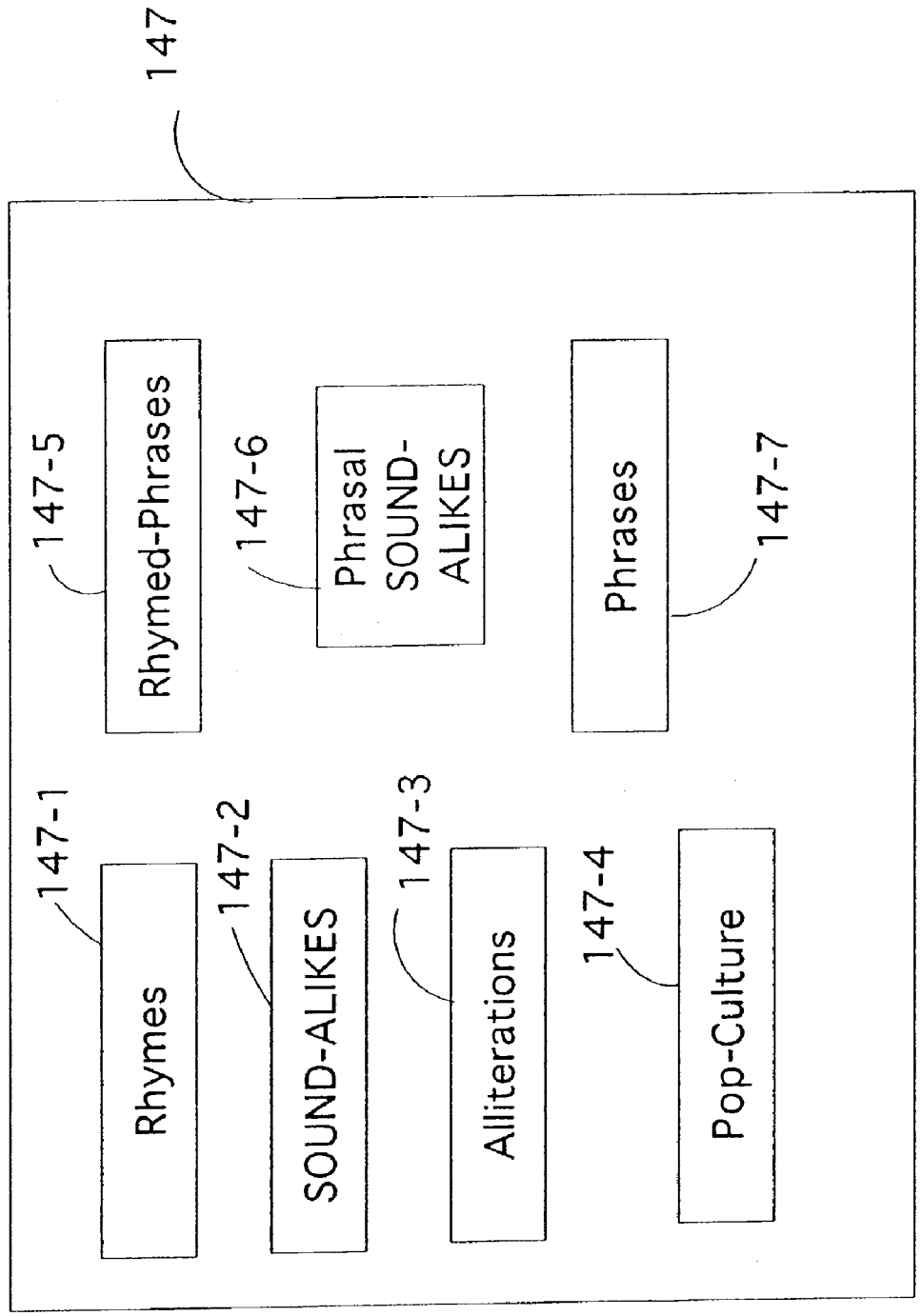
FIG. 41 is a graphical depiction showing the Collected Words and Phrases files as comprising a plurality of files: Rhymes file, SOUND-ALIKES file, Alliterations file, Pop-Culture file, Rhymed Phrases File, Phrasal SOUND-ALIKES file and Phrasal file.

Preferably, the user selects a song from Song List 141 of FIG. 3 or creates a new record. This selected song is referred to as the Current Active Song. As previously discussed, each song has Collected Words and Phrases files 147 of FIGS. 4 and 41 that have been associated with the song. Collected Words and Phrases files 147 is in files 113 in FIG. 1. Preferably, as shown in FIG. 41, the Collected Words and Phrases files 147 comprise of a plurality of files: Rhymes file 147-1, SOUND-ALIKES file 147-2, Alliterations file 147-3, Pop-Culture file 147-4, Rhymed Phrases File 147-5, Phrasal SOUND-ALIKES file 147-6 and Phrasal file 147-7. One skilled in the art will appreciate that the files in the Collected Words and Phrases files 147 correspond to the plurality of databases shown in FIGS. 18 and 19.

Once a user has selected a song. The user, using search engine module 121 of FIG. 2, may search the Words Database 131 of FIG. 18 and the Phrasal Database 133 of FIG. 19 as previously discussed. When searching the Words Databases 131 and/or Phrasal Database 133 a plurality of words or phrases will be displayed to the user in the main display window 201 as depicted in FIGS. 21 and 34, and 35. A user may select any word or phrase displayed in the main display window 201. The selected word or phrase will then be stored to the Collected Words and Phrases Array 147 of FIG. 41 associated with the Current Active Song. For all of the Word Databases 131 of FIG. 18, except the Pop-Culture database 131-4 and for all the Phrasal Databases 133 of FIG. 19, when a collected word or phrase is associated with the Current Active Song, it is stored in the Collected Words and Phrases Array 147 of FIG. 41, along with the search word that the user was searching on. More specifically it is actually being stored in a custom data structure within the main data structure. It is loaded into arrays for display.

For example, FIG. 21 illustrates access to the Rhymes Database 131-1 of FIG. 18. The user finds the words "slaughter", "sea otter" and "globetrotter". The Current Active Song's Title Demo Song 1 is shown at the bottom 202 of the graphical user interface. When the user selects the words, preferably by double clicking on the words, the words change color and become italicized to let the user know that those words have been selected. In addition, the words are saved to one of the files within the Collected Words and Phrases files 147 shown in FIG. 41. In this case, the database being searched is the Rhymes Database 131-1 of FIG. 18. Thus, any words selected from this Database will be associated with the search word water and collected into the Rhymes file 147-1 of FIG. 41.

Once the user has selected one or more words and phrases from the Words Database 131 of FIG. 18 or the Phrasal Database 133 of FIG. 19, the user can then return to the SIM 125 of FIG. 2. From the SIM 125 the user can display the words that were collected into the Collected Words and Phrases files 147 shown in FIG. 41.

Figure 42:
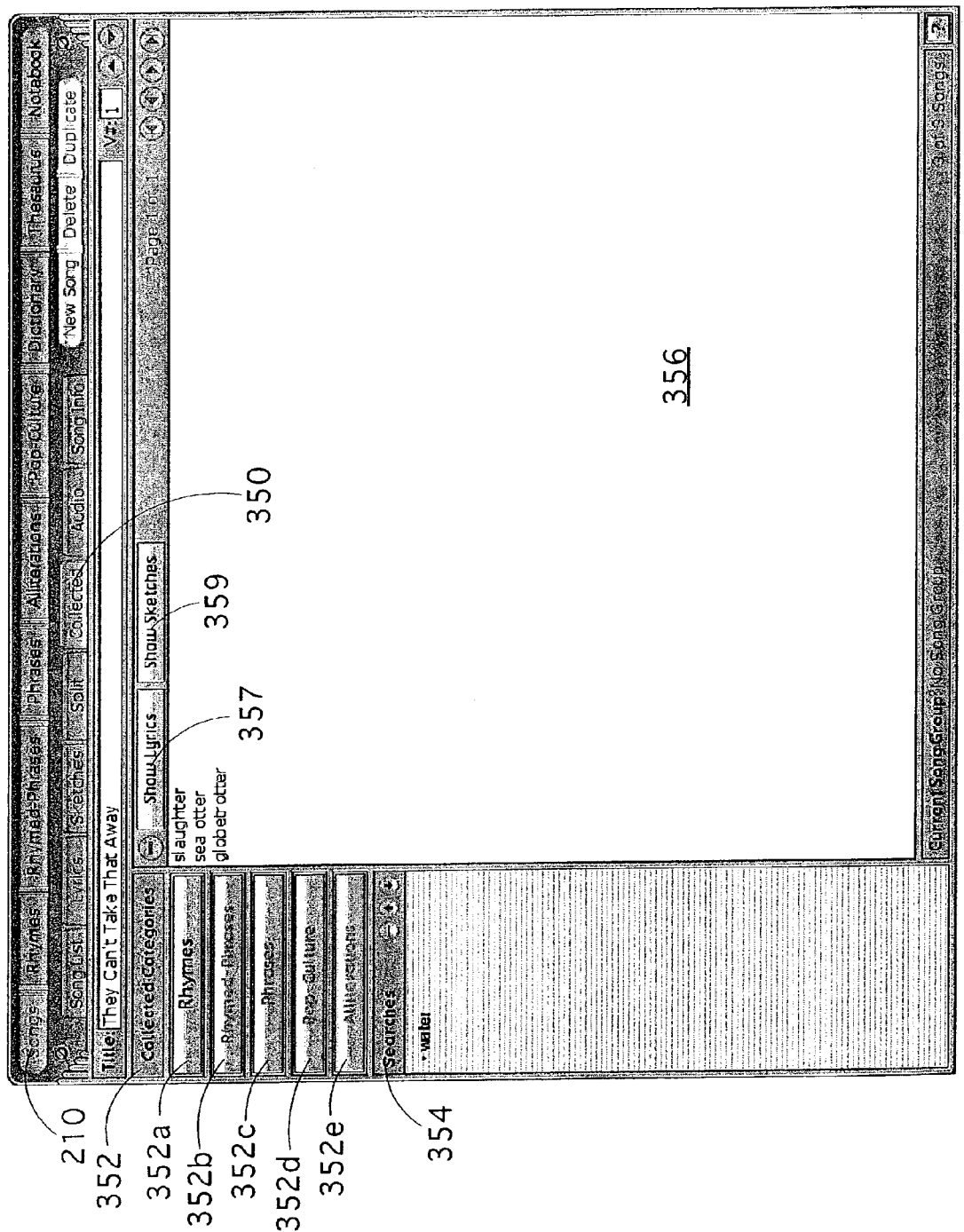
FIG. 42 is a computer screen shot depicting an example of a graphical user interface for the SIM when the collected menu item is selected.

FIG. 42 depicts an example of a graphical user interface for the SIM 125 when collected menu 350 is selected. Collected menu 350 allows the user to access the Collected Words and Phrases files 147 of FIG. 41. The Collected Words and Phrases files 147 are accessed though the Collected Categories 352 of FIG. 42. Under the Collected Categories 352 are Rhymes 352*a*, Rhymed-Phrases 352*b*, Phrases 352*c*, Pop-Culture 352*d* and Alliterations 352*e*. Through the Collected Category Rhymes 352*a* the Rhymes file 147-1 and the SOUND-ALIKES file 147-2 of FIG. 41 for the Current Active Song can be accessed. Through the Collected Category Rhymed-Phrases 352*b* of FIG. 42, the Rhymed Phrases file 147-5 and the Phrasal SOUND-ALIKES file 147-6 of FIG. 41 for the Current Active Song can be accessed. Through the Collected Category Phrases 352*c* of FIG. 42, the Phrases file 147-7 of FIG. 41 for the Current Active Song can be accessed. Through the Collected Category Pop-Culture 352*d* of FIG. 42, the Pop-Culture File 147-4 of FIG. 41 for the Current Active Song can be accessed. Through the Collected Category Alliterations 352*e* of FIG. 42, the Alliterations file 147-3 of FIG. 41 for the Current Active Song can be accessed.

FIG. 42 illustrates the selection of the Collected Menu 350 and the Collected Category Rhymes 352*a*. The words that the user performed a search on and collected words from the search results are listed in Searches area 354. By selecting any of the words listed in the Searches area 354 the words collected will be displayed. For example, if the user selects the word "water" from the searches area 354 the words collected by the user from the Rhymes Database 131-1 of FIG. 18 during the search on the word "water", i.e. "slaughter," "sea otter," and "globetrotter" are now displayed in the Collected Text Display Area 356 which is the main portion of the screen. Further, the user may desire to show the lyrics files 143 of FIG. 4 or the sketches files 145 of FIG. 4 for the song. In the illustration of FIG. 42, this may be accomplished by selecting the Show Lyrics button 357 or the Show Sketches button 359.

FIG. 43 illustrates an example of how the lyrics files 143 of FIG. 4 may be displayed with the Rhymes file 147-1 of FIG. 41. In addition, the user may desire to hide the lyrics files 143 of FIG. 4 and may do so by selecting the Hide Lyrics button 358 of FIG. 43. As noted much earlier in this writing, this figure is a good example of ongoing work on the creation of lyrics for a song, poem or other writing. The title of the writing or song is "They Can't Take That Away" (rather than Demo Song 1). This is shown in the Title bar. The "1$^{st}$ Verse" "B Section" and "Chorus" are all part of the lyrics created by the user (as hide lyrics has not yet been clicked upon). The button "Collected" 350 has been selected so that the collected items can be displayed from the search word "water" (see side of the screen under Searches) under the Rhymes filter in the left hand side bar of the "Collected Categories". Thus, in the lower portion of the screen is seen the collected items for the Rhyme terms for "water". These are "slaughter", "sea otter" and "globe trotter". Were the user now to click on the Phrases filter on the left hand side, all collected Phrases for the term Water would be shown. Note that the search term is editable as is the collected area. Both show minus signs in a circle so that a term may be highlighted and deleted.

Favorites

Figure 44:
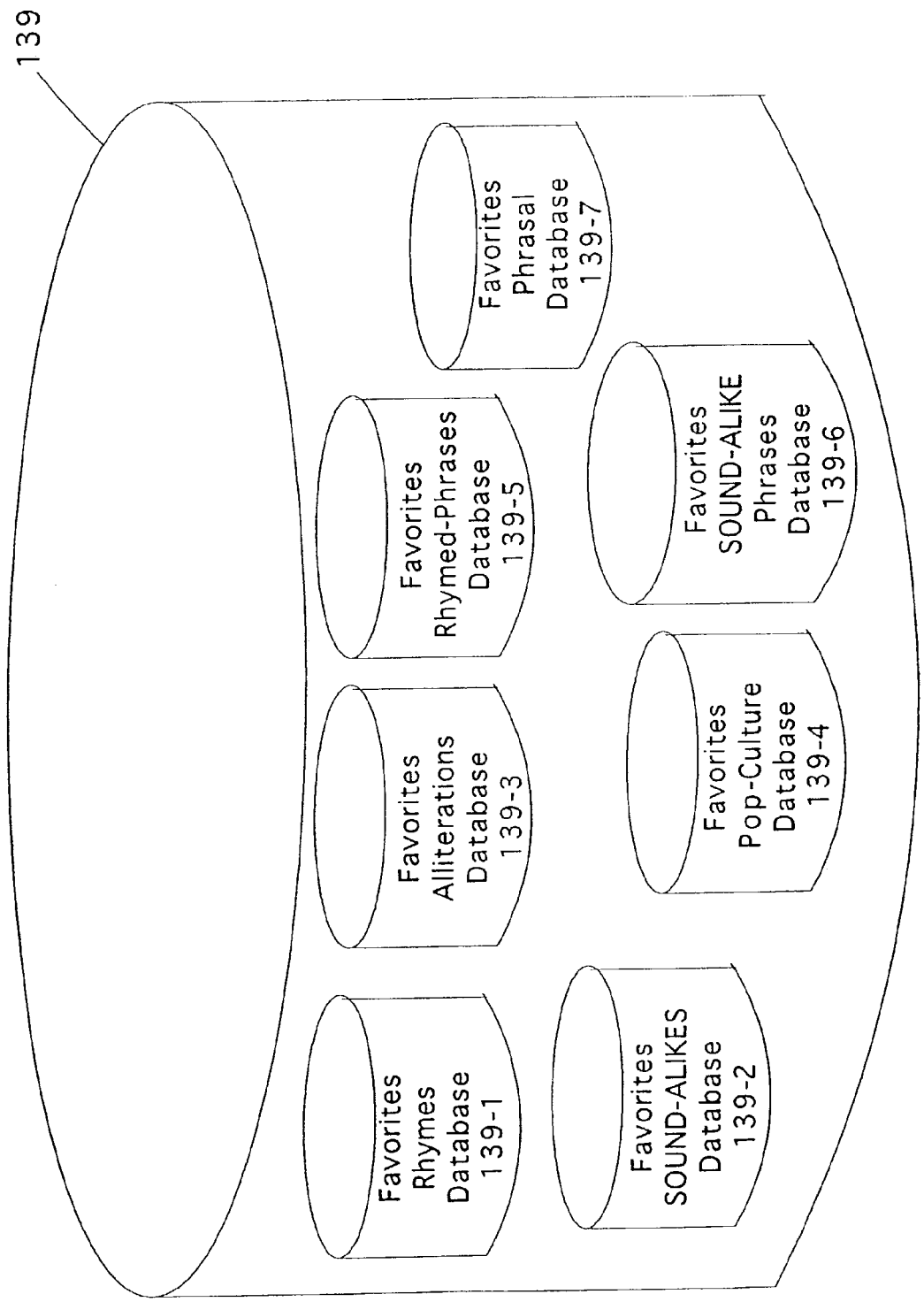
FIG. 44 illustrates that a Favorites database of FIG. 17 comprises of a plurality of smaller databases: Favorites Rhymes Databases; Favorites SOUND-ALIKES Databases; Favorites Alliterations Database; Favorites Pop-Culture Database; Favorites Rhymed Phrases Database; Favorites SOUND-ALIKES Phrases Database; and Favorites Phrases Database.

In addition to collecting text to the Current Active Song from the Words Databases 131 of FIG. 18 and the Phrasal Databases 133 of FIG. 19 for viewing in the SIM 125 of FIG. 2, the collected words are added to a Favorites database 139 of FIG. 17. This allows the user to build his or her own personal dictionaries. As shown in FIG. 44, Favorites database 139 of FIG. 17 comprises of a plurality of smaller databases: Favorites Rhymes Databases 139-1; Favorites SOUND-ALIKES Databases 139-2; Favorites Alliterations Database 139-3; Favorites Pop-Culture Database 139-4; Favorites Rhymed Phrases Database 139-5; Favorites SOUND-ALIKES Phrases Database 139-6; and Favorites Phrases Database 139-7. One skilled in the art will appreciate that there is a Favorites Database 139-1-139-7 for each of the Word Databases 131 of FIG. 18 and each of the Phrasal Databases 133 of FIG. 19. When a user selects a word or phrase from any of the Word Databases 131 of FIG. 18 or from any of the Phrasal Databases 133 of FIG. 19, the word is added to the corresponding Favorites Database 139 of FIG. 44. One skilled in the art will appreciate that there are a variety of ways in which a user may select a word or phrase. In one embodiment, the user selects a word or phrase by double clicking on the word or phrase. The Favorites Databases 139 of FIG. 44 will continue to hold the words selected by the user until the user clears the Favorites Databases 139.

As previously discussed, there are a set of Category Filters 224, as shown in FIG. 21, that can be used to change the words displayed by the search engine module 121 of FIG. 2. As mentioned above, the Favorites filter 224*e* of FIG. 21 will display the user's collected favorites for the Rhymes Database 131-1 of FIG. 18. When the user selects the Favorites Filter 224*e* of FIG. 21, the search engine module 121 of FIG. 2 displays any words from the Favorites Rhymes Database 139-1 of FIG. 44 which rhyme with the current search word. The searching and displaying of the Favorites Databases 139 is preformed in the same manner as described above with relation to the Words Databases 131 of FIG. 18 and the Phrasal Databases 133 of FIG. 19. One skilled in the art will appreciate in order for the search engine module 121 of FIG. 2 to be able to search on the words in the Favorites Databases 139, the IDs of FIG. 20 associated with the selected word are preferably saved to the Favorites Database 139.

Just as the Favorites Filter 224*e* of FIG. 21 allows the user to display the words collected in the Favorites Rhymes Database 139-1 of FIG. 44, the Favorites Categories filters for each of the Word Databases 131 of FIG. 18 and Phrasal Databases 133 of FIG. 19, previously discussed, allow the user to access the words and/or phrases collected in the corresponding Favorites Databases 139.

Help, Programming, Spell Check

A final note is of interest. Throughout this program, there is available "Help" as is found in most computer programs. However, the "Help" in this program is somewhat different. The Help opens up to the section where the user is when Help is requested. Thus, if the user is in Lyrics when writing a Song and is having problems, by clicking Help (which is the question mark on that page), the help will open up to the area applicable to Lyrics in Songs. In more detail, at the bottom right hand corner of every page of the program is the Help or ? button. Clicking on the Help Button opens up Help. Disclosed in this writing are are two ways to use the Help.

The first is to click on the Table of Contents, then click on the Index-Driven Button and select the Topic you need help with. Each Chapter contains the complete information for each Topic. Reviewing the appendixes will be of use in understanding this.

The Second is to click on the Page-Driven Button that is, the question mark on the screen on which you are on. Thus, Page-Driven means that the Help for whichever Page in the program you are on is displayed. In this mode the Help will follow you as you change Pages in the Program. This means that if you are on the Lyrics Page the Help for the Lyrics Page is displayed. However if you should then decide to change to the Rhymes Page the Help will remain open and the Help for the Rhyming Dictionary will be displayed. This will act like a tutorial allowing you to look at the Help for a given feature and be able to use the program while reviewing the Help for that feature.

The programming disclosed herein and even more apparent in Appendix B is effectively handled through spiral programming. Rather than starting at an initial point and being forced to carry along one set path, one should consider the start as the hub of a wheel with spokes extending from the hub and interconnecting, so that the user may once the program is started move readily from point to point without having to return to a home site to make an interchange. Just as once one starts a car all features are available for use, so has the program herein been designed as one embodiment of this invention. One skilled in the art can readily program in this fashion.

Finally, while not previously described herein, the system contemplates a find system connected with a spell checker. Thus, if the user puts in the word "Mississippi" to search but misspells that word, before the search begins, the spell checker will alert the user to the fact that the word is misspelled and provide alternative spellings as with any known spell checker. The GOOGLE system is somewhat akin in trying to correct a search word, but does not act as typical spell check.

Appendixes

In Appendixes A and B are texts and drawings that will be useful to the reader. Appendix A is from the Help portion of the program written to assist the user in using one embodiment of the program. In Appendix B is the script and screens from the MASTERWRITER.DEMO which is incorporated herein by reference. These materials repeat materials in the foregoing paragraphs and further illuminate the inventive concepts in this writing.

The present device and method may be embodied in other specific forms without departing from the essential characteristics disclosed herein. The described embodiments are to be considered in all respects not as restrictive restraints. All changes that come within the meaning and range of equivalency of the claims are to be embraced.

The invention claimed is:

1. A method of processing an input word through a computer system having a non-volatile and volatile memory whereby to aid in the creative process of songwriting, comprising the steps of:
   i) providing the computer with a software program and a database in non-volatile memory containing collections of word definitions, word synonyms, word alliterations, phrases, and pop culture words contained in categories of pop culture words and phrases;
   (ii) entering the input word;
   (iii) without having to re-enter the input word, selecting for the word in the non-volatile computer database any of the following, all of which are available for selection:
      (a) exact rhymes of the input word,
      (b) words that are similar sounding to the input word but are not exact rhymes,
      (c) phrases that end with a word that contains a sound the same as or similar to the input word, and
      (d) sound-alike words contained in one or more of the foregoing collections that contain a sound the same as or similar to the input word, all divided into the at least the following groupings: rhymes, phrases, alliterations and pop-culture words and phrases;
   (iv) providing a syllable filter for rhymes, rhyme phrases, phrases, alliterations, and for data collected from pop-culture words, and sound-alike words, whereby the user can elect to make available for display only words and phrases having a selected number of syllables;
   (v) displaying only those words and phrases available for display that have been selected with respect to the entered word; and
   (vi) allowing a user of the computer to cull words and phrases from the displayed words and phrases for storage in non-volatile memory apart from the display by clicking on the desired words or phrases whereby to form a user collection of culled words and/or phrases that can be recalled as a collection in subsequent sessions of use.

2. The method of claim 1 in which words of similar sounds in the database are grouped according to at least two of:
   number of syllables;
   plurals;
   singulars;
   short vowel sounds of same vowel; and
   related consonant sounds;
   the groups being assigned identification numbers to facilitate searching each group.

3. The method of claim 1 in which words which rhyme with an input word are obtained by reviewing the words by phonetic sounds from right to left.

4. The method of claim 3 wherein the collection of words are grouped by relationship of sounds from left to right, number of syllables, and alphabetically.

5. The method of claim 1 wherein in presenting the results of the search of the collection of words, the rhymed words are organized by number of syllables; multiple syllable words being further sorted by the sound of the first syllable, the sound of the second syllable and proceeding tough each following syllable; the consonant of the first syllable; alphabetically.

6. The method of claim 1 wherein the database contains a collection of words comprising words that are spelled the same as the input word but take on different sounds and words that are spelled slightly differently from the input word but have the same meaning, the words being assigned identifiers for ease of computer searches.

7. The method of claim 1 wherein the alliterations in the database are a collection of words which form an alliterations group, the collection comprising: words that have the same first letters being grouped together; words that have the same first at least two letters being grouped together, words that have similar sounding first letters being grouped together.

8. The method of claim 1 wherein the pop culture words comprise at least one of the following:
   names of notable people;
   names of foods;
   names of drinks;
   titles of television shows;
   titles of movies;
   names of magazines;
   titles of books and books;
   brand names;
   famous places;
   famous events;
   icons;
   events;
   rivers;
   mountains;
   bodies of water;
   fictional characters;
   fictional places;
   mythology;
   religion;
   sports;
   music;
   the arts;
   products and
   names of famous people;
   the words being grouped for similarities and having identification numbers for easy accessibility.

9. The method of claim 8 wherein the words are identified for ease of computer search.

10. The method of claim 1 wherein the phrases contain a collection of words comprising: clichés, sayings, slang expressions, idioms, and word combinations.

11. The method of claim 10 in which the collection of words are identified for ease of computer search.

12. The method of claim 1 in which checking the word for similar sounds to the entered word comprises the steps of: searching the input word against the words in the database for singulars plurals, short vowel sounds, long vowel sounds, number of syllables in a word, and consonant sounds.

13. The method of claim 1 further comprising the step of outputting the words searched in the database in the following order:
   lowest syllable words first;
   words sharing the same last syllable sound as the word searched;
   words sharing the same preceding syllable sound of the word searched until all syllables are exhausted;
   words sharing the same last syllable as the related consonant sound; and
   alphabetical indexing of words;
   each of the foregoing being arranged in sets of most similar groups to least similar groups.

14. The method of claim 1 wherein the words searched are pre-grouped into similar sounding units to facilitate searching the words, the similar sounding units being assigned identification numbers to further facilitate the search.

15. The meted of claim 1 in which the computer system suggests additional input to the user to search on.

16. The method of claim 15 wherein the additional input is an alternative pronunciation and wherein the computer database includes an alternative pronunciation database that contains words that are spelled the same as the presented words but have alternative meanings and/or pronunciations and words that with minor spelling changes have alternative meanings and/or pronunciations.

17. The method of claim 16 wherein the additional input is of words of similar sound and words that are related but different than the word searched.

18. The method of claim 1 further comprising the step of establishing a file name before entering the word such that when the input word is checked in said checking step, any words that the user selects from the allowing step is saved to the file name established.

19. The method of claim 18 wherein any words that the user selects from the allowing step is also saved to a favorites database.

20. The method of claim 18 wherein once a file name is selected in the establishing step, the user may enter, delete and amend text in the file held by the file name which text the user has entered.

21. The method of claim 20 wherein the computer system enables the user to view both the text that is in the file held by the file name as well as any words selected in the allowing step.

22. The method of claim 1 wherein the input word is checked in all of the databases before presenting the information to the user, if the user selects this option.

23. The method of claim 1 in which the computer system has a find function wherein the find function is connected to spell check such that upon entry of a misspelled word to find, the spell check will alert the user to the misspelling and alternative choice words that are properly spelled to search.

24. The method of claim 1 wherein the collected culled words and/or phrases may be deleted from and added to.

25. The method of claim 1 further comprising an editable favorites dictionary, the favorites dictionary being comprised of and in addition to the collected culled words and/or phrases.

26. The method of claim 1 further comprising the step of filtering the output derived from the dictionaries for selected qualities in addition to syllables.

27. The method of claim 26 wherein the step of filtering uses filters that are at least one of: primary, secondary, and favorites wherein the primary filter works with the rhyming dictionary, the alliterations dictionary, the phrases dictionary, and the similar words dictionary to words most often found in common parlance, the secondary filter works the rhyming dictionary, the alliterations dictionary, the phrases dictionary, and the similar words dictionary and selects words less often used in common parlance; and the favorites filter provides output related to the input word that comes only from the favorites dictionary.

28. The method of claim 1 conducted with a plurality entered words to obtain a final output and further comprising recording the final output along with the date and time of its creation and the name of its author.

29. The method of claim 28 comprising connecting the computer system to a network for third party storage and verification of the date and time of creation as well as the name its author.

30. The method of claim 1 further comprising storing at least the thoughts of the user in a notebook section of the computer system as entered by the user in the notebook section.

31. The method of claim 30 wherein the notebooks section has a sort function.

32. The method of claim 30 wherein the notebook entries are associated with a particular project for sorting according to project.

33. The method of claim 1 in which a help system is incorporated that is opened to the page which deals with the subject matter of the screen that is open when help is requested.

34. The method of claim 33 wherein the help feature follows the user as the user navigates through the program.

35. The method of claim 1 including, available for selection, phrases that contain the input word.

36. A method of processing an input word through a computer system having a non-volatile and volatile memory, comprising the steps of:
  (i) providing the computer with a software program and a database in non-volatile memory containing collections of word definitions, word synonyms, word alliterations, phrases, and pop culture words contained in categories of pop culture words and phrases;
  (ii) entering the input word;
  (iii) without having to re-enter the input word, selecting for the word in the non-volatile computer database any of the following:
    (a) exact rhymes of the input word,
    (b) words that are similar sounding to the input word but are not exact rhymes,
    (c) phases that end with a word that contains a sound the same as or similar to the input word, and
    (d) words contained in one or more of the foregoing collections that contain a sound the same as or similar to the input word, all divided into the at least the following groupings: rhymes, phrases, alliterations and pop-culture words and phrases;
  (iv) providing a syllable filter for each of said groupings, or all of them, whereby the user can elect to display only words and phases having a selected number of syllables;
  (v) displaying the information found in the non-volatile database with respect to the entered word; and
  (vi) allowing a user of the computer to select words and phrases from the presented words for by clicking on the desired words;
  the method further comprising storing and accessing audio sounds associated with the presented information.

37. The method of claim 36 wherein the audio sounds are stored and accessed in an audio module further comprising a collection of MIDI drum loops.

38. A method of processing an input word through a computer system having a non-volatile and volatile memory, comprising the steps of:
  (i) providing the computer with a software program and a database in non-volatile memory containing collections of word definitions, word synonyms, word alliterations, phrases, and pop culture words contained in categories of pop culture words and phrases;
  (ii) entering the input word;
  (iii) without having to re-enter the input word, selecting for the word in the non-volatile computer database any of the following:
    (a) exact rhymes of the input word,
    (b) words that are similar sounding to the input word but are not exact rhymes by searching the input word against the words in the database for singulars, plurals, short vowel sounds, long vowel sounds, number of syllables in a word, and consonant sounds,
    (c) phases that end with a word that contains a sound the same as or similar to the input word, and
    (d) words contained in one or more of the foregoing collections that contain a sound the same as or similar to the input word and are pre-grouped into similar sounding units to facilitate searching the words, the similar sounding units being assigned identification numbers to further facilitate the search, all divided into the at least the following groupings: rhymes, phrases, alliterations and pop-culture words and phrases;
  (iv) providing a syllable filter for each of said groupings, or all of them, whereby the user can elect to display only words and phrases having a selected number of syllables;
  (v) displaying the information found in the non-volatile database with respect to the entered word in the following order:
    lowest syllable words first;
    words sharing the same last syllable sound as the word searched;
    words sharing the same preceding syllable sound of the word searched until all syllables are exhausted;
    words sharing the same last syllable as the related consonant sound; and
    alphabetical indexing of words;
  each of the foregoing being arranged in sets of most similar groups to least similar groups; and
  (vi) allowing a user of the computer to select words from the presented words for use by clicking on the desired words.

39. A method of processing an input word through a computer system having a non-volatile and volatile memory, comprising the steps of:
  (i) providing the computer with a software program and a database in non-volatile memory containing collections of word definitions, word synonyms, word alliterations, phrases, and pop culture words contained in categories of pop culture words and phrases;
  (ii) entering the input word;
  (iii) without having to re-enter the input word, selecting for the word in the non-volatile computer database any of the following:
    (a) exact rhymes of the input word,
    (b) words that are similar sounding to the input word but are not exact rhymes,
    (c) phrases that end with a word that contains a sound the same as or similar to the input word, and
    (d) words contained in one or more of the foregoing collections that contain a sound the same as or similar to the input word, all divided into the at least the following groupings: rhymes, phrases, alliterations and pop-culture words and phrases;
  (iv) providing a syllable filter for each of said groupings, or all of them, whereby the user can elect to display only words and phrases having a selected number of syllables;
  (v) displaying the information found in the non-volatile database with respect to the entered word; and
  (vi) allowing a user of the computer to select words and phrases from the presented words for by clicking on the desired words;
  the method further comprising storing and accessing audio sounds associated with the presented information, and wherein the audio sounds are stored and accessed in an audio module further comprising a collection of MIDI drum loops.

* * * * *